AMPLIFIER
FIG. 8A
AND NOT
FIG. 8B
COUNTER
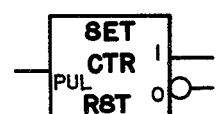
FIG. 8C
INVERTER
FIG. 8D
INVERTING OR
FIG. 8E
ONE SHOT
FIG. 8F
OR CIRCUIT
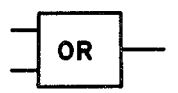
FIG. 8G
TIME DELAY
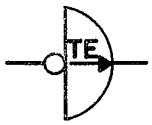
FIG. 8H
COIL
FIG. 8I
RESISTER
FIG. 8J
RELAY CONTACTS
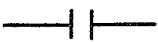
FIG. 8K
RELAY CONTACTS
FIG. 8L
FIG. 8

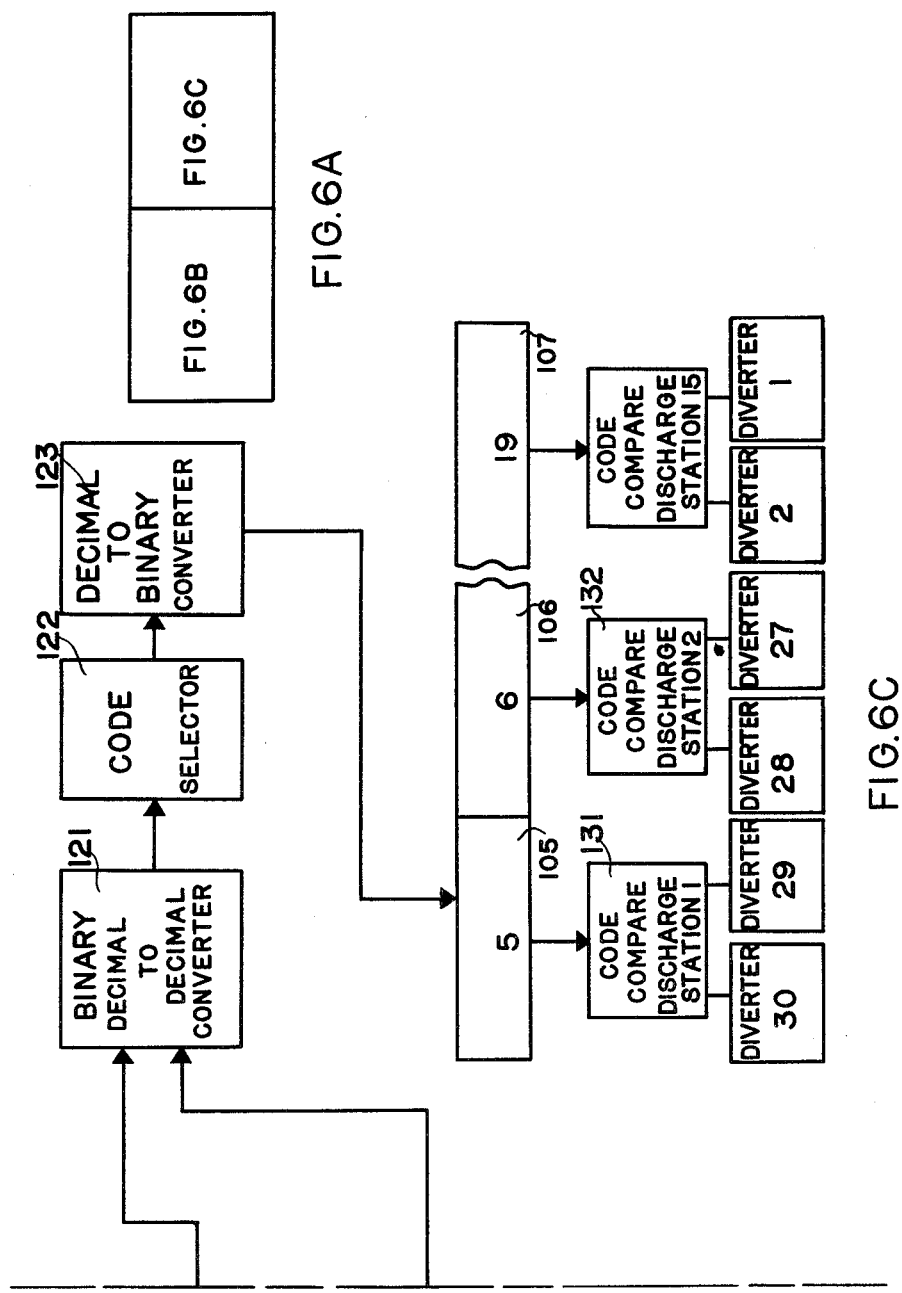

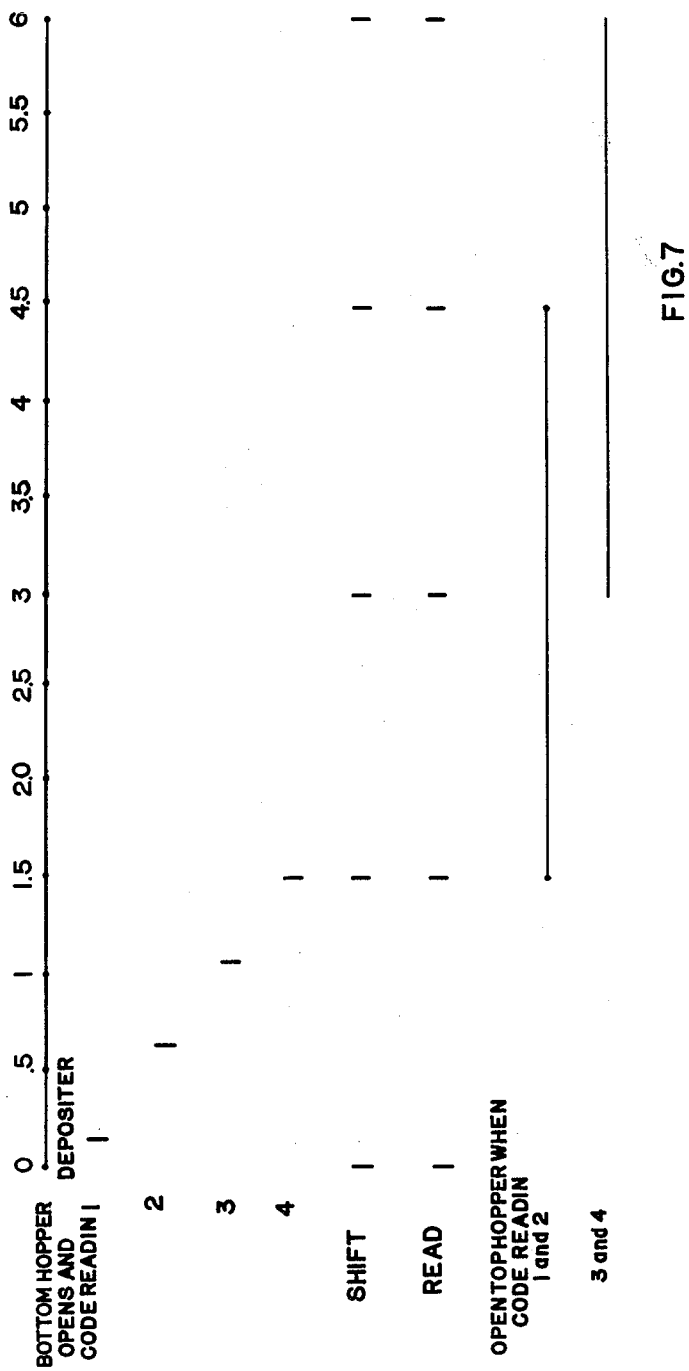

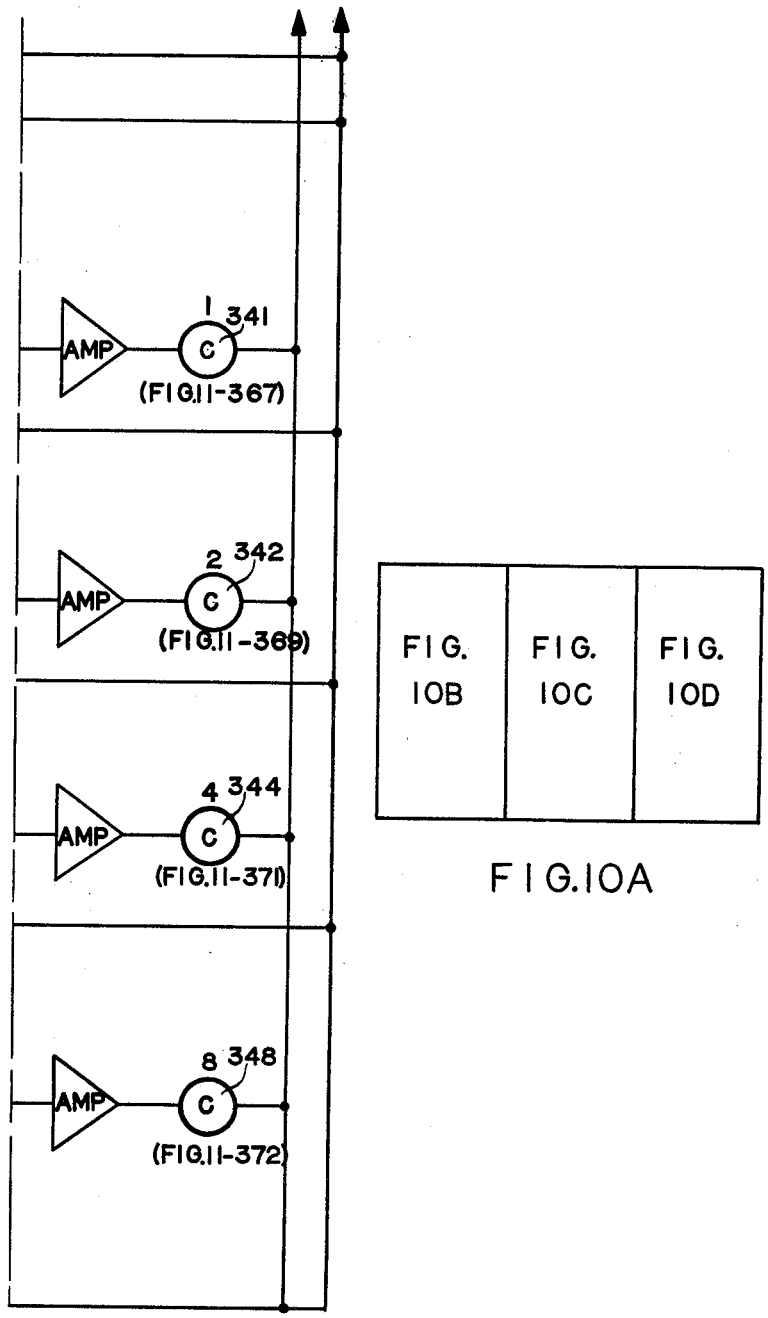
FIG.IOD

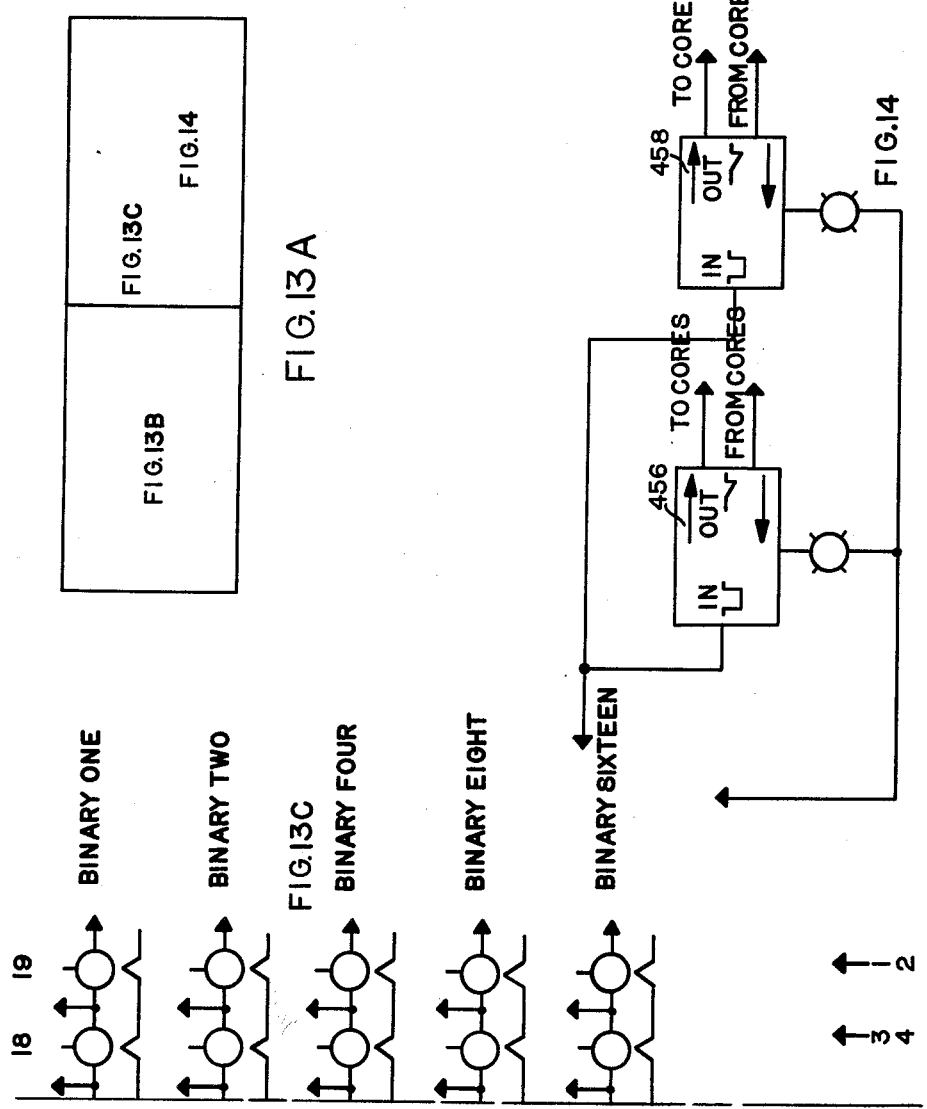

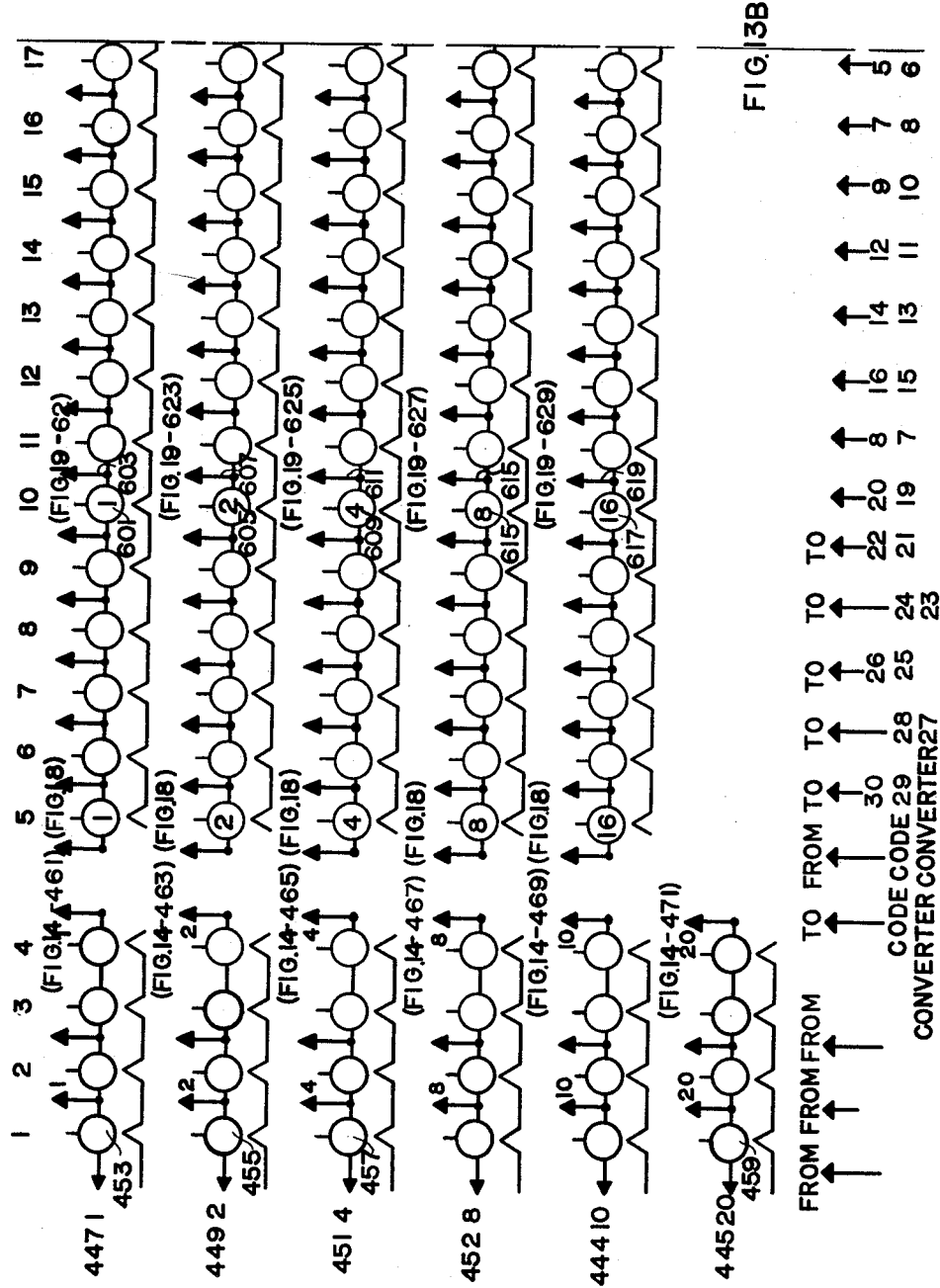

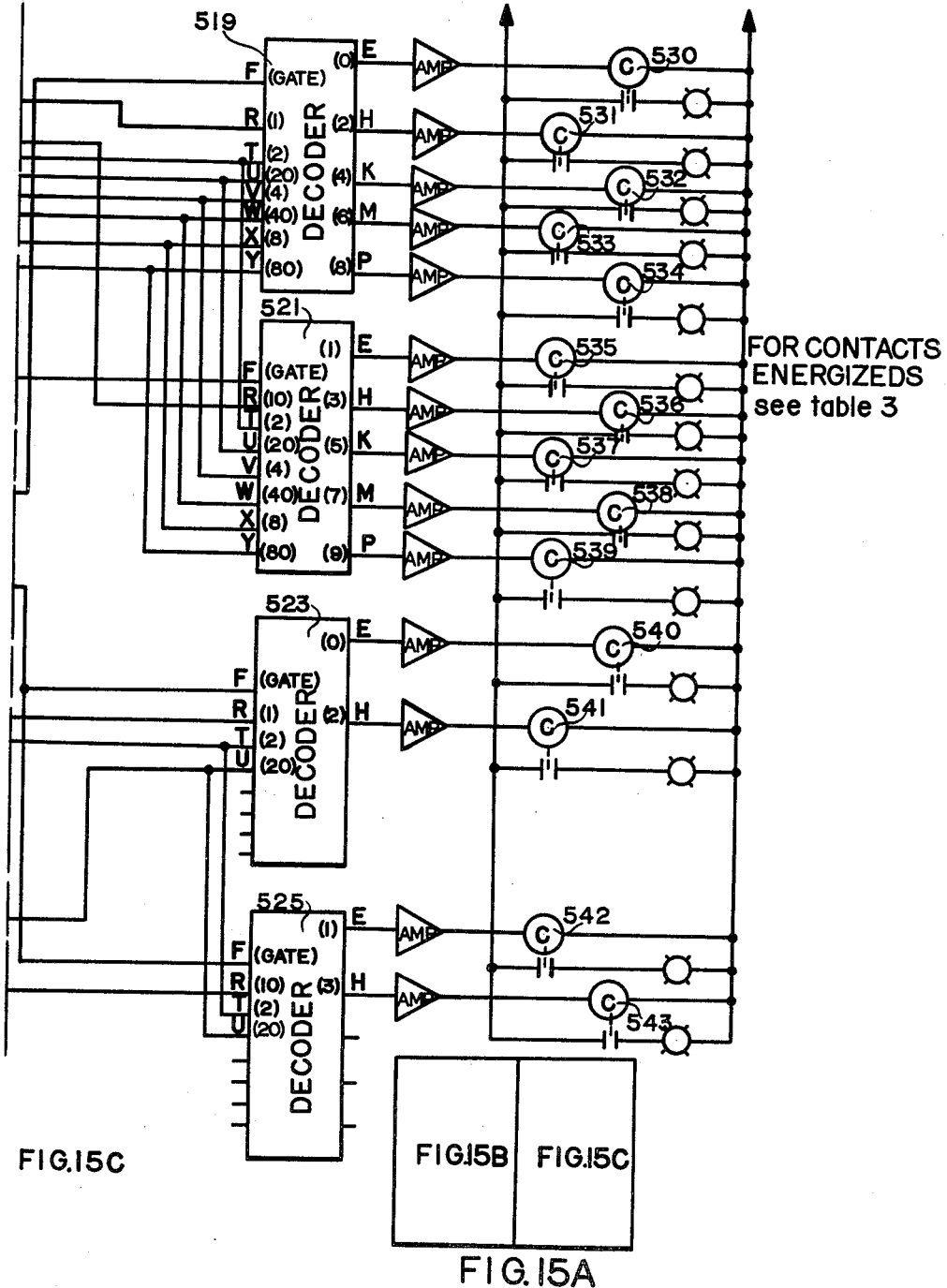

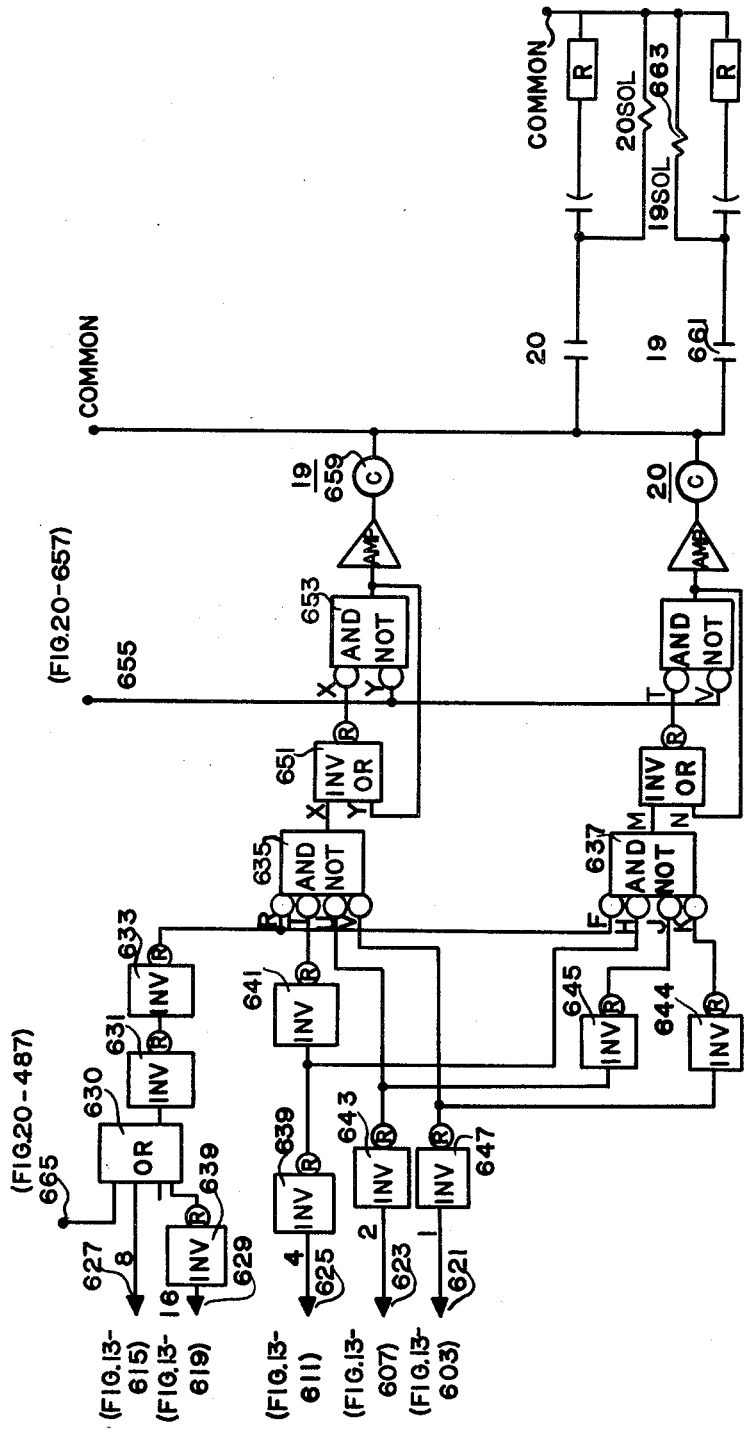

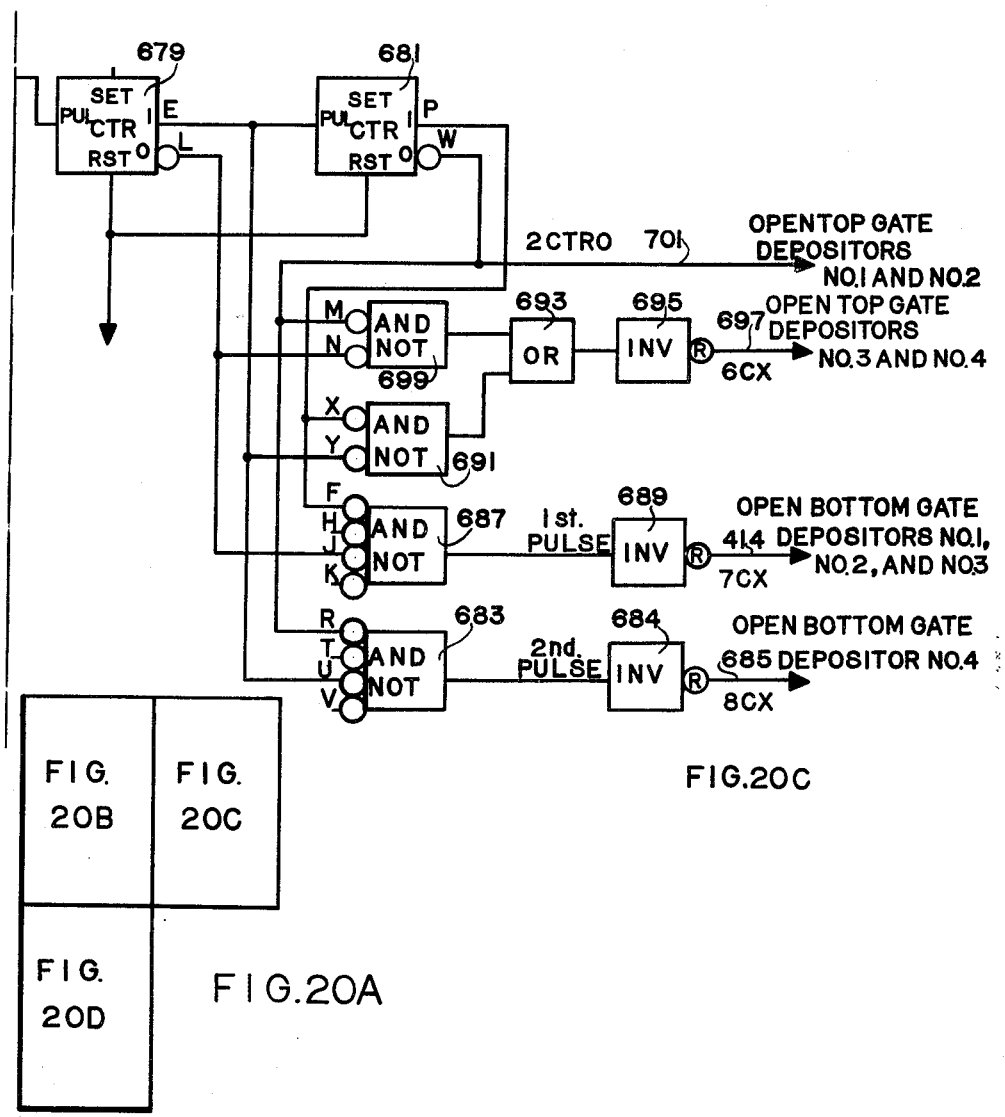

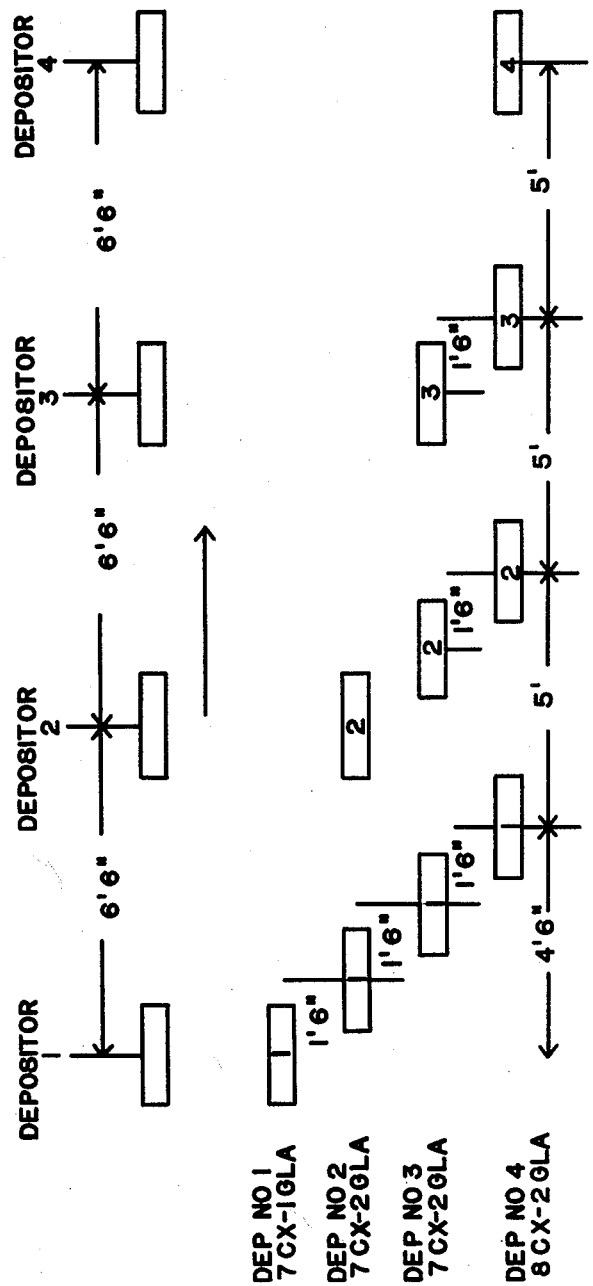

May 4, 1965   E. H. ABBE ETAL   3,181,713
ARTICLE HANDLING SYSTEM
Filed April 17, 1962   40 Sheets-Sheet 32
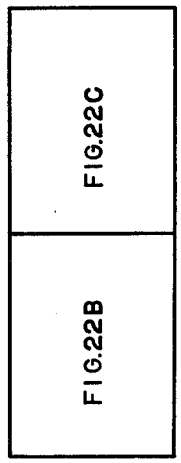
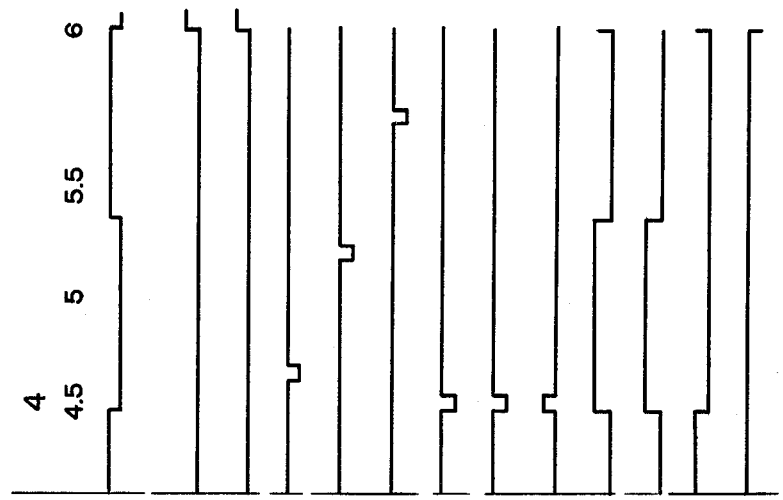

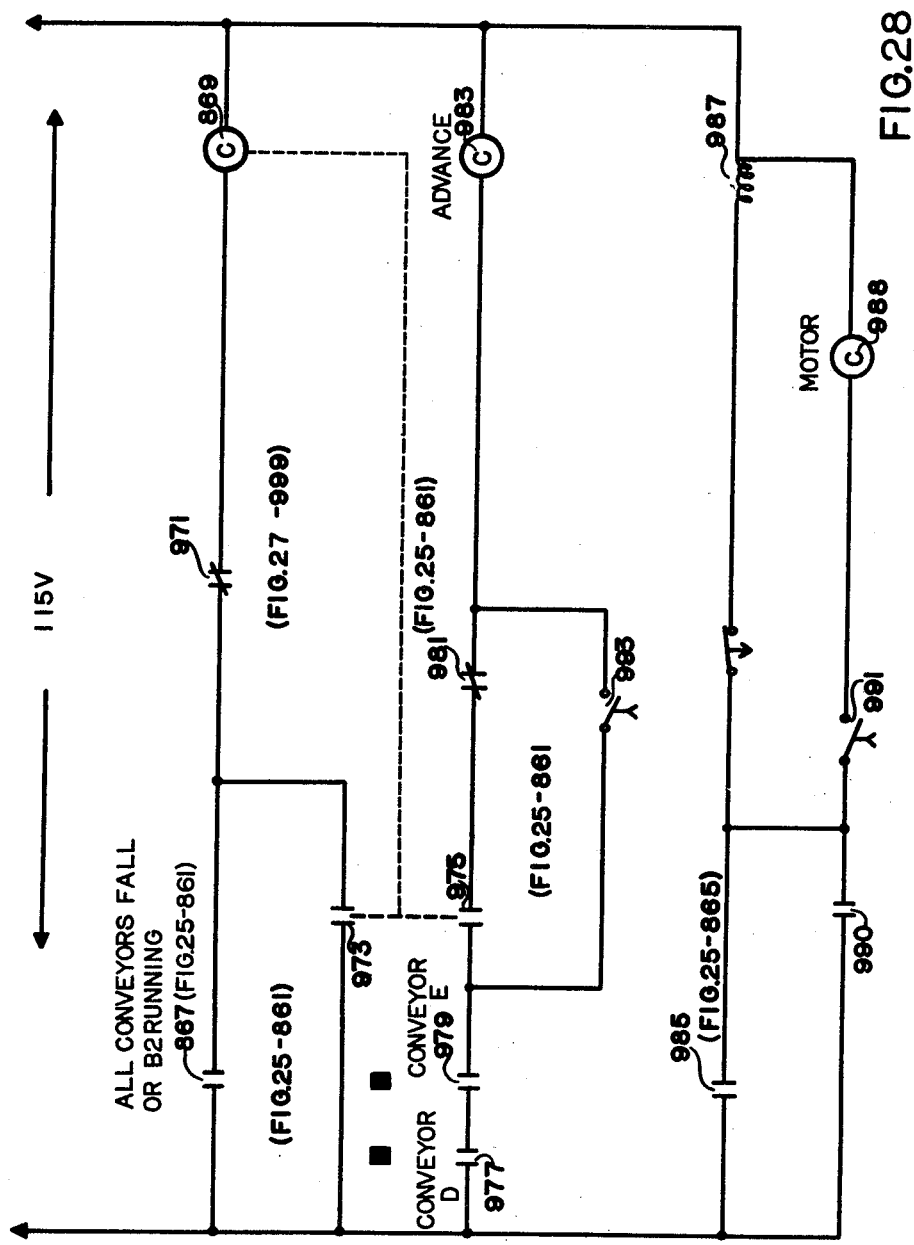

३,१८१,७१३
ARTICLE HANDLING SYSTEM
Edward H. Abbe, Max Berman, Arthur B. Blankenship, Jr., and Earl H. Sills, all of Roanoke, Va., assignors to General Electric Company, a corporation of New York
Filed Apr. 17, 1962, Ser. No. 188,175
4 Claims. (Cl. 214—11)

The invention is directed to a system for automatically handling articles. In the particular embodiment described in the specification the invention is embodied in an automated mailbag handling system. However, the invention may be utilized in handling many other articles as will become apparent.

Many automated article handling systems are in use throughout the world. In many of these article handling systems, the inflow of articles to be handled is not constant and at times peaks of incoming articles exceed the normal capacity of the article handling system. One specific example of an article handling system having such a problem is in a mailbag handling system wherein there are several sources of mailbags being introduced into the system. Generally mailbags enter the mailbag handling system in a railroad terminal from the post office in the local community, from inbound storage railroad cars, and from over-the-road trucks. The railroad operates the mailbag handling system in the railroad terminal and has no control of the mail inflow from the post office. During the peaks of incoming mailbags from the post office, the number of mailbags may increase beyond the normal capacity of the mailbag handling system operated by the railroad.

Herebefore in article handling systems, such as mailbag handling systems, one attempt to handle the peak loads of mailbags was to stop the inflow of articles at the source during peaks. This was only a partial solution and left the basic problem still unsolved of how to provide an article handling system capable of handling the peaks of incoming articles. Another partial solution was to design the mailbag handling system with sufficient capacity to handle the peaks. This was inefficient for during normal flow of mail into the mailbag handling system, the system was only partially utilized.

It is therefore an object of this invention to provide a new and improved article handling system capable of handling both the normal inflow and the peaks of inflow of articles efficiently.

Another object of this invention is to provide a new and improved article handling system for automatically handling peaks of incoming articles without stopping the inflow of articles.

Accordingly, all articles flowing into the article handling system are delivered to a slide. So long as the article handling system can handle the article flowing into the system, the slide delivers the articles directly to the article handling system. When the level of articles on the slide exceeds a predetermined level the flow of articles is diverted to a storage device. The overflow of articles may be stored in the storage device until the level of articles on the slide falls below a predetermined level and the article handling system can again accept articles; thereafter, the stored articles may be delivered to the slide and new articles can be delivered directly to the slide.

In this manner the article handling system can handle articles when the inflow of articles exceeds the normal capacity of the article handling system. As soon as the system can handle articles, they can again be delivered to the system. The inflow of articles is not stopped during peaks of inflow of articles.

In many article handling systems the articles such as mailbags are sorted as to destinations. The destinations are read from the articles and corresponding destination codes read into a shift register. The articles are then transferred to a sorting line, such as a conveyor, a chain, or a tray, and the article is moved in synchronism with the shifting of the corresponding destination code. When the destination code is shifted to a register corresponding to a discharge position, the destination code is examined and the corresponding article may be discharged at that discharge position if the destination code corresponds to that discharge position.

The articles such as mailbags are moved from a supply source and usually placed on a transfer mechanism prior to the reading of the destination code into a shift register. After the destination code has been read into the shift register, the corresponding article is transferred to the sorting line. Heretofore after the destination code had been read into the shift register, the article had to wait for a certain period of time before it was transferred to the sorting line, and a new article could not be selected from the supply source until the coded article had been transferred to the coding line.

Accordingly, it is an object of this invention to provide a new and improved transfer mechanism for an article handling system. It is another object of this invention that the transfer mechanism make provision for a coded article after it has been coded and before it is transferred to the sorting line.

Still another object of this invention is to provide a buffer storage for temporary storage of an article after its coding in a transfer mechanism.

According to this invention, a transfer mechanism is provided with a buffer storage so that after an article has been selected from the supply source and the destination code read into the transfer mechanism, the coded article may be temporarily stored in the buffer storage. After the coded article has been temporarily stored, it may be transferred to the sorting line. During the temporary storage of the coded article, another article may be selected from the supply source and preparation made for coding the new article.

In this manner the transfer mechanism may handle more articles at a faster rate.

In article handling systems having more than one transfer mechanism for transferring articles to a sorting line, the necessary separation between the articles on the moving sorting line may be different from the distance between the transfer mechanisms.

It is therefore another object of this invention to provide a new and improved article handling system for transferring articles from transfer mechanisms to a sorting line.

Accordingly, the article handling system is provided with a timing apparatus to cause the transfer mechanisms to transfer articles to the moving sorting line at predetermined times so that the separation between the articles is different from the separation between the transfer mechanism.

The invention is set forth with particularity in the appended claims. The principles and characteristics of the invention, as well as other objects and advantages are revealed and discussed through the medium of the illustrative embodiments appearing in the specification and drawings which follow.

Figure 6B:
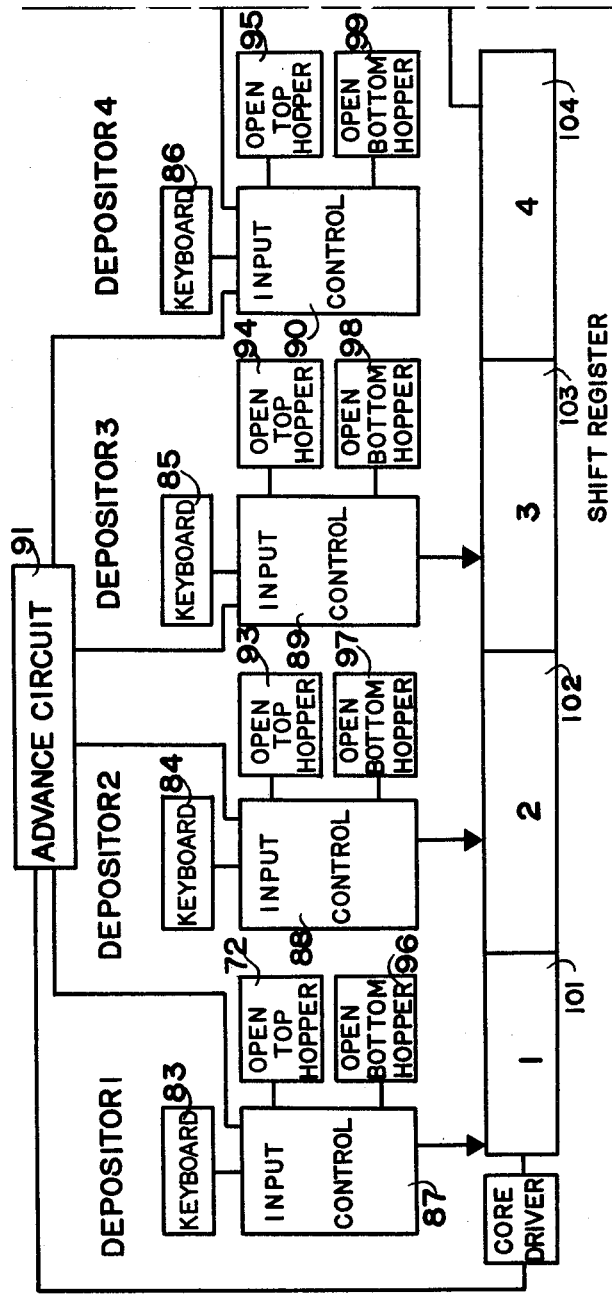
FIG. 6A shows how to place FIGS. 6B and 6C together.

FIGS. 6B and 6C, when placed together as shown in FIG. 6A, show a block diagram of the sorting portion of the mailbag handling system.

FIG. 7 is a timing chart showing the various times that portions of the sorting portion of the mailbag handling system operate.

FIG. 8 shows the symbols used in the detailed description of the mailbag handling system.

Figures 9A, 9B, 9C:
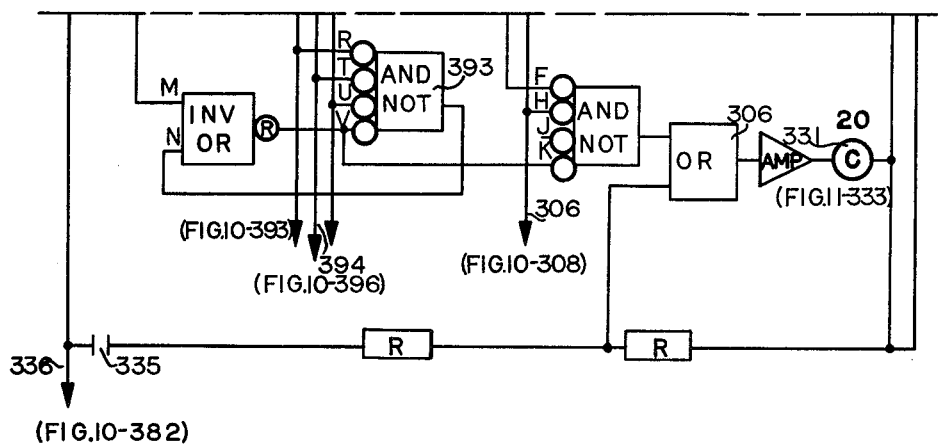

FIG. 9A shows how to place FIGS. 9B and 9C together.

FIGS. 9B and 9C, when assembled as shown in FIG. 9A, show the selection circuitry for the tens position of a coding station.

Figure 10B:
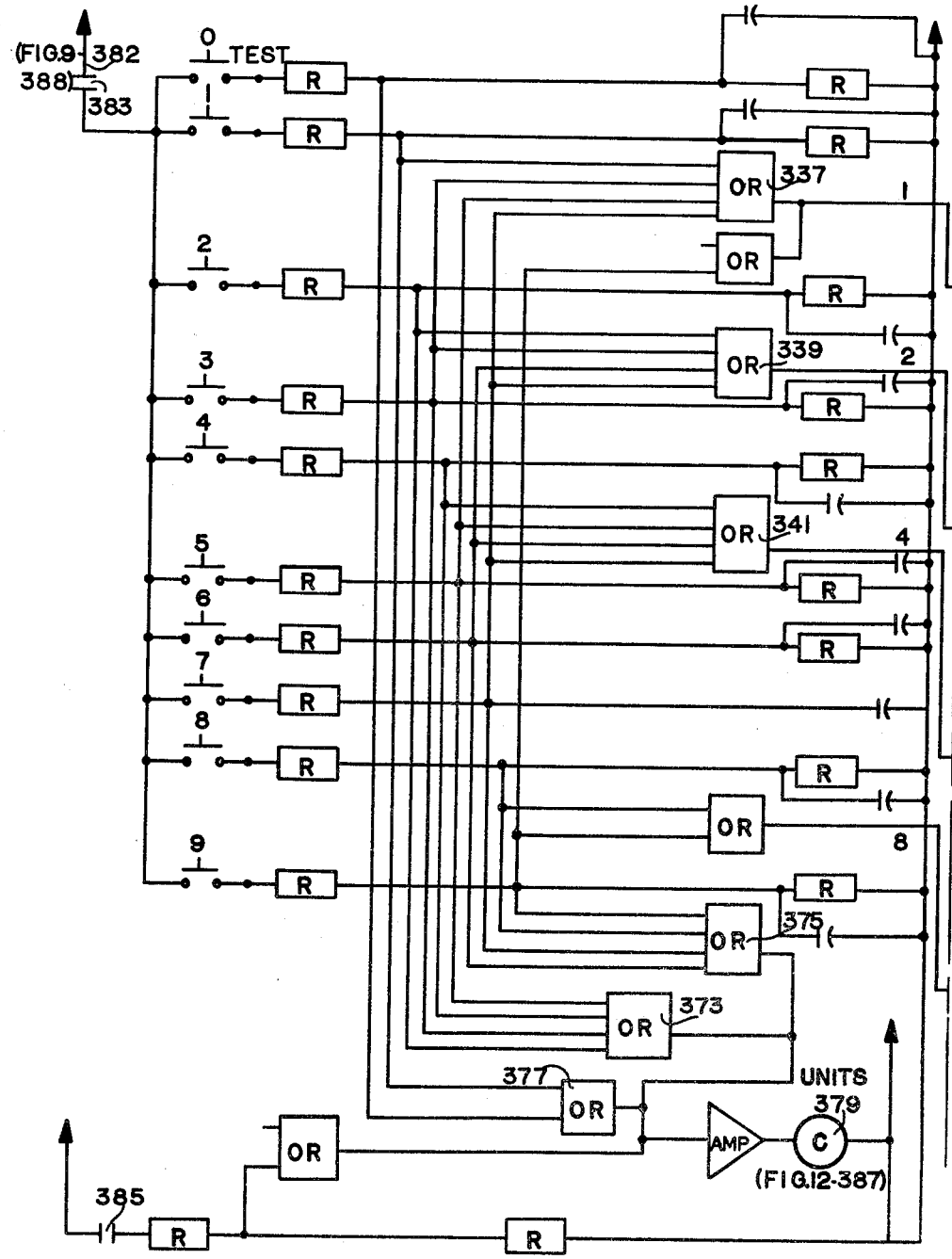
Figure 10C:
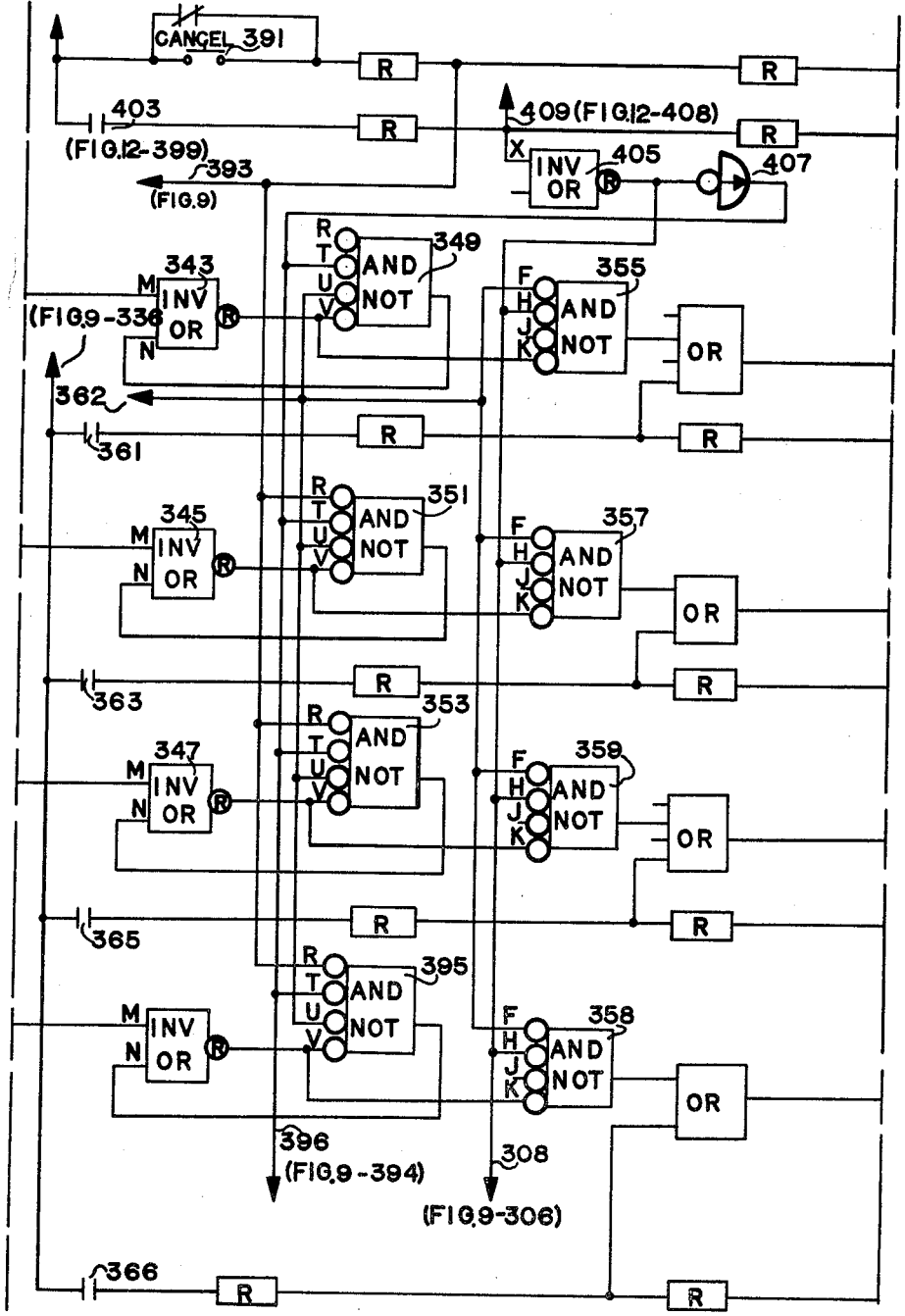

FIG. 10A shows how to place FIGS. 10B, 10C and 10D together.

FIGS. 10B, 10C and 10D, when assembled as shown in FIG. 10A, show the selection circuitry for the units position of a coding station.

Figure 11:
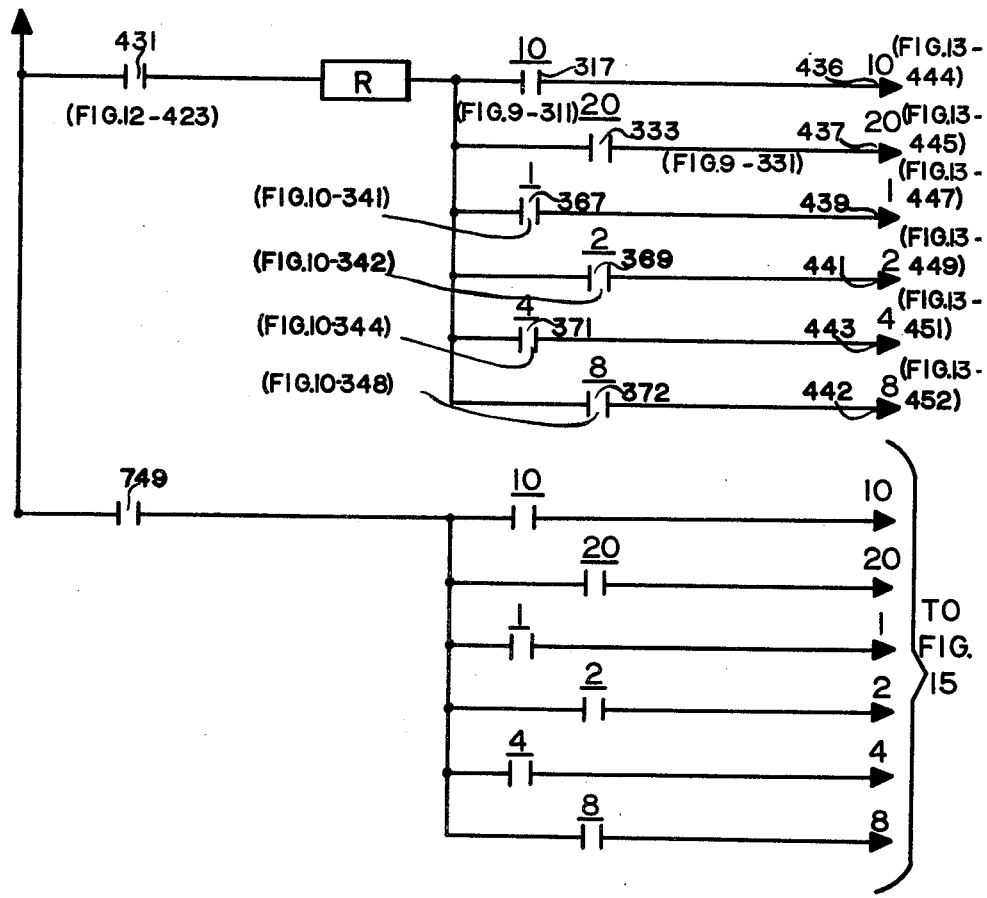

FIG. 11 shows the contacts controlled by the coding stations.

Figure 12:
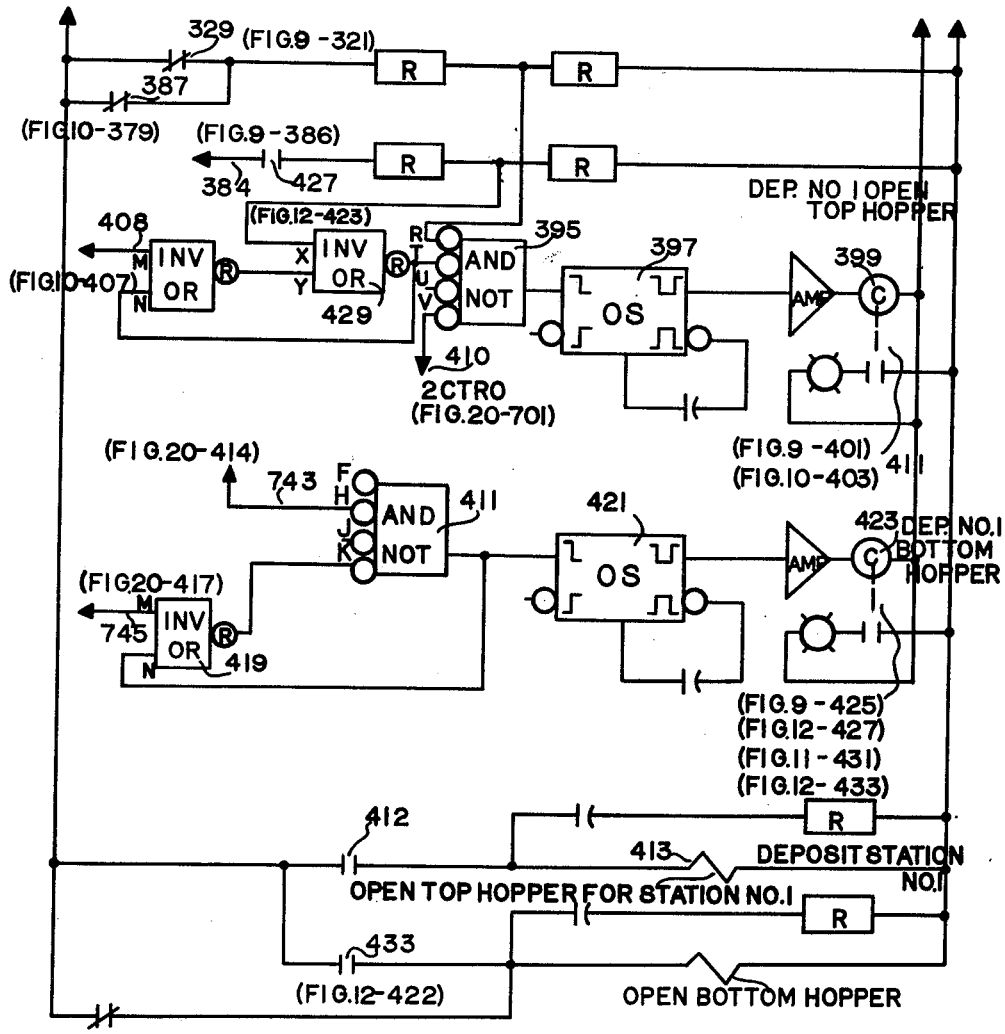

FIG. 12 shows the controls for causing the top and bottom hoppers of the depositor to open.

FIG. 13A shows how to assemble FIGS. 13B and 13C.

FIGS. 13B and 13C, when assembled as shown in FIG. 13A, is a schematic of the shift register circuits.

FIG. 14 shows the driver circuits for the shift register circuits shown in FIGS. 13B and 13C.

Figure 15B:
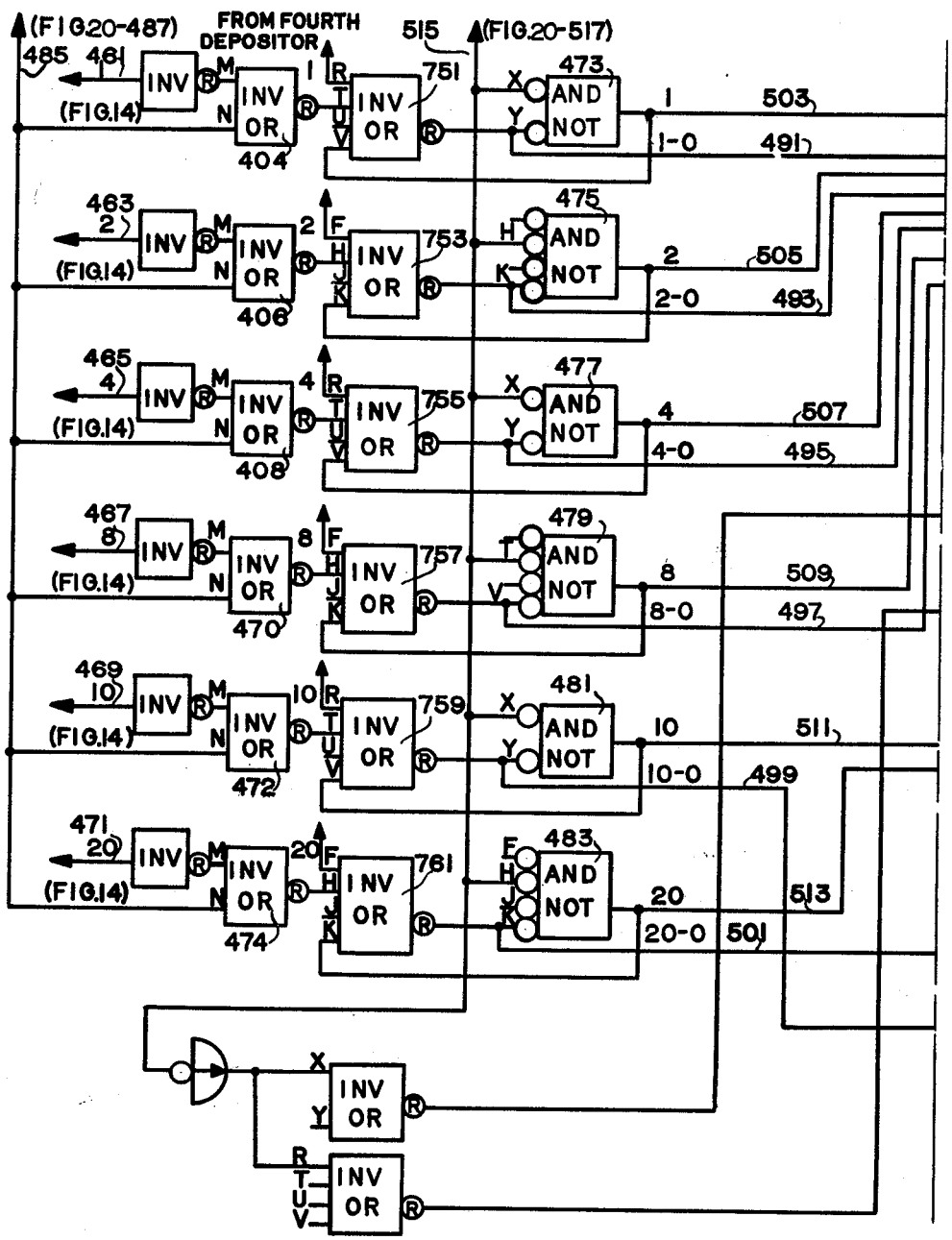

FIG. 15A shows how to put FIGS. 15B and 15C together.

FIGS. 15B and 15C, when assembled as shown in FIG. 15A, show a schematic of the binary decimal to decimal converter.

Figure 16C:
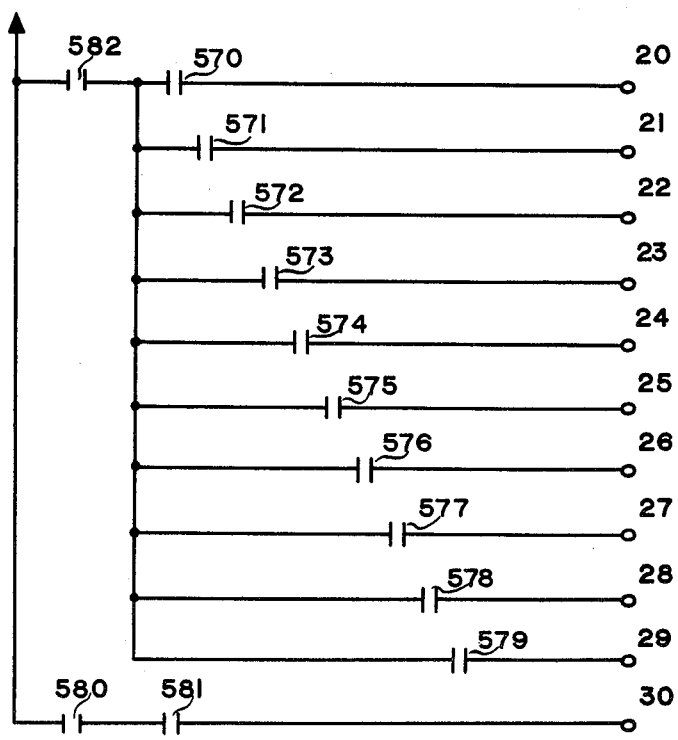
Figure 16A:
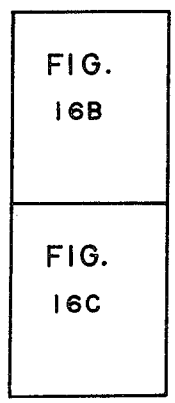
Figure 16B:
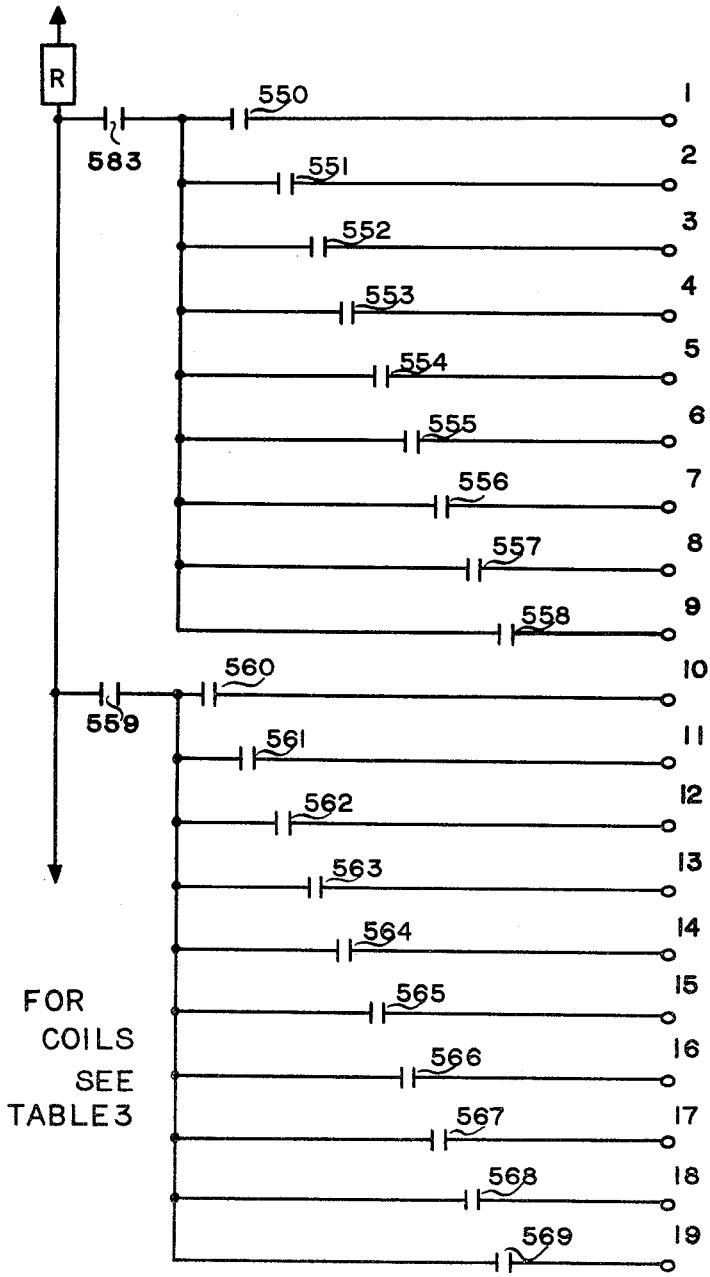

FIG. 16A shows how to assemble FIGS. 16B and 16C.

FIGS. 16B and 16C, when assembled as shown in FIG. 16A, show the contacts closed by the binary decimal to decimal converter.

Figure 17:
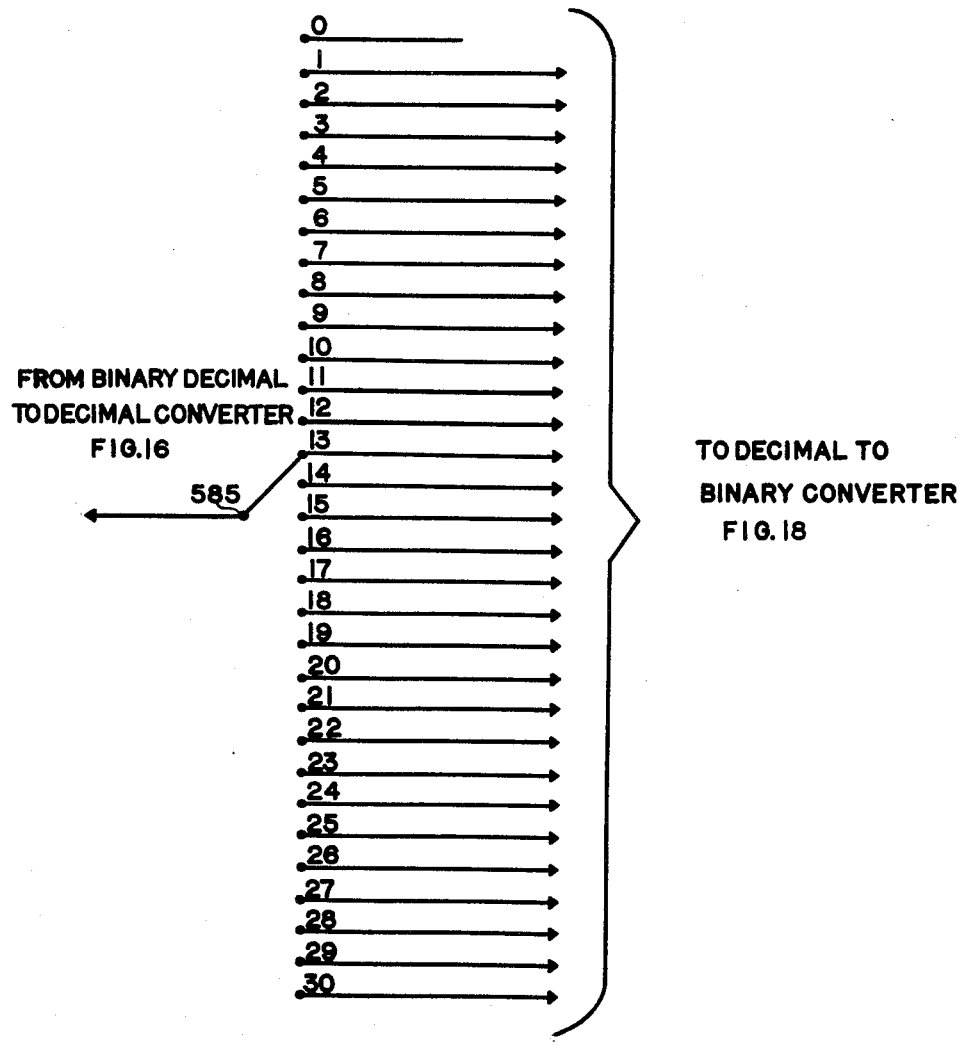

FIG. 17 is a schematic of a typical sorting code selector.

Figure 18D:
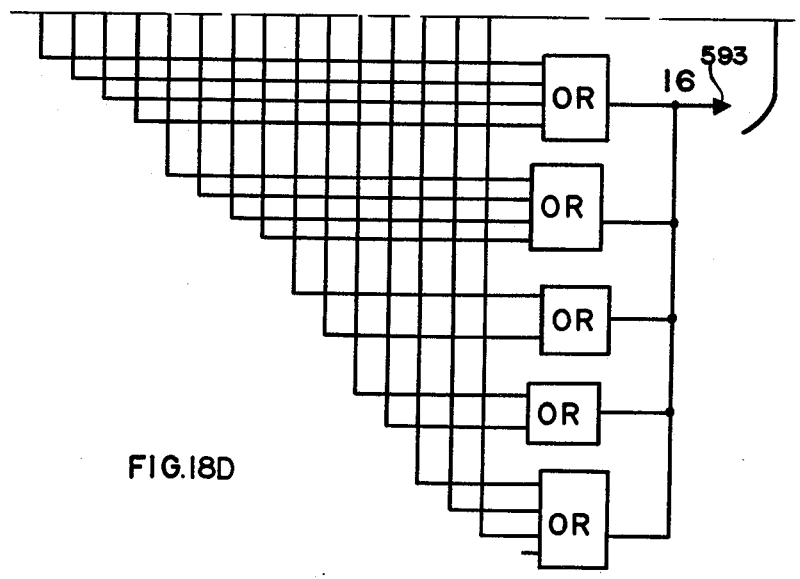
Figure 18A:
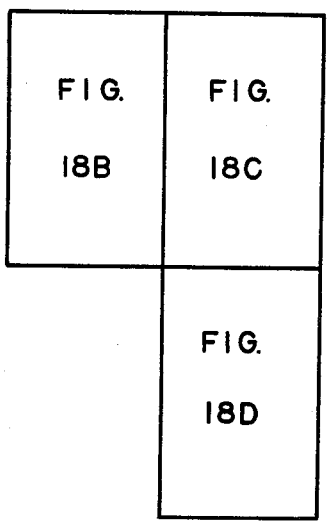
Figure 18B:
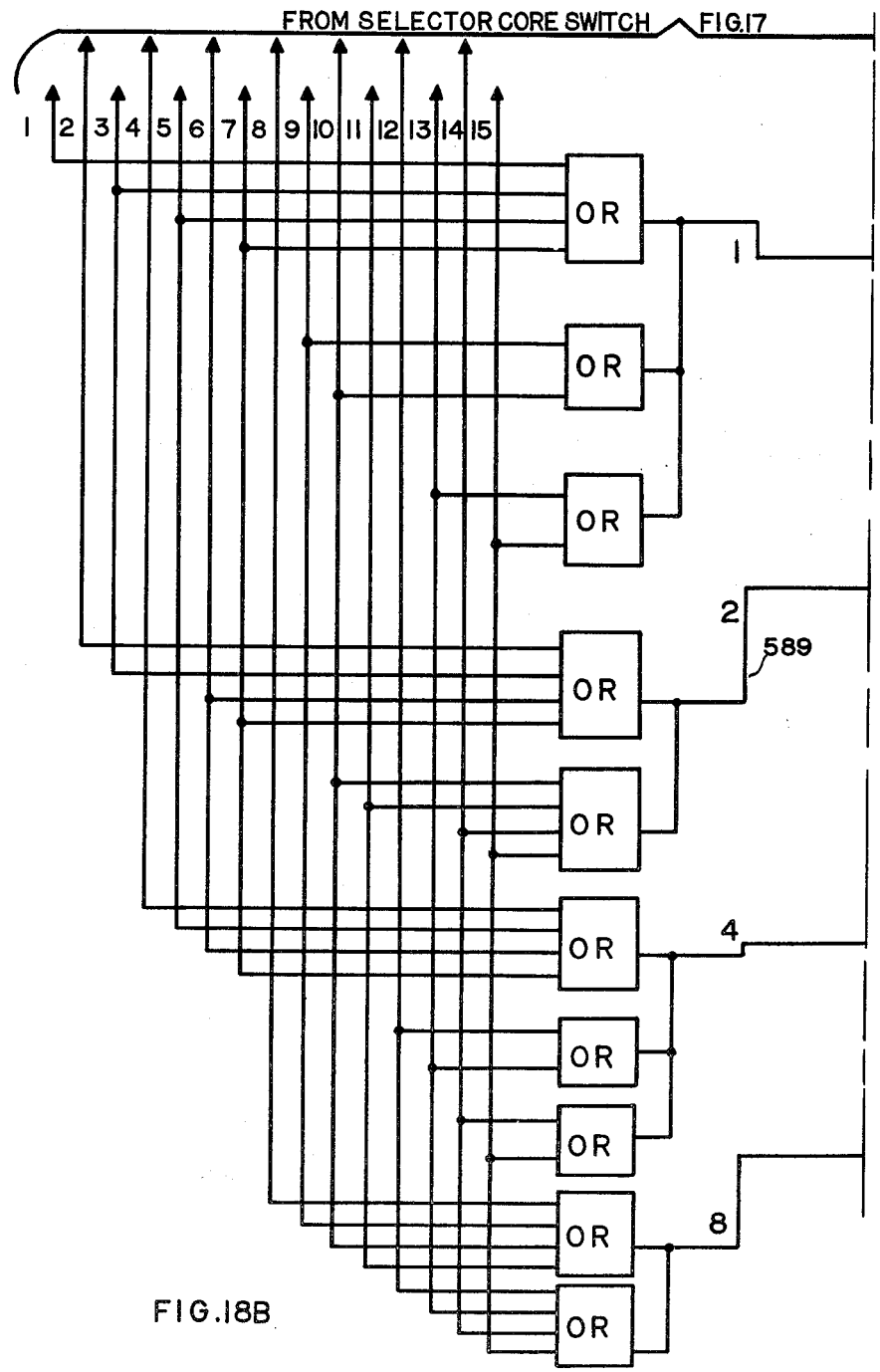
Figure 18C:
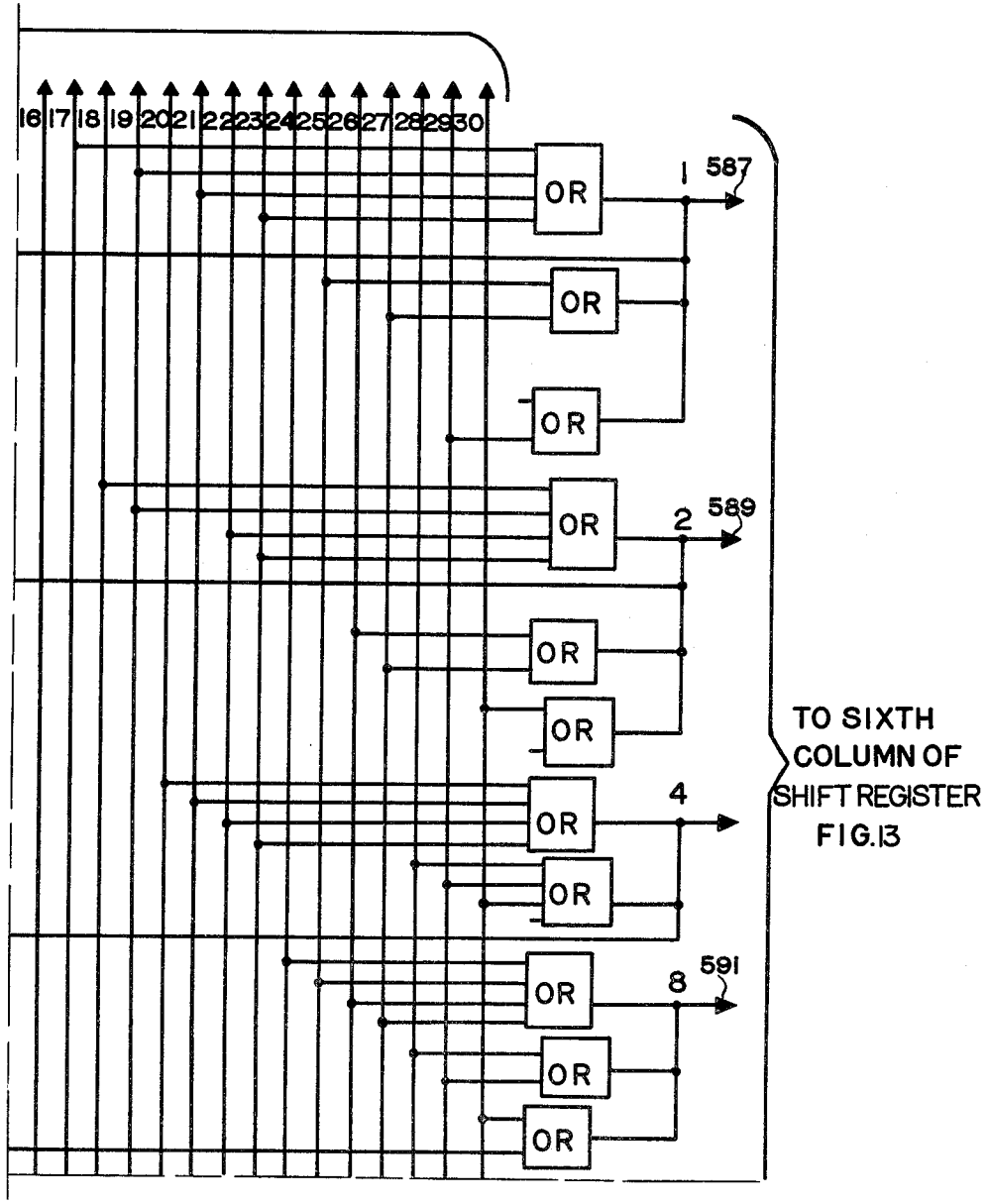

FIG. 18A shows how to assemble FIGS. 18B, 18C and 18D.

FIGS. 18B, 18C and 18D, when assembled, show the decimal to binary converter.

FIG. 19 is a schematic of the diverter actuator circuitry.

Figure 20B:
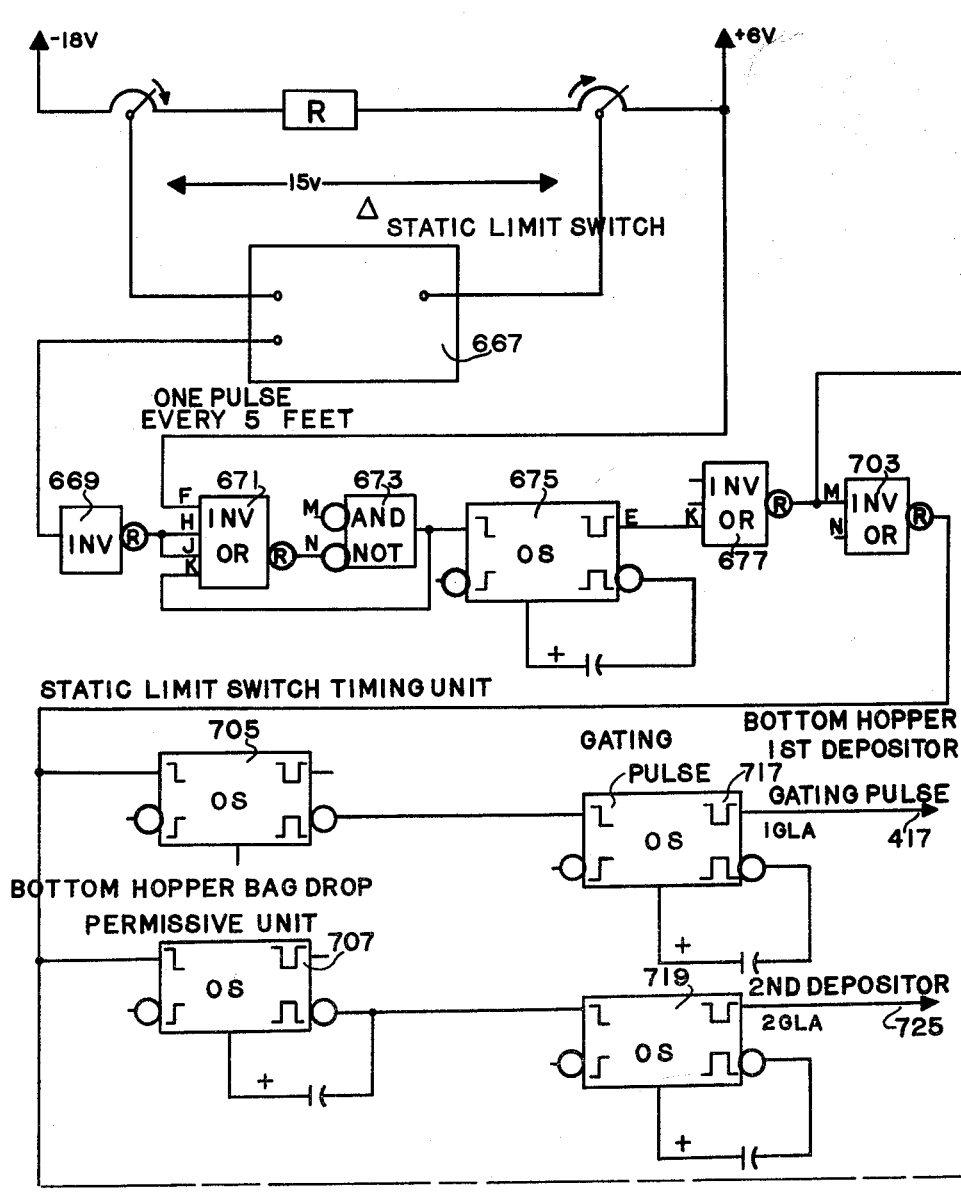
Figure 20D:
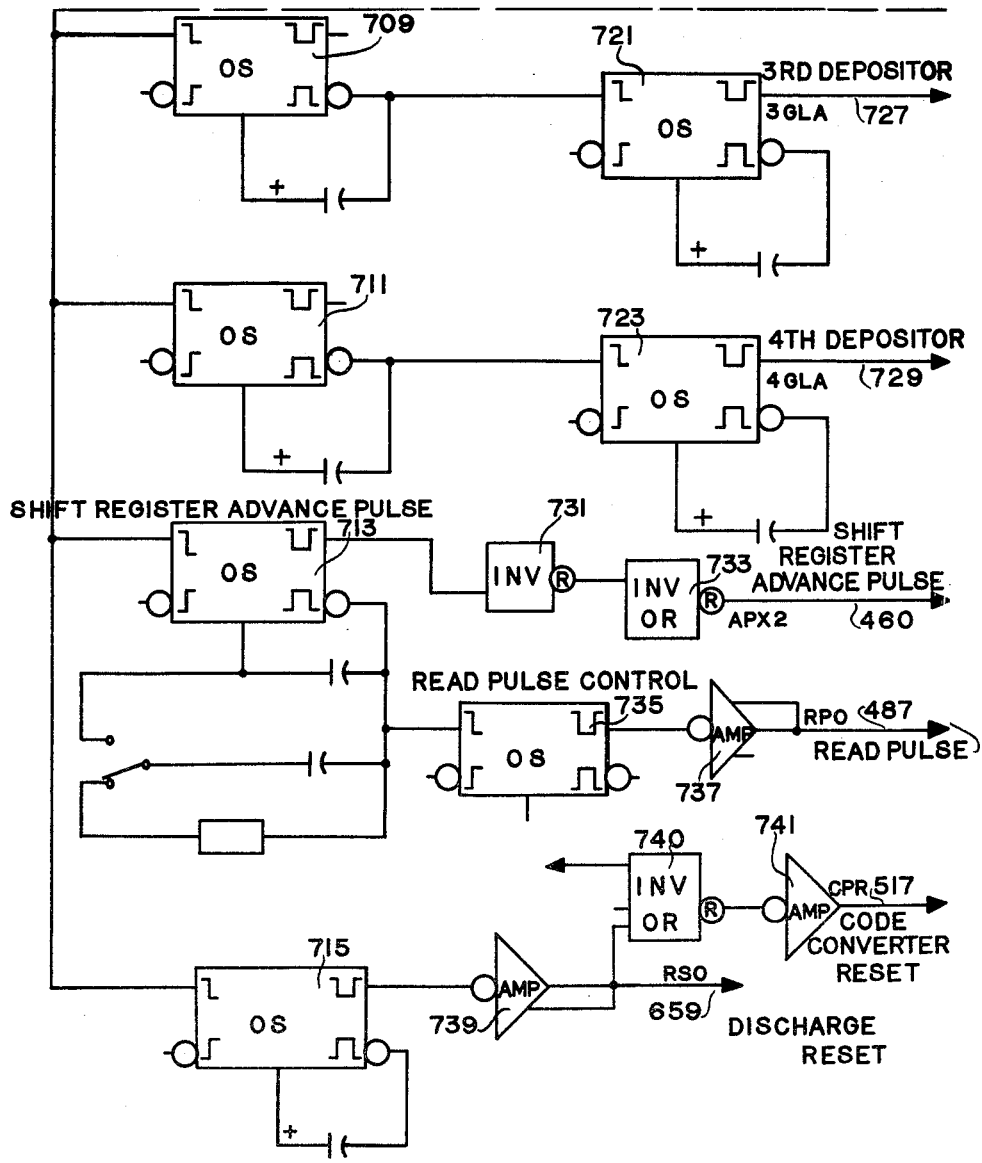

FIG. 20A shows how to assemble FIGS. 20B, 20C and 20D.

FIGS. 20B, 20C and 20D, when assembled as shown in FIG. 20A, show the advance circuits.

FIG. 21 is a timing diagram showing the transfer of articles from the 6'6" centers of the depositors to the 5' centers of the sorting conveyor.

Figure 22B:
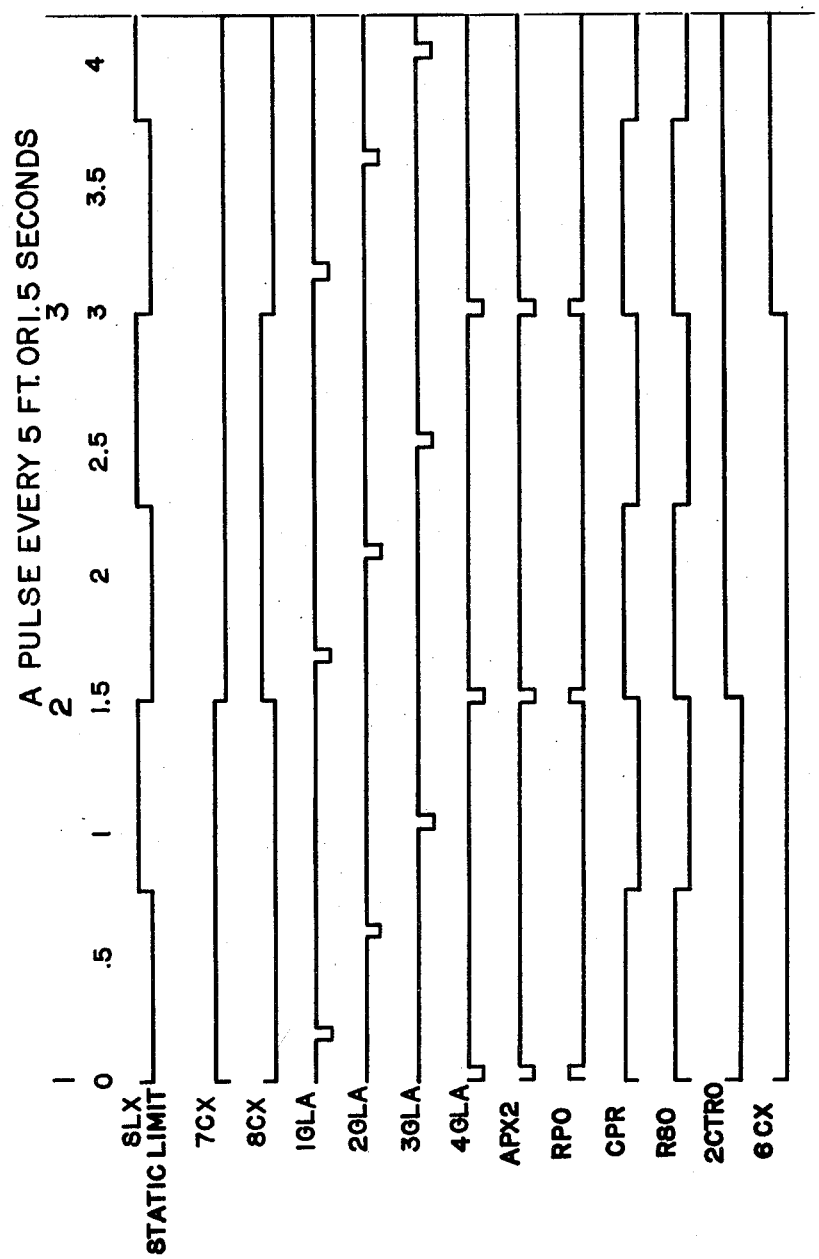

FIG. 22A shows how to assemble FIGS. 22B and 22C.

FIGS. 22B and 22C, when assembled as shown in FIG. 22A, is a timing diagram showing the signals produced by the advance circuits.

Figure 23:
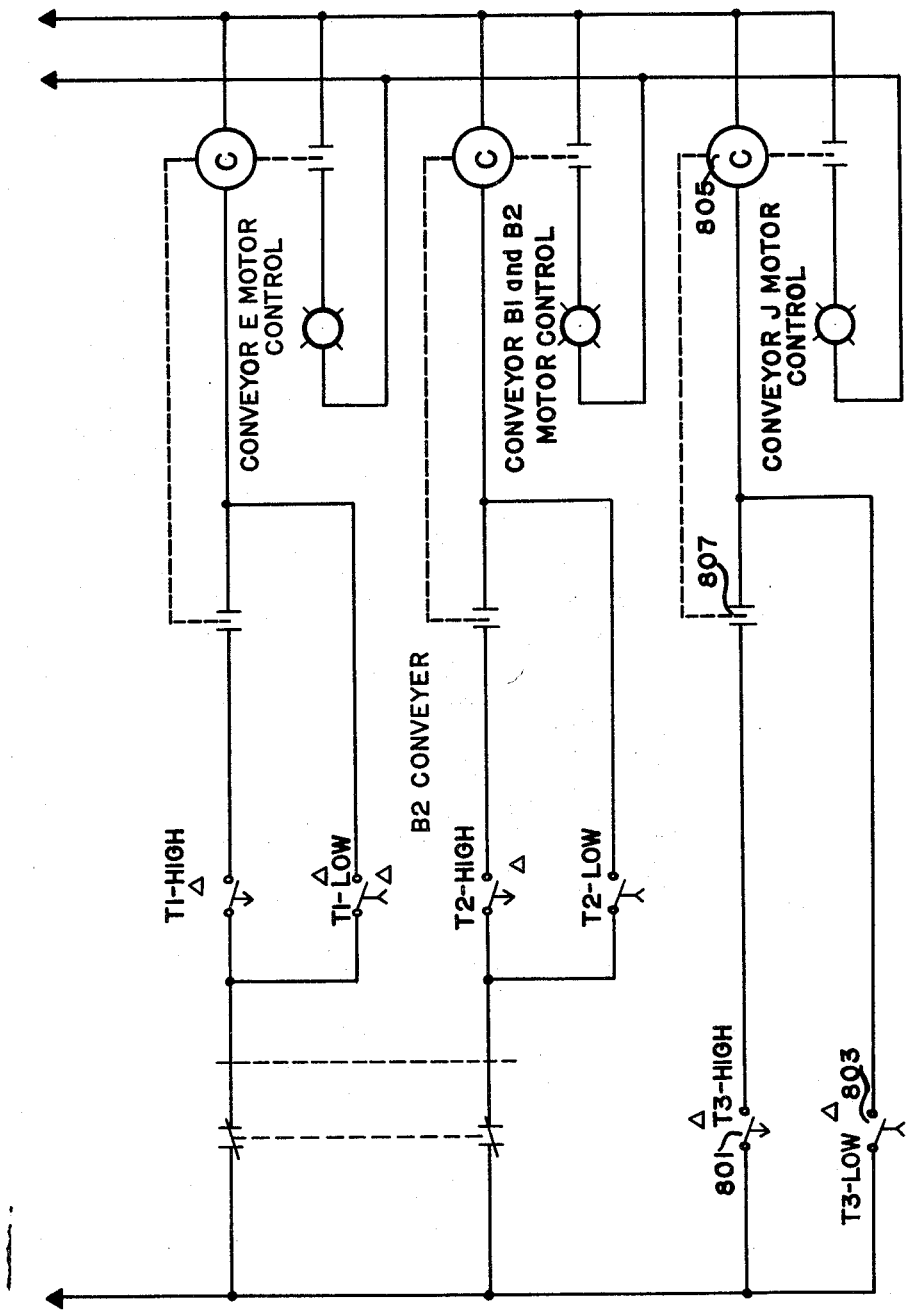

FIG. 23 shows the control circuits from the high and low levels of the presort metering slide.

Figure 24:
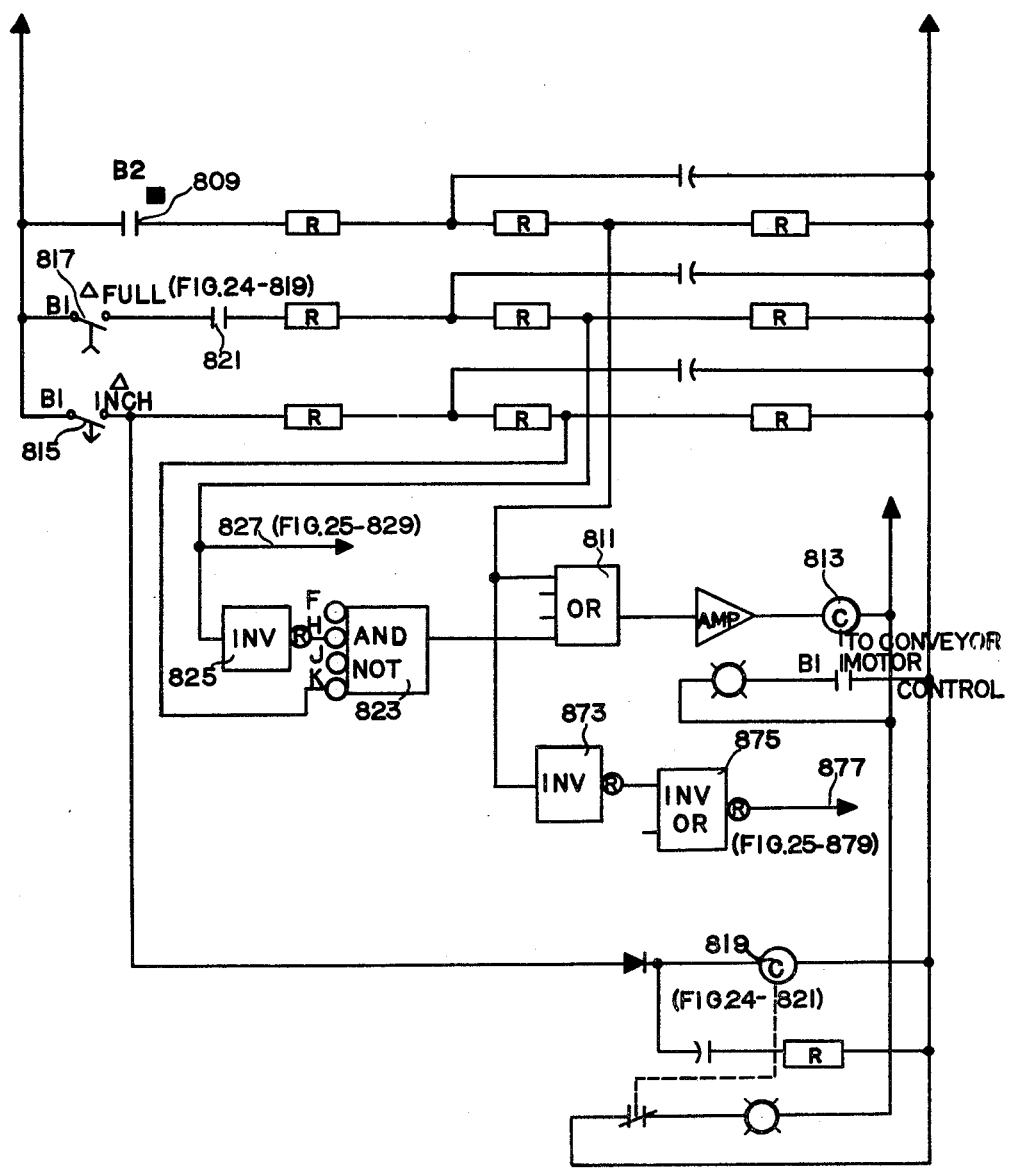

FIG. 24 shows the storage conveyor control logic.

Figure 25C:
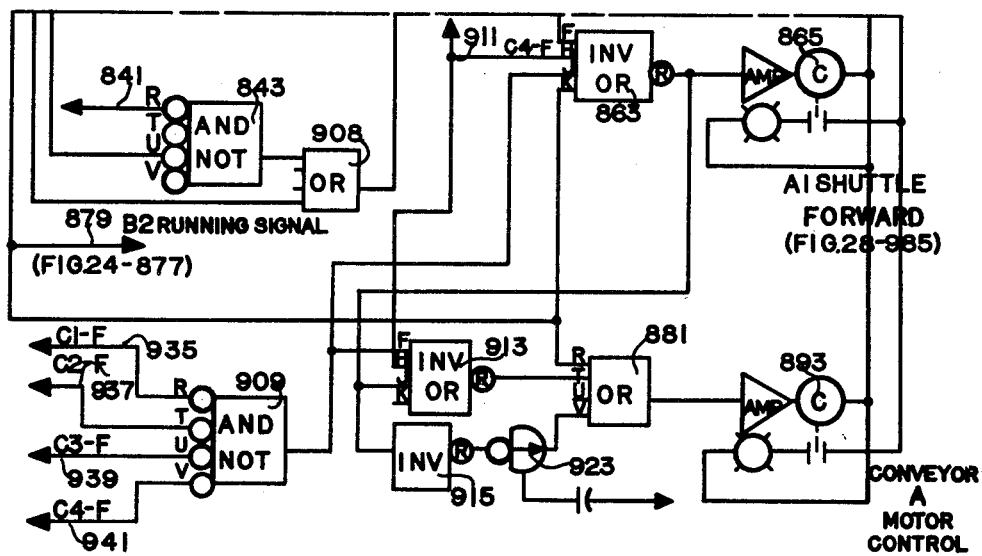
Figure 25A:
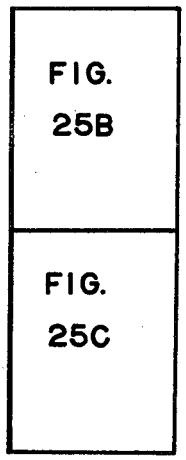
Figure 25B:
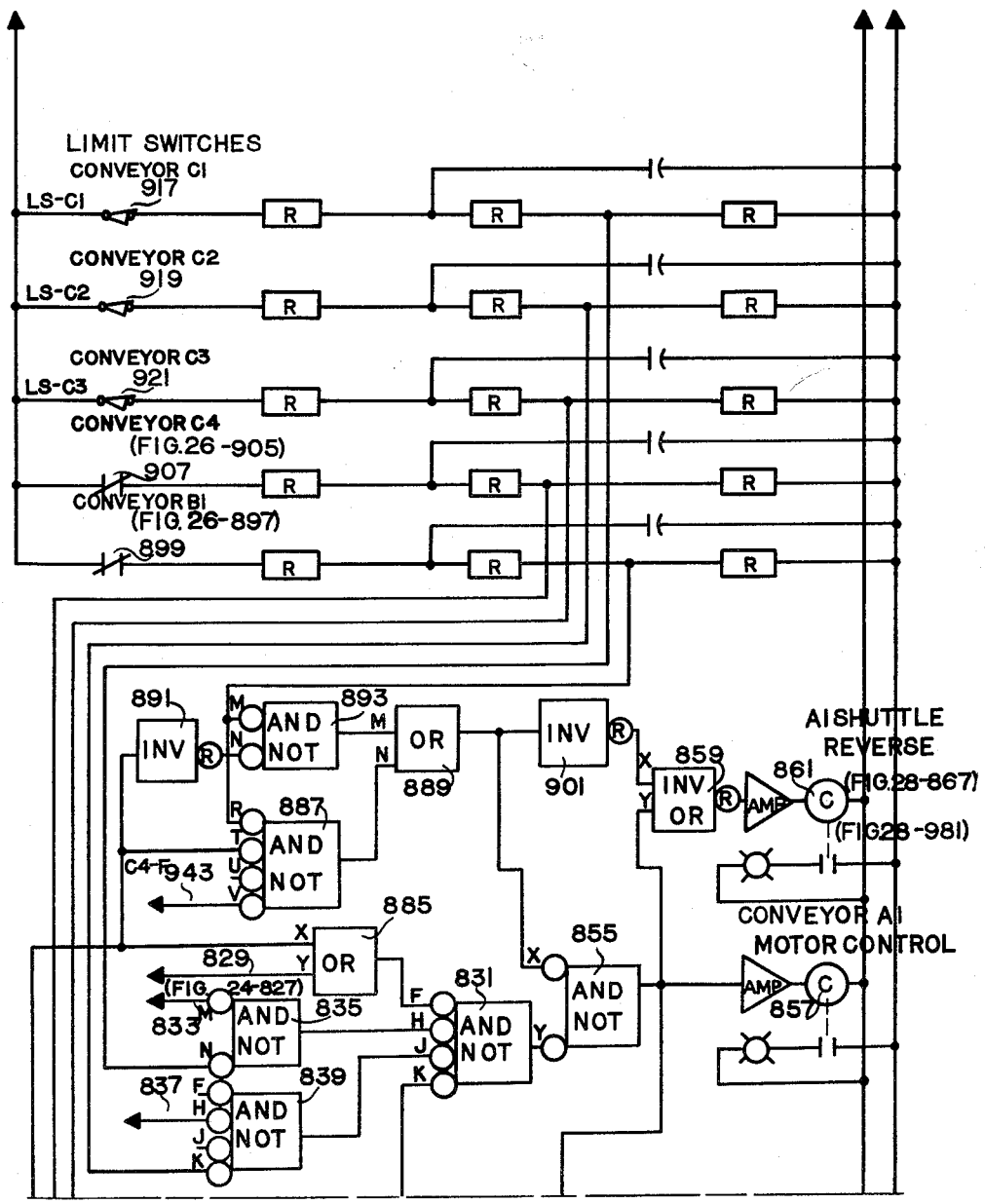

FIG. 25A shows how to assemble FIGS. 25B and 25C.

FIGS. 25B and 25C, when assembled as shown in FIG. 25A, show A1 shuttle control logic.

Figure 26:
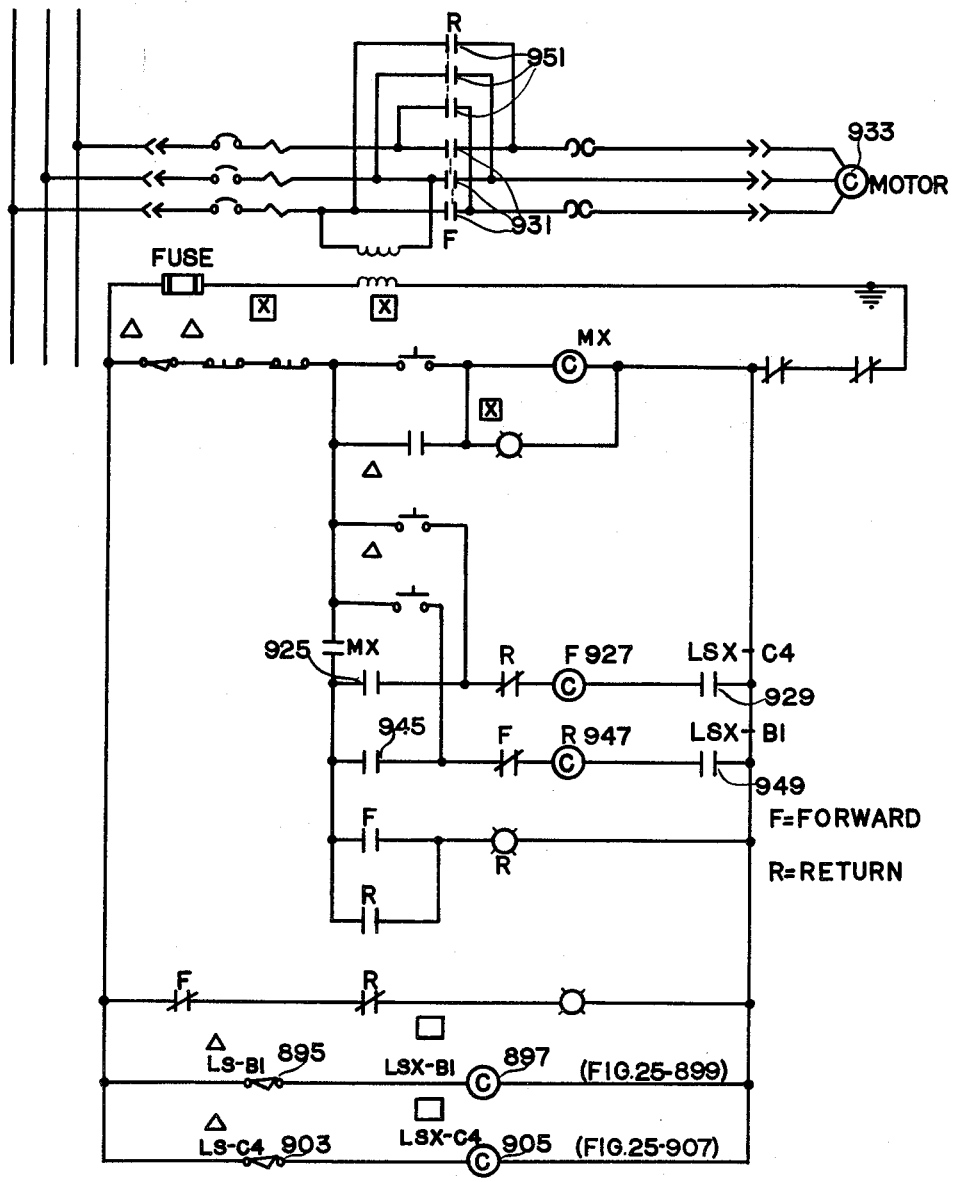

FIG. 26 shows the motor control for the A1 shuttle.

Figure 27:
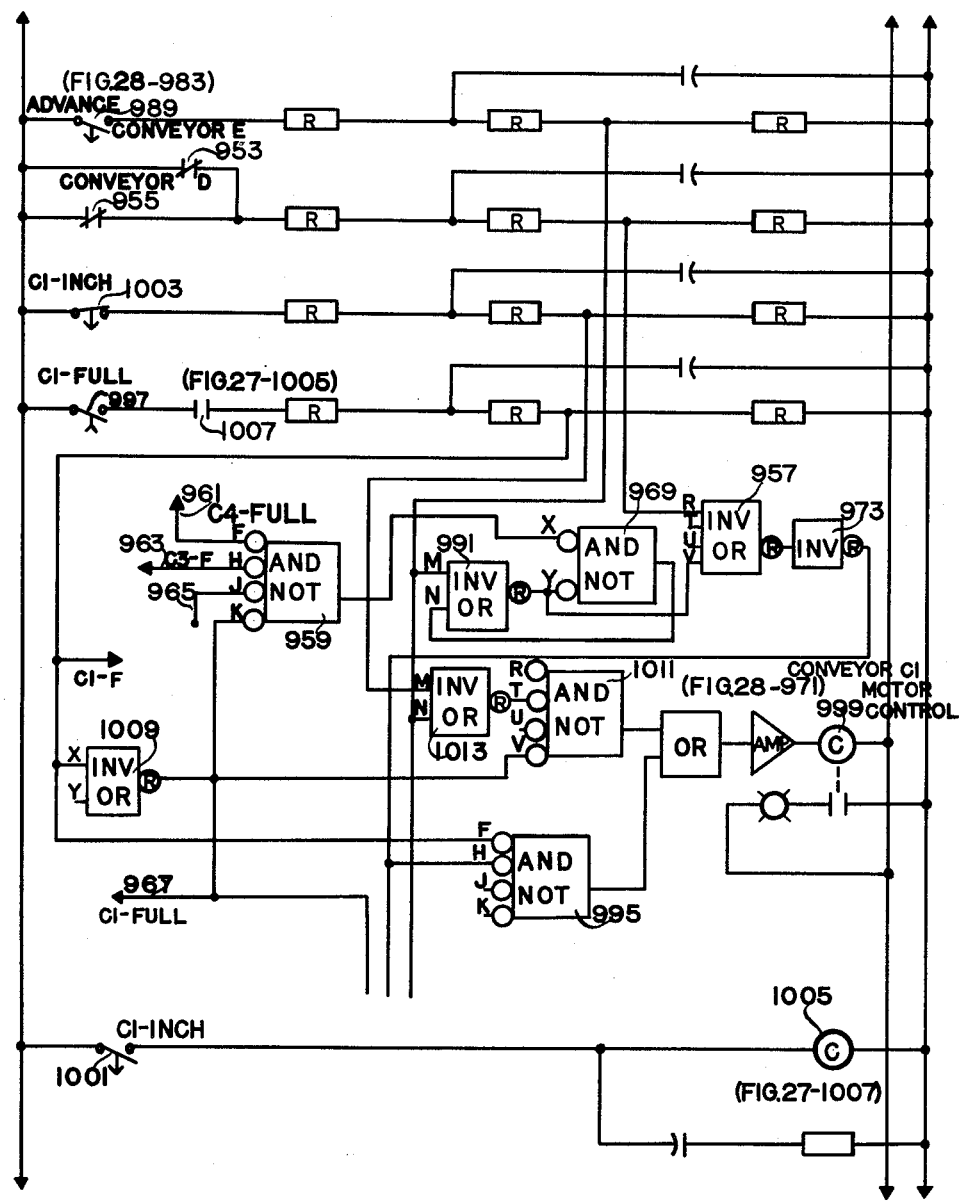

FIGS. 27 and 28 show the controls for emptying the storage conveyor.

GENERAL SYSTEM DESCRIPTION

Mailbags may be introduced into the mailbag handling system from either the post office, incoming storage railroad cars, or over-the-road trucks. Mailbags from the post office and over-the-road trucks are delivered to conveyor A in FIG. 1 and normally flow over conveyor A, conveyor A1, conveyor B1 and conveyor B2 to the presort slide 30. The presort slide is shown in more detail in FIG. 2. The presort slide 30 is an inclined plane with the mailbags delivered to the high end from conveyors E, B2 and J2. The mailbags slide down to the low end and are removed automatically by conveyors T1–T4. The mailbags are delivered to conveyor P1 from conveyors T1–T4 and flow over conveyor P1, conveyor P2 and conveyor P2A to the presentation conveyor P3. The four conveyors P1, P2, P2A and P3 comprise the presentation system for presenting the mailbags for coding and are speed-up conveyors to give proper separation to the individual mailbags. Conveyor P2 runs faster than conveyor P1, conveyor P2A runs faster than conveyor P2, and conveyor P3 runs faster than conveyor P2A. The mailbags will be delivered to the first presentation conveyor P1 closely packed, and the speed-up of the different conveyors will distribute the mailbags in a single layer on the presentation conveyor P3.

Four coding stations 31–34 are shown. The mailbags are guided from the presentation conveyor P3 onto a depositor which is shown in more detail in FIG. 4. The destination tag on each mailbag is read and the proper destination code is entered into the depositor. Each depositor has a top hopper and a bottom hopper. After the mailbag is placed on the top hopper and the destination code is entered into the depositor, the mailbag is transferred to the bottom hopper of the depositor. At predetermined times, the bottom hoppers of the depositors open to deposit the mailbags onto the sorting conveyor F. The mailbags move on the sorting conveyor in synchronism with the movement of the corresponding destination code in a shift register. The destination code is examined in synchronism with the movement of each mailbag past each discharge station to determine if the corresponding mailbag is to be discharged at that discharge station. If the mailbag is to be discharged, a diverter 42 is actuated to remove the mailbag from the sorting conveyor.

Figure 1:
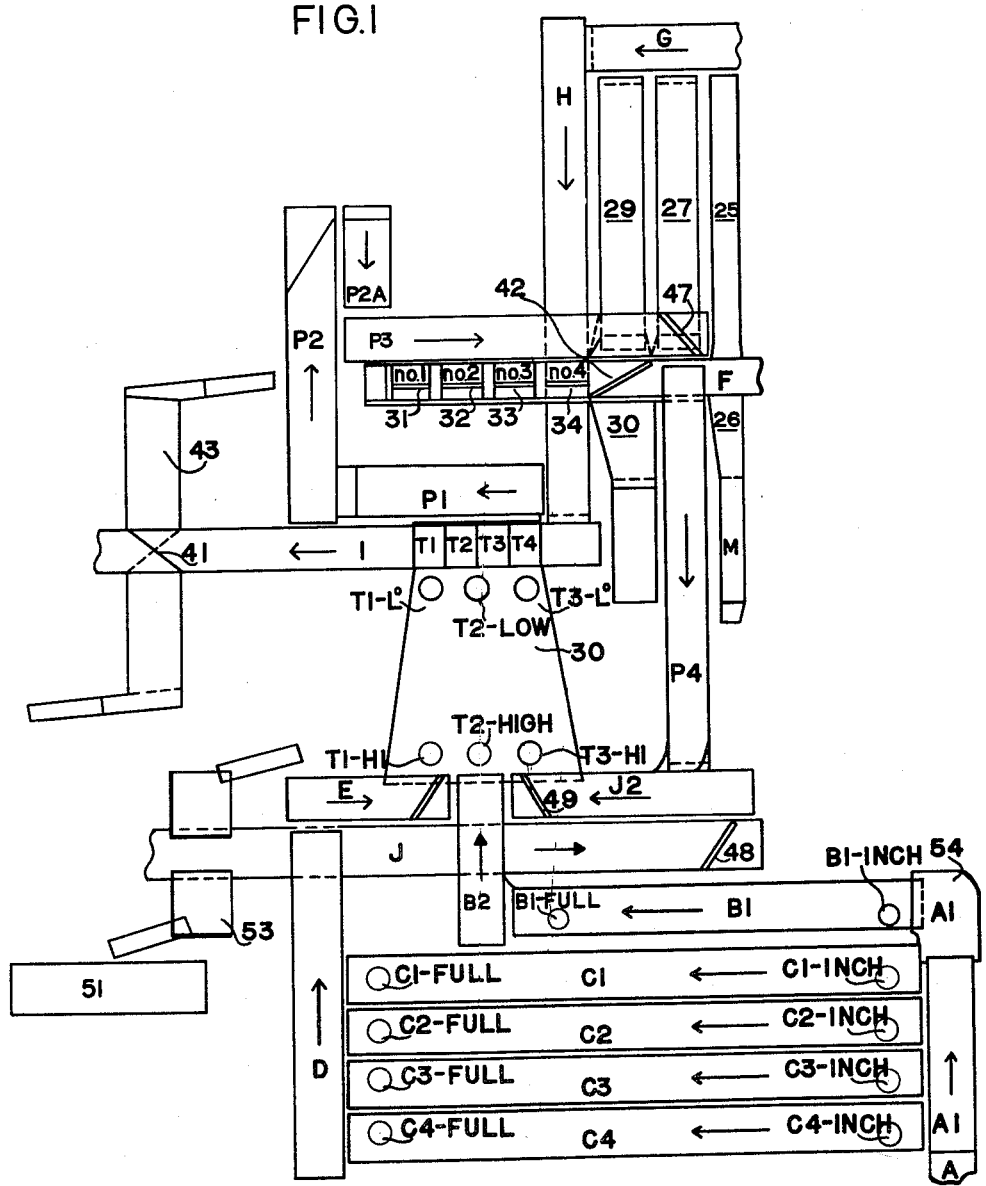
FIG. 1 shows a diagrammatic layout of the mailbag handling system.

The system may have many discharge stations with mailbags diverted to either side to one of twice as many diverter destinations. Half of the diverter destinations are storage conveyors which act as post-sort storage. In FIG. 1 only 3 discharge stations with six diverter destinations are illustrated. The mailbags for particular destinations are accumulated on the storage belts. When the accumulated mailbags are to be loaded into an outgoing storage railroad car for a particular destination, movable diverters 41 are positioned on outgoing conveyor I and a chute is positioned to remove the mailbags diverted by movable diverter 41 from outgoing conveyor I and deliver the mailbags to the outgoing storage railroad cars. Then the mailbags for that storage car, which have been accumulated on the storage belt, are released by running the storage belt. The released mailbags move as a group along removal conveyor G, conveyor H, and conveyor I to the diverter 41, where they are diverted to movable chute 43 and delivered to the outgoing storage railroad car.

Other diverter destinations divert mailbags from the sorting conveyor F through chutes to over-the-road mailbag trucks or to local mail trucks.

One of the diverter destinations, 26, diverts mailbags from the sorting conveyor F to conveyor M where the mailbags are delivered to the post office.

Mailbags which are not removed from the presentation conveyor P3 and guided to the coding stations are diverted from the presentation conveyor P3 by a fixed diverter 47 to conveyor P4, moved to conveyor J2, and diverted by diverter back to the presort slide 30 for another pass through the sorting system.

Mailbags from an incoming storage railroad car 51 are delivered to incoming conveyor J by movable chute 53, and moved on conveyor J until diverted by diverter 48 to conveyor J2, and delivered to the presort slide 30. After delivery to the presort slide 30, the mailbags travel through the sorting system in the same manner described with respect to the mailbags from the post office.

The mailbags do not flow into the mailbag handling system in an even flow. At times the flow of mail into the system is above the capacity of the system, and the mailbags cannot be coded and sorted as fast as they are received by the system. A presort storage system for automatically storing mailbags above the normal capacity has been provided.

All mailbags introduced into the system must pass over the presort slide 30 (FIG. 1). The presort slide is provided with three sets of sensors to sense the level of the mailbags on the presort slide below the three positions at which mailbags are delivered to the presort slide 30. Sensors T1–LOW and T1–HIGH sense the level of the mailbags on the presort slide below the position at which mailbags are delivered from conveyor E. Sensors T2–LOW and T2–HIGH sense the level of the mailbags on the presort slide below the position at which mailbags are delivered from conveyor B2; and sensors T3–LOW and T3–HIGH sense the level of the mailbags on the presort slide below the position at which mailbags are delivered from conveyor J2. In this particular embodiment each sensor is a photoelectric relay which is described in more detail later herein.

When the T1–HIGH sensor senses a high level on the presort slide 30, conveyors E and D are shut down. Conveyors B2 and B1 are shut down when the T2–HIGH sensor senses a high level, and conveyor J is shut down when the T3–HIGH sensor senses a high level on the presort slide 30. These conveyors are started up again when the corresponding low sensors sense a low level below the appropriate conveyors.

After the T2–HIGH sensor senses a high level on the presort slide 30 and conveyors B2 and B1 are shut down, conveyor B1 is filled with mailbags under the control of the B1–INCH and B1–FULL sensors as conveyor A1 continues to deliver mailbags to conveyor B1. The B1 conveyor is moved forward a short distance when the B1–INCH sensor detects that there are mailbags at the input end of the B1 conveyor. After conveyor B1 has inched forward a short distance, moving the mailbags from the B1–INCH sensor, the B1 conveyor again is shut down. When the B1–INCH sensor again senses that there are mailbags at the input end of the conveyor B1, it again inches forward. This continues with the conveyor B1 inching forward every time that the B1–INCH sensor detects the presence of mailbags at the input end of conveyor B1 until the B1–FULL sensor detects that mailbags have been moved to the output end of the B1 conveyor. The B1 conveyor is then shut down and no more mailbags may be delivered to the B1 conveyor.

After the B1 conveyor has been filled up, the A1 shuttle 54 is moved along the A1 conveyor to the pre-sort storage conveyor C1; and the pre-sort storage conveyor C1 is filled up under the control of the C1–INCH and C1–FULL sensors in the same manner as the B1 conveyor was filled up. After the C1 presort storage conveyor has been filled up, the A1 shuttle 54 is moved to the C2 presort storage conveyor and the C2 conveyor is filled up with mailbags in the same manner as conveyors C1 and B1 under the control of the C2–INCH and C2–FULL sensors. Presort storage conveyors C3 and C4 may be filled in the same manner.

When one of the presort storage belts C1–C4 is full, and conveyors D and E are running, the full conveyors C1–C4 will empty over conveyors D and E to the presort slide 30. If for any reason, the mailbags fail to feed to the presort slide 30 through conveyors B1 and B2, mailbags will continue to feed to the presort slide 30 through the presort storage conveyors C1–C4 and conveyors D and E.

Normally as soon as the T2–LOW sensor detects that the presort slide 30 is clear below conveyors B2, conveyors B2 and B1 will start up and the A1 shuttle will automatically return to conveyor B1 and resume feeding mailbags into the system through conveyor B1.

In the manner described, provision has been made for automatically storing mailbags on presort storage conveyors C1–C4 and conveyor B1, when the flow of mailbags into the mailbag handling system increases past the normal capacity of the system, and for automatically resuming feeding of mailbags and discharge of the stored mailbags into the system when the mailbag handling system can handle the mailbags.

Table 1 shows the speed in feet per minute of each of the conveyors shown in FIG. 1.

TABLE 1

| Conveyor: | In feet per speed per minute |
|---|---|
| A | 100 |
| A1 | 105 |
| B1 | 110 |
| B2 | 120 |
| C1–C4 | 60 |
| D | 110 |
| E | 120 |
| J | 110 |
| J2 | 120 |
| L | 100 |
| T1–T4 | 50 to 100 |
| P1 | 100 to 200 |
| P2 | 100 to 200 |
| P3 | 100 to 200 |
| P4 | 140 |
| P2A | 100 to 200 |
| F | 200 |
| ST1–ST15 | 80 |
| G | 200 |
| H | 220 |
| I | 240 |
| M | 120 |

PRESORT HANDLING OF MAILBAGS

*Presort slide*

Figure 2:
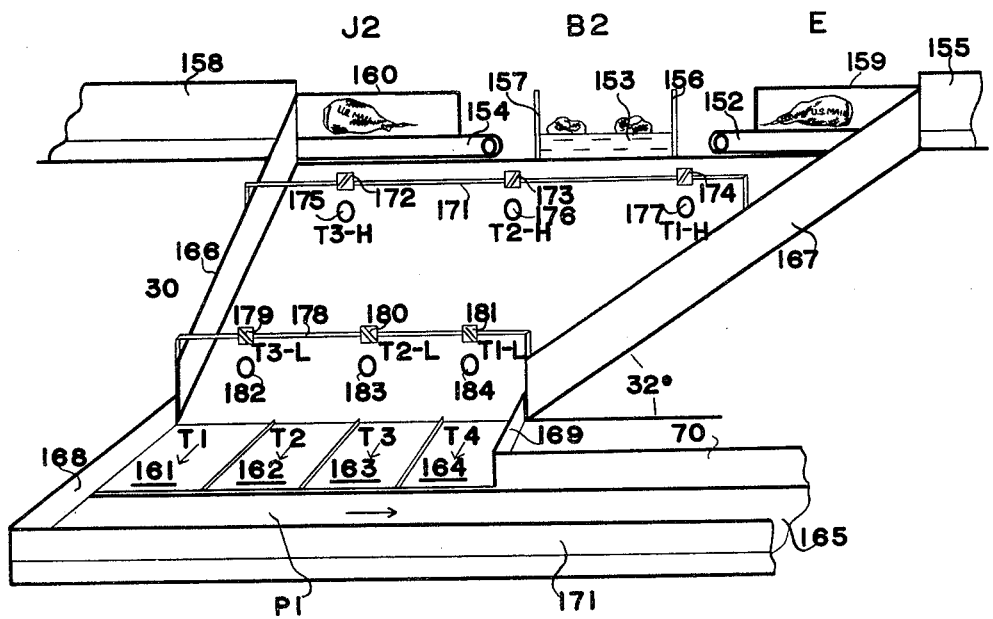
FIG. 2 is a similar view of the presort slide.

The presort slide 30 in FIG. 1, shown in more detail in FIG. 2, is inclined at an angle of approximately 32° so that mailbags delivered to the presort slide 30 from the E conveyor 152, the B2 conveyor 153 and the J2 conveyor 154 will slide from the top toward the bottom of the presort slide 30. Side guard 155 on the E conveyor 152, side guards 156 and 157 on the B2 conveyor 153, and side guard 158 on the J2 conveyor 154 keep the mailbags from falling off of the sides of the conveyors until they have been delivered to the presort slide 30. The mailbags from the B2 conveyor 153 are delivered to the presort slide 30 when they reach the end of the conveyor. Fixed diverters 159 and 160, fixed at an angle across the E conveyor 152 and across the J2 conveyor 154, respectively, divert the mailbags from the J2 and E conveyors 154 and 152 to the presort slide 30.

The mailbags slide toward the bottom of the presort slide 30 where they are removed by the T1–T4 conveyors 161–164, respectively, to the P1 presentation conveyor 165. Side guards 166 and 167 keep the mailbags from falling off the sides of the presort slide 30. Side guards 168 and 169 keep the mailbags on the T1–T4 conveyors 161–164 and side guards 170 and 171 keep the mailbags on the presentation P1 conveyor 165.

A bridge-like structure 171 secured to the side guards 166 and 167 holds three light sources 172–174 about four feet above the presort slide 30. Light source 172 directs light toward a hole 175 in the floor of the presort slide 30 containing the T3–HIGH photocell. In a similar manner, light sources 173 and 174 direct light to holes 176 and 177, respectively, which contain the T2–HIGH and the T1–HIGH photocells, respectively.

Similarly, a bridge-like structure 178 holds three light sources 179, 180 and 181, which direct light toward holes 182, 183, and 184, respectively, which contain the T3–LOW, the T2–LOW, and the T1–LOW photocells, respectively.

The surface of the presort slide 30 is smooth so that the mailbags slide easily from the top to the bottom. When mailbags are delivered to the presort slide at a faster rate than they are removed by the T1–T4 conveyors 161–164, they tend to pile up on the presort slide 30. The physical presence of the mailbags interrupts the light sources to the photocells to de-energize the photoelectric relays in a manner described hereinafter. The absence of mailbags between the light sources and the photocells allows the light sources to energize the photocell relays in a manner described elsewhere in this description.

BLOCK DIAGRAM DESCRIPTION OF PRESORT STORAGE SYSTEM

Figure 3:
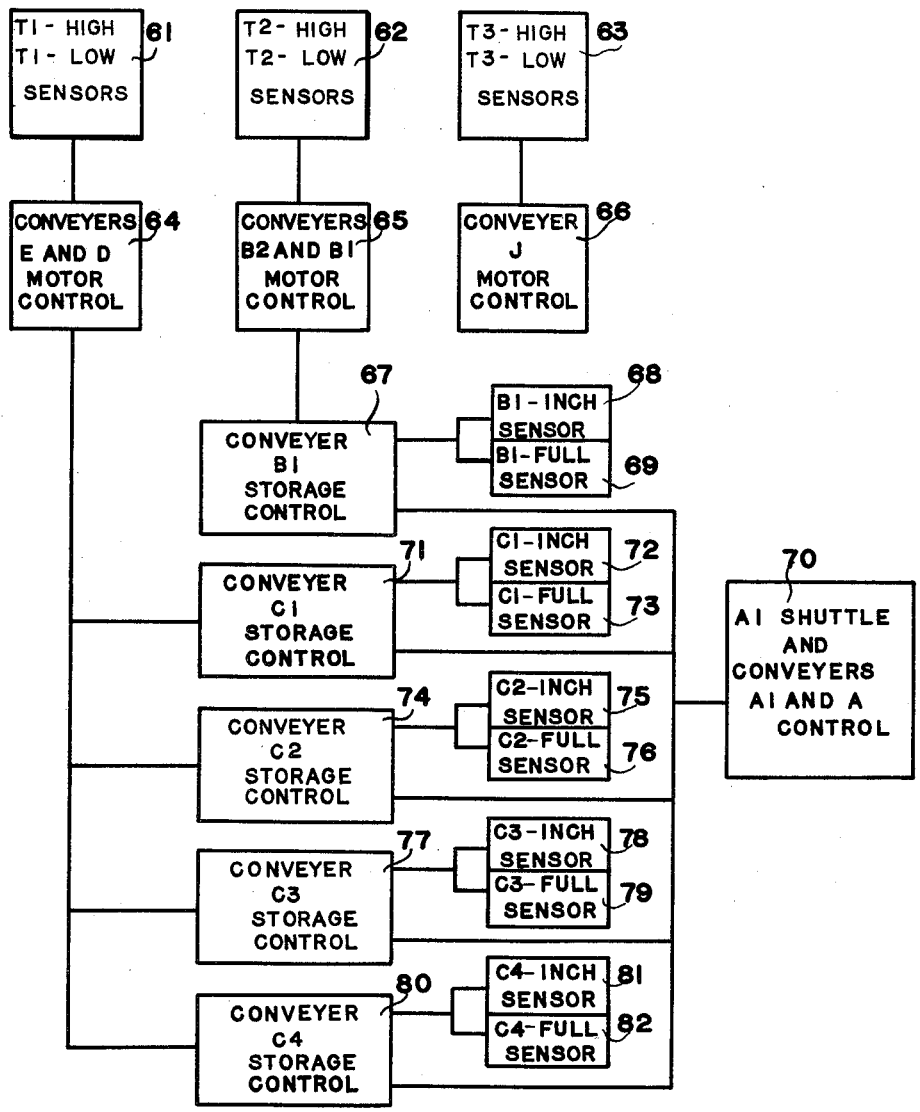
FIG. 3 is a block diagram of the surge storage portion of the mailbag handling system.

The T1–HIGH–LOW sensors 61, T2–HIGH–LOW sensors 62 and T3–HIGH–LOW sensors 63 shown in block diagram form in FIG. 3 control the conveyor E and D motor control 64, the conveyors B2 and B1 motor control 65 and the conveyor J motor control 66, respectively. A high level detected in front of conveyor E on the presort slide 30 in FIGS. 1 and 2 by the T1–HIGH sensor causes the conveyor E and D motor control 64 in FIG. 3 to shut down the conveyors E and D. A low level on the presort slide 30 in FIGS. 1 and 2 detected by the T1–LOW sensor causes the conveyor E and D motor control 64 in FIG. 3 to start conveyors E and D up again. In a similar manner, the T2–HIGH-LOW sensors 62 and T3–HIGH–LOW sensors 63 in FIG. 3 caunse the conveyors B2 and B1 motor control 65 and conveyor J motor control 66, respectively, to shut down and start-up conveyors B2, B1 and conveyor J, respectively, as the level of the mailbags on the presort slide 30 in FIGS. 1 and 2 reaches the high level or the low level.

After conveyors B1 and B2 have been shut down, conveyor B1 storage control 67 in FIG. 3 controls the storage of mailbags on conveyor B1. Conveyors A and A1 continue to deliver mailbags to conveyor B1 after B1 is shut down. When the B1–INCH sensor detects that mailbags are present at the start of conveyor B1, the conveyor B1 storage control 67 causes the conveyor B1 motor control 65 to run conveyor B1 for a short period of time to inch the B1 conveyor forward, moving the mailbags from the start of conveyor B1. Thus as mailbags are delivered to the start of conveyor B1, the conveyor is inched forward, storing the mailbags on conveyor B1. The B1–FULL sensor 69 detects when conveyor B1 is full and stops the further storage of mailbags on conveyor B1.

After conveyor B1 is full, the A1 shuttle and conveyors A1 and A motor control 70 shuts down conveyor A1. The A1 shuttle is moved from conveyor B1 to presort storage conveyor C1, the conveyor A1 is started again; and mailbags are stored on the presort storage conveyor C1 under the control of the conveyor C1 storage control 71, responsive to the C1–INCH sensor 72 and the C1–FULL sensor 73 in the same manner as that described with respect to conveyor B1. After conveyor C1 is filled, the A1 shuttle is moved to conveyor C2 and conveyor C2 is filled with mailbags under the control of the conveyor C2 storage control 74 responsive to the C2–INCH sensor 75 and the C2–FULL sensor 76 in the same manner. The presort storage conveyors C3 and C4 are filled with mailbags in a similar manner under the control of conveyors C3 storage control 77, responsive to the C3–INCH sensor 78 and the C3–FULL sensor 79 and under the control of conveyor C4 storage control 80, responsive to the C4–INCH sensor 81 and the C4–FULL sensor 82, respectively, the INCH and FULL sensors shown by location in FIGS. 1 and 2.

When one or more of the presort storage conveyors C1–C4 are full and conveyors D and E are running, the full conveyors C1–C4 will empty onto conveyor D under the control of the conveyor C1–C4 storage controls 71, 74, 77 or 80.

When the T2–LOW sensor 62 detects that the presort slide 30 is clear, in front of conveyor B2, conveyors B2 and B1 will start up again under the control of the conveyors B2 and B1 motor control 65; and the A1 shuttle control 70 will cause the A1 shuttle to return to the B1 conveyor and feed mailbags to the B1 conveyor.

CODING AND SORTING OF MAILBAGS

Depositor

Figure 4:
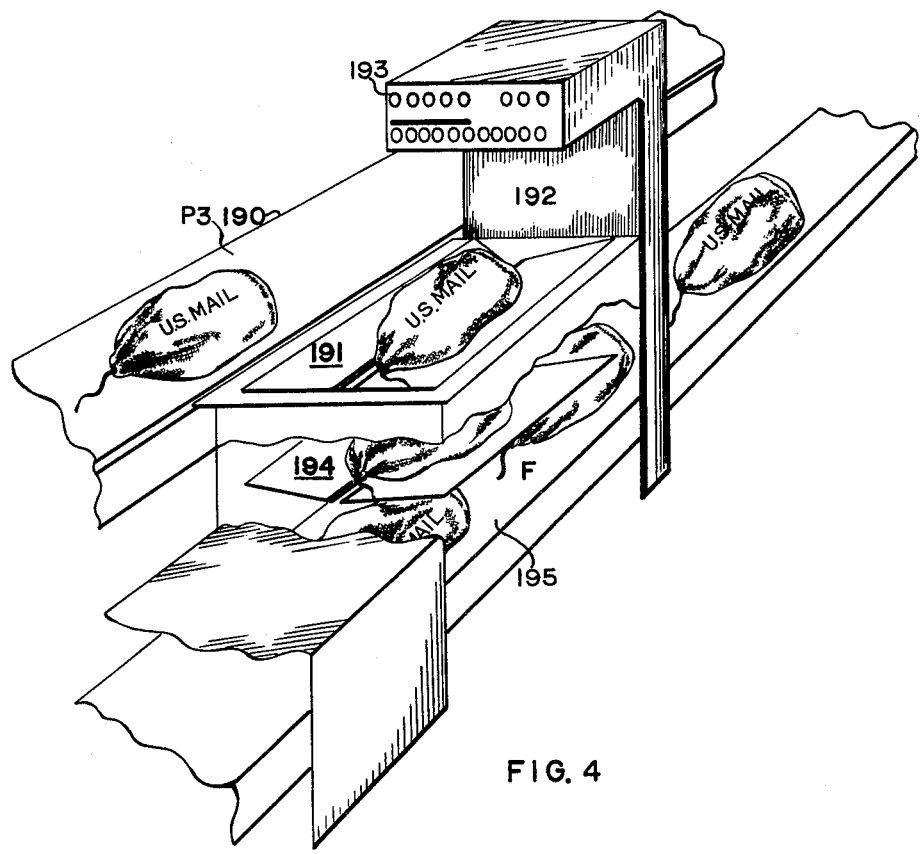
FIG. 4 shows one of the depositors.

A mailbag is guided from the P3 presentation conveyor 190 in FIG. 4 onto the top hopper 191 of a depositor 192. The destination tag on the mailbag is read and a corresponding numerical destination code is entered into the depositor by pushbuttons on the keyboard 193 of the depositor 192. After the numerical destination code has been read into the keyboard 193, the two sections of the top hopper 191 swing downward, transferring the mailbag thereon to the bottom hopper 194. At a predetermined time, described elsewhere in this description, the two sections of the bottom hopper swing downward, transferring the mailbag thereon to the F sorting conveyor 195.

Figure 5:
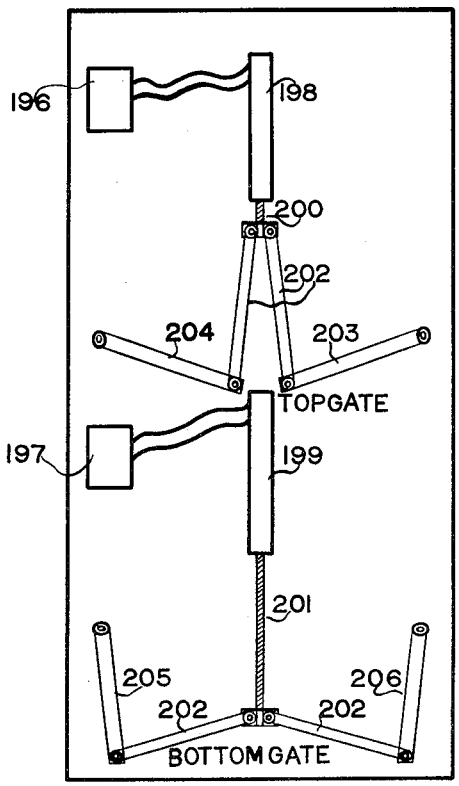
FIG. 5 shows the back of one of the depositors.

The mechanical mechanism operating the opening and closing of the bottom and top hopper is shown on the back of the depositor in FIG. 5. The top air valve 196 and the bottom air valve 197 are opened and closed by a solenoid controlled by the depositor control logic shown in other figures and described elsewhere in this description. Air valves 196 and 197, when opened, cause the top air piston 198 and the bottom air piston 199, respectively, to push piston arms 200 and 201, respectively, down. In FIG. 5 piston arm 200 is shown retracted, and piston arm 201 is shown extended. The piston arms, when extended, cause connecting rods 202 to open the two sections of the hopper. The two sections 203 and 204 of hopper 191 are shown closed, and the two sections 205 and 206 of hopper 194 are shown open.

Mailbag coding

The mailbags are guided from the presentation conveyor to the top hopper of the four depositors where the destination tag on the mailbag is read and a numerical destination code is entered into a keyboard. Keyboards 83–86 shown in block diagram form in FIG. 6 are associated with the first depositor input control 87, the second depositor input control 88, the third depositor input control 89, and the fourth depositor input control 90, respectively.

The six second timing cycle of the mailbag coding and sorting portion of the mailbag handling system showing the time that various control signals are produced by the advance circuit 91 are shown in FIG. 7.

Advance circuit 91 (FIG. 6B) delivers an open top hopper gating signal to the first depositor input control 87 from 1.5 time to 4.5 time during the timing cycle so that the first depositor input control 87 will cause the open top hopper control 92 to open the top gate of the first depositor at 1.5 time, if a destination code has previously been read into the keyboard 83 or at any time from 1.5 time to 4.5 time if a destination code is read into keyboard 83. Opening the top hopper will transfer the mailbag on the top hopper to the bottom hopper. In a similar manner, the open top hopper gating signal delivered to the second depositor input control 88 from 1.5 time to 4.5 time during the timing cycle will cause the open top hopper control 93 to open the top hopper of the second depositor at 1.5 time, if a destination code has previously been read into the keyboard 84, or at any time from 1.5 time to 4.5 time if a destination code is read into keyboard 84 during this period of time. In a similar manner, advance circuit 91 delivers an open top hopper gating signal to the third and fourth depositor input controls 89 and 90 from 3 time to 6 time to cause the open top hopper controls 94 and 95 to open the top hoppers of the third and fourth depositors at 3 time, if a destination code has previously been read into the keyboards 85 or 86, respectively, or at any time from 3 time to 6 time if a destination code is read in during this period of time.

Thus, the mailbags have been transferred to the bottom hopper. The four depositors are separated from each other by a distance of six feet, six inches, while the discharge stations are separated by a distance of five feet. Thus, the mailbags must be deposited onto the sorting conveyor every five feet. In this particular embodiment the sorting conveyor is moving 200 feet per minute. The deposit of mailbags from the four depositors onto the sorting conveyor separated by a distance of five feet, center to center, is accomplished in the following manner.

The advance circuit 91 delivers an open bottom hopper signal to the first depositor input control 87 at 0.15 time (timing chart FIG. 7) causing the open bottom hopper to control 96 to open the bottom hopper of the first depositor, depositing a mailbag onto the sorting conveyor. 0.45 second later at 0.6 time (FIG. 7), the advance circuit 91 delivers an open bottom hopper signal to the second depositor input control 88, causing the open bottom hopper control 97 to open the bottom hopper of the second depositor and depositing a mailbag onto the sorting conveyor five feet, center to center, from the mailbag deposited by the first depositor. The mailbags are separated by the distance of five feet, center to center, because, although the depositors are separated by a distance of six feet, six inches, center to center, the mailbag deposited by the first depositor has moved on the conveyor a distance of one foot, six inches, in the 0.45 second from the time it was deposited until the mailbag was deposited by the second depositor. Thus, by the time that the mailbag was deposited by the second depositor, the mailbag deposited by the first depositor is five feet from the second depositor and the two mailbags are separated by a distance of five feet, center to center.

In a similar manner, the advance circuit 91 (FIG. 6B) delivers open bottom hopper signals to the third depositor input control 89 0.45 second after the second open bottom hopper signal at 1.05 time (FIG. 7), causing the open bottom hopper control 98 to open the bottom hopper of the third depositor and an open bottom hopper signal to the fourth depositor input control 90 0.45 second after the third open bottom hopper signal at 1.5 time (timing chart), causing the open bottom hopper control 99 to open the bottom hopper of the fourth depositor. In this manner, mailbags are deposited onto the sorting conveyor by the third and fourth depositors. The mailbag deposited by the third depositor is deposited after the mailbag deposited by the second depositor has moved one foot, six inches; and the mailbags deposited by the fourth depositor is deposited after the mailbag deposited by the third depositor has moved one foot, six inches. Thus, all mailbags are deposited onto the sorting conveyor separated from each other, center to center, by a distance of five feet.

SHIFT OF DESTINATION CODE

The destination codes read into the first, second and third keyboards 83-85 are transferred into the first, second and third shift registers 101, 102 and 103, respectively, as the bottom hopper of the corresponding depositors are opened. Thus, at 0.15 time, the destination code from the first depositor is read into the first shift register 101. At 0.60 time, the destination code from the second depositor is read into the second shift register 102; and at 1.05 time, the destination code from the third depositor is read into the third shift register 103. At 1.5 time, a shift signal (FIG. 7) from the advance circuit 91 is applied to all of the shift registers to cause the destination code in each shift register to be shifted to the right, so that the destination code in the third shift register 103 is shifted to the fourth shift register 104; the destination code in the second shift register 102 is shifted to the third shift register 103; and the destination code in the first shift register 101 is shifted to the second shift register 102. Also, any destination code in the fifth shift register 105 is shifted to the sixth shift register 106.

The open fourth bottom hopper signal at 1.5 time causes the destination code from the fourth depositor to be decoded in the binary decimal to decimal converter 121 from a binary decimal destination code as originally coded in the fourth depositor to a decimal destination code, and transferred through code selector 122 to the decimal to binary converter 123 where the destination code in decimal form is coded into binary form and applied to the fifth shift register 105. The destination code in the fifth shift register 105 has already been shifted to the sixth shift register 106. Thus, after 1.5 time, the destination codes from the first, second, third and fourth depositors now rest in the second, third, fourth and fifth shift registers 102-105 respectively.

At 3 time (FIG. 7), another shift signal is applied from the advance circuit 91 to the shift registers to shift the fourth depositor destination code from the fifth shift register 105 to the sixth shift register 106, the third depositor destination code from the fourth shift register 104 through the binary decimal to decimal converter 121, the code selector 122 and the decimal to binary converter 123, to the fifth shift register 105, the second depositor destination code from the third shift register 103 to the fourth shift register 104, and the first depositor destination code from the second shift register 102 to the third shift register 103. Every 1.5 seconds, another shift signal is applied to the shift register to shift the destination codes to the right in the manner described (FIG. 7). After the shift signal at 0 time of the new cycle (FIG. 7), the destination codes from the first, second, third and fourth depositors rest in the fifth, sixth, seventh and eighth shift registers, respectively, so that each destination code has passed through the code selector 122 and four new mailbags may be deposited from the four depositors. The mailbags have been moved on the sorting conveyor in synchronism with the shifting of the destination codes in the shift register as each mailbag moves five feet every 1.5 seconds.

Each destination code is passed through the code selector 122 so that a mailbag originally destined for a particular destination as determined at the coding station may be redirected by a central controller.

DISCHARGE OF MAILBAGS

The shift of destination codes from shift register to shift register occurs upon the occurrence of the shift signal every 1.5 seconds. When the shift signal occurs, the corresponding bag is five feet, center to center, from the next discharge station so that the destination code arrives at the next shift register 1.5 seconds ahead of the arrival of the mailbag corresponding to the destination code.

Thus, when a destination code is shifted into the fifth shift register 105, corresponding to discharge station 1, the mailbag corresponding to that destination code is five feet from the discharge station 1.

As the destination codes are shifted, the fifth through the nineteenth shift registers and the destination codes in shift registers are examined at the first through the fifteenth code compare discharge stations, respectively, to determine if the corresponding mailbag is to be diverted at that discharge station. For instance, the destination code in the fifth shift register 105 is examined in the code compare discharge station 131 to determine if the corresponding mailbag is to be diverted by a diverter 30 or 29. If the mailbag is to be diverted by either diverter 30 or 29, the code compare discharge station 131 causes the proper diverter to be actuated to divert the mailbag which will reach the diverter in 1.5 seconds. In a similar manner, the second station code compare unit 132 will examine each destination code to determine if the corresponding mailbag is to be diverted at that station by diverter 28 or 27 and will cause the proper diverter to be actuated if the mailbag is to be diverted. In a similar manner, each destination code is examined at each discharge station by the code compare units to determine if the mailbag is to be diverted at that discharge station.

Thus, the mailbags are discharged at the proper discharge stations.

SYMBOLS AND NOMENCLATURE

In the following detailed description the term "signal" when used refers to a —6 volt signal and the term "zero signal" refers to ground potential.

The symbols shown in FIGS. 8A through 8L and described hereinafter are used in the detailed description of the mailbag handling system.

It should be noted that every place that a circle appears, an inversion occurs. It follows that two circles directly in series cancel the effect of the inversion. An even number of circles in any given leg of the circuit results in a direct function, whereas an odd number of circles denotes an inversion.

In all of the elements shown, input terminals are usually shown on the left side of the symbols and output terminals are shown on the right side of the symbols.

AMPLIFIER

FIGURE 8A shows the symbol for the amplifier. A signal on the input terminal will cause current to flow in a load connected between the output terminal and the negative power bus.

AND/NOT CIRCUIT

FIGURE 8B shows the symbol for the AND/NOT circuit. Its operation is such that a zero signal on all input terminals causes an output signal to be produced on the output terminal. This unit may have two or more input terminals. Positive pulses received on all terminals are effectively the same as zero signals received and a signal is produced on the output terminal. If a signal is applied to one or more input terminals, a zero signal is produced on the output terminal.

COUNTER BIT

FIGURE 8C shows the symbol for a counter bit. A signal applied to the set terminal sets counter bit to 1 so that a signal appears at the "1" output terminal. This signal at the "1" output terminal will be maintained after the set signal is removed and the counter bit remains in the one state until a signal is applied to the reset terminal, at which time the signal on the "1" output terminal is removed and a signal appears on the "0" output terminal. The unit will remain in this, the zero state, until a set signal is again applied. In addition, a pulse on the input terminal will complement the element, changing the state of the element from the previous state. The shift of signals between the "1" and "0" output terminals occurs on the positive going side of the input signal. The "1" and "0" output terminals are always the inverse of each other unless a signal is simultaneously applied to the set and reset terminals in which case a zero output signal will be present.

INVERTER

FIGURE 8D shows the basic symbol for the inverter. An output signal is produced on the output terminal if a zero signal is received on the input terminal and a zero signal is produced on the output terminal if a signal is received on the input terminal. The small circle is added to the output terminal to indicate the inverted output signal.

INVERTING "OR" CIRCUIT

FIGURE 8E shows the symbol for the inverting OR circuit. Its operation is such that an input signal on one input terminal will turn off the output signal on terminal L. The small circle is added to the output terminal to indicate the inverted output signal.

ONE SHOT PULSE GENERATOR

FIGURE 8F shows the symbol for one shot pulse generator. An input, a negative going pulse or a negative going step change in a D.-C. input to the upper input terminal or a positive going pulse or a positive going step change in a D.-C. input to the lower input terminal, will cause a pulse to be produced at the upper output terminal with a negative going leading edge and also a pulse to be produced at the lower output terminal with a positive going leading edge. Both output pulses are available at the same time with a signal on either input terminal. The length in time of the output pulses may be adjusted by the capacitance of the capacitor shown connected to the one shot pulse generator.

"OR" CIRCUIT

FIGURE 8G shows a symbol for an OR circuit. Its operation is such that an input signal on either input terminal will produce an output signal on the output terminal. This symbol may have two or more input terminals.

COIL

FIGURE 8I shows the symbol used for a coil of a relay.

REGISTER

FIGURE 8J shows the symbol used to represent a register.

RELAY CONTROLS

FIGURE 8K shows the symbol used to represent normally open relay contacts and FIGURE 8L shows the symbol used to represent normally closed contacts.

Magnetic cores are shown in FIGURE 13 as circles, magnetic core shift registers are well known in the art.

The circuits used in this description are all standard circuits well known in the art.

TIME DELAY

FIGURE 8H shows the symbol for a time delay element. Its operation is such that a predetermined period of time after a signal is removed from the input terminal, a signal will appear on the output terminal.

In the detailed description input and output terminals in one figure may connect to input and output terminals on another figure, or a relay coil may close or open a contact on another figure. In such instance, the figure number separated by a dash and a number are enclosed in parentheses below the terminal, coil, or contacts indicating the figure number and the number of the terminal to which that terminal is connected, coil or contact is associated. Thus, a designation (FIG. 8—317) below a coil indicates the corresponding contact 317 is in FIG. 8. In a similar way, a designation (FIG. 10—407) beside a terminal indicates that the terminal connects to terminal 407 in FIG. 7. A number when underlined indicates that a contact is normally closed.

CODING AND SORTING OF THE MAILBAGS

Coding stations

The mailbag handling apparatus described in the general description has four coding stations which are identical. Therefore, the first coding station will be described in detail with the understanding that the other three coding stations are identical to the first coding station described in detail hereinafter.

At each coding station, a "units" position digit is selected and a "tens" position digit is selected to provide the destination code for the mailbag which has been removed from the presentation conveyor belt.

Figure 9B:
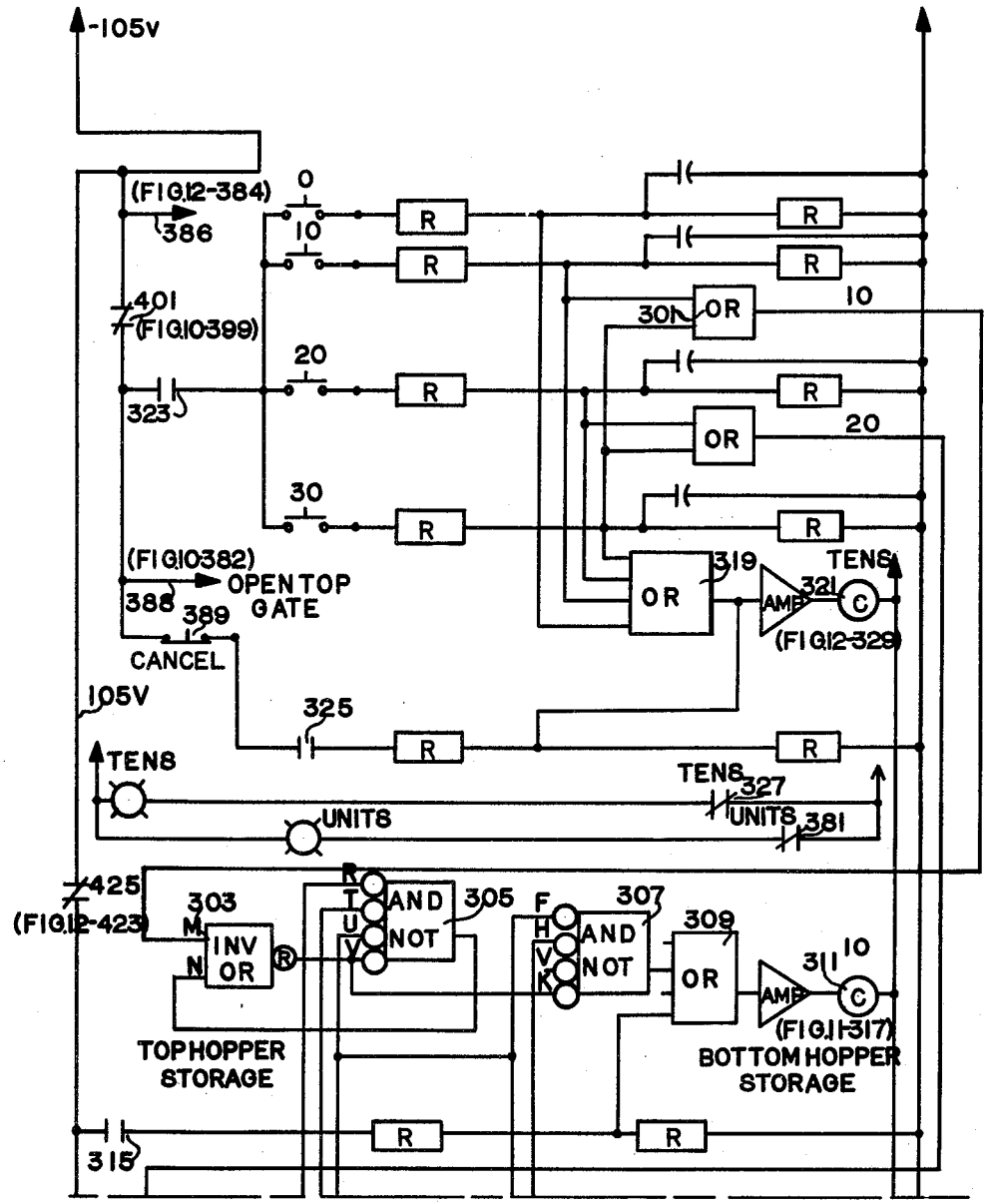

Referring now to FIGURE 9, the 0, 10, 20 or 30 contacts are closed depending on which "tens" position digit has been selected. The inputs are coded into a binary decimal code so that a zero signal is produced from a zero input. A signal from OR circuit 301 is produced when the 10 contacts are closed and applied to inverting OR circuit 303 so that a zero signal is applied to terminal V of AND/NOT circuit 305. Terminals R, T and U of AND/NOT 305 also have a zero signal applied thereto, at this time causing a signal to be applied to inverting OR 303, sealing in the zero signal from inverting OR 303. The zero signal from inverting OR 303 is also applied to terminal K of AND/NOT 307. Terminal F of AND/NOT 307 also has a zero signal applied thereto at this time and a zero signal is applied to terminal H from input 306 when the top hopper opens, causing AND/NOT 307 to produce a signal which is passed by OR circuit 309 to energize coil 311 of the 10 relay. The energized coil 311 of the 10 relay closes contact 315 to complete a circuit through OR circuit 309 to coil 311 to keep coil 311 energized after the 10 contacts are opened. The energized coil 311 also closes contacts 317 in FIG. 11 to set up the incoder in a manner to be explained hereinafter. The 10 contacts, when closed, also apply a signal to OR 319 to energize the coil 321 of the "tens" position relay. Any of the "tens" position contacts, when closed, apply a signal to energize the tens relay coil 321 to open normally closed contacts 323 and close normally open contacts 325 so that coil 321 remains energized through the closed contacts 325. Contacts 327 are opened to extinguish the "tens" light on the coding panel to indicate that the "tens" position digit has been coded into the depositor and opens contacts 329 in FIGURE 12 to indicate that the "tens" position digit has been read into the depositor. In a similar manner, when the 20 contacts are closed, coil 331 of the 20 relay is energized to close contacts 333 in FIGURE 11 and contacts 335 in FIGURE 9 plus the energization of coil 321 of the "tens" position relay. When the 30 contacts are closed, coil 311 of the 10 relay, coil 331 of the 20 relay and coil 321 of the "tens" position relay are energized in the manner described. The relays energized for each input decimal number of the "tens" position are shown in Table 2.

TABLE 2

| Decimal Number in the "Tens" Position | Relays Energized When Bag in Bottom Hopper |
|---|---|
| 0 | No Relays |
| 10 | 10 Relay 311 |
| 20 | 20 Relay 331 |
| 30 | 10 Relay 311, 20 Relay 331 |

Thus, the selection of the "tens" position of the code has been described.

Referring now to FIGURE 10, the coding of the "units" position is done in a similar manner to that shown and described with respect to the "tens" position. The decimal input is coded into the binary decimal code as shown in Table 3. In Table 3 an "X" shows which of the relays are energized for each decimal input number in the units position.

TABLE 3

| Decimal Number | Relays | | | |
|---|---|---|---|---|
| | 341 | 342 | 344 | 348 |
| | 1 | 2 | 4 | 8 |
| 0 | | | | |
| 1 | X | | | |
| 2 | | X | | |
| 3 | X | X | | |
| 4 | | | X | |
| 5 | X | | X | |
| 6 | | X | X | |
| 7 | X | X | X | |
| 8 | | | | X |
| 9 | X | | | X |

For instance, for the decimal number 7 contacts 7 are closed and signals are passed by OR circuits 337, 339 and 341. The signals are inverted by inverting OR circuits 343, 345 and 347, respectively, and applied as zero signals to AND/NOT circuits 349, 351 and 353, respectively. The other terminals of AND/NOT circuits 349, 351 and 353, have a zero signal applied thereto at this time, so that a signal is applied by AND/NOT circuits and their respective inverting OR circuits to seal in the zero signal from each inverting OR. The zero signals from inverting OR circuits 333, 345, and 347 are applied to AND/NOT circuits 355, 357 and 359. Terminals F of AND/NOT circuits 355, 357 and 359 also have a zero signal applied thereto at this time and a zero signal is applied to terminals H from inverting OR 405 when the top hopper opens so that a signal from AND/NOT circuits 355, 357 and 359 energizes coil 341 of the 1 relay, coil 342 of the 2 relay and coil 344 of the 4 relay. These coils, when energized, close contacts 361, 363 and 365, respectively, to keep the coils energized and close contacts 367, 369 and 371 in FIGURE 11. The energization of coil 348 closes contacts 366. In this manner, the decimal number 7 has been coded into the coded contacts in FIGURE 11 in a binary decimal form.

When any "units" position contact is closed, a signal is passed by OR circuits 373, 375 or 377 to energize coil 379 of the "units" relay. Energized coil 379 opens contacts 381 in FIGURE 9 extinguishing the "units" light to indicate that the "units" number has been entered into the depositor, opens contacts 383 to take control from the input contacts, closes contact 385 to keep the coil energized and opens contacts 387 in FIGURE 12 to indicate that the "units" position number has been read into the coding station.

A mistake may be canceled by operating the cancel switch, causing normally closed cancel contacts 389 in FIGURE 9 to be opened, causing the "tens" position relays to be deenergized, causing normally open cancel contacts 391 in FIGURE 10 to be closed, causing a signal to be produced on output terminal 393. The cancel signal from terminal 393 is applied to terminals R of AND/NOT circuits 305 and 393 in FIGURE 9, causing the 10 and 20 coils 311 and 331 to be de-energized, and causes a signal to be applied to terminals R of AND/NOT circuits 349, 351, 353 and 395 in FIGURE 10, causing the 1, 2, 4, and 8 coils 341, 342, 344 and 348 to be de-energized. The mistake can only be canceled before the top hopper opens. In this manner, an incorrect number read into the coding station may be canceled.

OPEN TOP HOPPER

After the "tens" relay coil 321 in FIGURE 9 and the "units" relay coil 379 in FIGURE 10 have been energized, indicating that the "units" and "tens" position have been read into the coding station, contacts 387 and 329 in FIGURE 12 are opened. With contacts 387 and 329 open, a zero signal is applied to terminal R of AND/NOT circuit 395. At this time, a zero signal is also applied to terminal T and at a predetermined period of time, a zero signal is also applied to terminal V of AND/NOT circuit 395 from the advance circuits shown in FIGURE 20. The zero signal applied to terminal V is applied at a period of time when the top gate is to be opened to allow the bag on the top hopper to be transferred to the bottom hopper. When this period of time arrives, a zero signal is applied to terminal V of AND/NOT circuit 395 to cause AND/NOT circuit 395 to apply a negative going signal to the first top hopper one shot pulse generator 397, causing a negative pulse to be produced by one shot pulse generator 397, energizing the first top hopper relay coil 399. The first top hopper coil 399, when energized, opens contacts 401 in FIGURE 9, causing the "units" and "tens" positions coils 329 and 321 in FIGS. 9 and 10 to be de-energized; closes contacts 403 in FIG. 10, causing a signal to be applied to inverting OR 405 so that a signal is applied after a delay of 40 milliseconds by time delay 407 to terminal T of the "units" and "tens" positions AND/NOTs 349, 351, 353 and 395 in FIG. 10 and AND/NOTs 393 and 305 in FIGURE 9, insuring that the coils of the "units" and "tens" positions are de-energized. The zero signal from inverting OR 405 is applied to AND/NOTs in FIGURES 9 and 10 to cause the "units" and "tens" coils to be energized. Contacts 403, when closed, also cause a signal to be produced on output terminal 409 and also is applied to input terminal 408 in FIGURE 12. Coil 399, when energized, also closes contacts 412 in FIGURE 12 to energize the solenoid 413 causing the top gate to be opened and allowing the bag on the top hopper to be transferred to the bottom hopper. Thus, the bag has been transferred from the top hopper to the bottom hopper after the number has been coded into the coding station. The bottom hopper operates as a buffer storage and another bag may be placed on the top hopper. Signals applied to terminal 362 in FIGURE 10 are not relevant to this description.

DEPOSITOR BOTTOM HOPPER TO SORTING BELT

Referring now to FIGURE 12, every six seconds a zero signal is applied to terminal H of AND/NOT circuit 411 from the advance circuits in FIGURE 20. A negative signal from output terminal 417 in FIGURE 20 causes inverting OR 419 in FIGURE 12 to apply a zero signal to terminal K of AND/NOT circuit 411.

When zero signals are applied to both of the terminals of AND/NOT circuit 411, a negative going signal is applied to the input of the bottom hopper one shot pulse generator 421 to cause a negative going pulse to be produced to energize the coil 423 of the bottom hopper relay. The coil 423, when energized, opens normally closed contacts 425 in FIGURE 9, causing the "tens" and "units" coils to be de-energized, so that a new code may be read into the coding station. Contact 427 in FIGURE 12 is closed, causing a signal to be applied to inverting OR 429 so that zero signal is applied to terminal T of AND/NOT circuit 395; and the bag on the top hopper may be transferred to the bottom hopper at the proper time. Coil 423, when energized, closes contacts 431 in FIGURE 11, completing a circuit through the closed contacts in the incoder to the shift register circuits in FIGURE 13 so that the code which has been read in is transferred to the shift register in a manner to be described. Coil 423, when energized, also closes contacts 433 in FIGURE 12, energizing the bottom hopper solenoid to open the bottom hopper and deposit the mailbag on the sorting belt.

Thus, the mailbag has been deposited on the sorting belt.

TRANSFER OF CODED NUMBERS INTO THE SHIFT REGISTERS

The description of the coding of the decimal numbers to a decimal-binary code has been described with contacts in FIGURE 11 closed, corresponding to the decimal numbers which have been read into the first coding station. The contacts for the fourth coding station are also shown, as it operates slightly different from the first three stations. Assume that the decimal number 27 has been read into the first coding station, so that contacts 333 have been closed, indicating that the number 20 in the "tens" position has been read in, and that contacts 367, 369 and 371 have been closed, indicating that the decimal number 7 has been read into the "units" position. After the bottom hopper has opened, contacts 431 are closed so that signals are delivered on output terminals 437, 439, 441 and 443 in FIGURE 10 to input terminals 445, 447, 449 and 451, respectively, in FIGURE 13 so that the number 27 rests in the first row of the shift register, with cores 453, 455, 457 and 459 set to one in a manner in which is well known in magnetic core shift registers.

In a similar manner, the coded numbers from the second and third coding stations are read into the second and third shift register circuits, respectively. The coded numbers from the fourth coding station are read right into the decoder in a manner to be explained.

The signals in the magnetic core shift registers are shifted from one core to the next core by signals applied to the shift inputs in FIGURE 13 from pulse shift producers 456 and 458 in FIGURE 14. A pulse shift signal is produced by each pulse shift producer upon receipt of input negative signal from output terminal 460 of the advance circuits shown in FIGURE 20. As each coded number is shifted out of the fourth column of shift register cores, it is delivered to the input terminals 461, 463, 465, 467, 469 and 471 of the binary decimal to decimal converter in FIGURE 15. The coded numbers are shifted in the shift register circuits in synchronism with the movement of the bags which the numbers represent on the sorting conveyor belt.

BINARY DECIMAL TO DECIMAL CONVERSION

Referring now to FIGURE 15, the binary decimal code is read out of the fourth column shift register circuits and applied to the designated input terminals 461, 463, 465, 467, 469 and 471 in FIGURE 15, inverted by an inverter to a zero signal, inverted again by an inverting OR to a signal and applied to inverting ORs 751, 753, 755, 757, 759 and 761. Normally a signal is applied to terminal 485 from terminal 487 in FIGURE 20 of the advance circuits so that a signal is applied to a terminal of AND/NOT circuits 473, 475, 477, 479, 481 or 483. However, when the binary decimal number in the core shift register is to be read out of the fourth shift register column, a zero signal is applied to terminal 485 so that the inverters 461, 463, 465, 467, 469 or 471 which have a signal applied thereto from the fourth column of the shift register circuits will cause a zero signal to be applied to the corresponding AND/NOT, causing a signal to be produced by the corresponding AND/NOT, if terminal 515 has a zero signal applied thereto. Thus, the signal produced by the appropriate AND/NOT is caused when a corresponding magnetic core is set to one. When a magnetic core is set to zero, a zero signal is applied to the input inverters and inverting ORs 751, 753, 755, 757, 759 or 761 apply signals to the corresponding AND/NOT. Signals are produced on lines 491, 493, 495, 497, 499 or 501 when a magnetic core is set to zero. A signal is produced on lines 503, 505, 507, 509, 511 or 513 when a magnetic core is set to one. The output signals are sealed in as the outputs from the AND/NOT circuits are fed back to the inverting ORs.

The input to terminal 515 is a zero signal from terminal 517 in the advance circuit in FIGURE 20, at this time. When the binary decimal to decimal converter is reset, a negative signal is applied to terminal 515 so that a signal is applied to each of the AND/NOTs, destroying the seal and causing a zero signal to be produced by all AND/NOTs 473, 475, 477, 479, 481 or 483.

The outputs from the AND/NOT representing a core set to "one" and the signals from the inverting ORs feeding the AND/NOT circuits representing core set to zero are applied to one or more of decoders 519, 521, 523 or 525 wherein the inputs are decoded. The decoders are well known decoders. Output signals produced by the decoders are amplified and energize one or more of the coils of relays 530–543. The coils 530–543, when energized, close contacts in FIGURE 16, shown in Table 4.

TABLE 4

| Relays | Contacts Closed | | |
|---|---|---|---|
| 530 | 560 | 570 | 581 |
| 531 | 550 | 561 | 571 |
| 532 | 551 | 562 | 572 |
| 533 | 552 | 563 | 573 |
| 534 | 553 | 564 | 574 |
| 535 | 554 | 565 | 575 |
| 536 | 555 | 566 | 576 |
| 537 | 556 | 567 | 577 |
| 538 | 557 | 568 | 578 |
| 539 | 558 | 569 | 579 |
| 540 | 583 | | |
| 541 | 559 | | |
| 542 | 582 | | |
| 543 | 580 | | |

In this manner, the binary decimal code is converted to a decimal code with signals appearing on the output terminals designated in FIG. 16.

The code from the fourth coding station is read into the contacts in FIG. 11 in the same manner for the read-in of the code from the first coding station. The coded number is read directly into the binary-decimal converter in FIG. 15 rather than into a column of the shift registers as in the case with the first three coding stations. The reason for this will become apparent later in this description. The input from the fourth coding station is applied to inverting ORs 751, 753, 755, 757, 759 and 761 in FIG. 15.

SORTING CODE SELECTOR

FIG. 17 shows a typical sorting code selector switch. Each of the 30 output terminals for the 30 different decimal numbers shown in FIG. 16 are connected to a terminal 585 of a selector switch such as that shown in FIG. 17 and may be connected to one of the 30 terminals shown so that any decimal code may be diverted to another decimal code. In other words, say the decimal number 25 had been coded into the coding station and transferred to the sorting code selector. At this point, however, the supervisor decides that those bags originally designated by the coder to be transferred to diverter station 25 should now be transferred to diverter station 5 for various reasons, such as the original diverter station 25 being full or a change in destination of the bags. Therefore, the number 25 signal would be changed to 5 and the number 5 would be the destination code for the mailbag. There are 30 of these code selector switches, one for each decimal number. The outputs of the coding selector switch are applied to the inputs of the decimal to binary conversion code converter shown in FIG. 18 and described hereinafter.

DECIMAL TO BINARY CONVERSION

Referring now to FIG. 18, if a decimal code 27 is received from the selector switch, this code is converted to the binary output on output terminals 587, 589, 591 and 593. The thirty discharge station numbers received in the decimal form are thus coded in a binary form and represented by various combinations of outputs on the output terminals in the well known binary coded form. The outputs from the decimal to binary code converter are entered into the fifth column of the shift register circuits with a one setting a core to one and a zero leaving the core set to zero. The binary code for 1–30 is shown in Table 5 with an "X" in a row when a core is set to "one" and a "0" when a core is reset to "zero."

TABLE 5

| Row | 1 | 2 | 4 | 8 | 16 |
| --- | --- | --- | --- | --- | --- |
| 1 | X | 0 | 0 | 0 | 0 |
| 2 | 0 | X | 0 | 0 | 0 |
| 3 | X | X | 0 | 0 | 0 |
| 4 | 0 | 0 | X | 0 | 0 |
| 5 | X | 0 | X | 0 | 0 |
| 6 | 0 | X | X | 0 | 0 |
| 7 | X | X | X | 0 | 0 |
| 8 | 0 | 0 | 0 | X | 0 |
| 9 | X | 0 | 0 | X | 0 |
| 10 | 0 | X | 0 | X | 0 |
| 11 | X | X | 0 | X | 0 |
| 12 | 0 | 0 | X | X | 0 |
| 13 | X | 0 | X | X | 0 |
| 14 | 0 | X | X | X | 0 |
| 15 | X | X | X | X | 0 |
| 16 | 0 | 0 | 0 | 0 | X |
| 17 | X | 0 | 0 | 0 | X |
| 18 | 0 | X | 0 | 0 | X |
| 19 | X | X | 0 | 0 | X |
| 20 | 0 | 0 | X | 0 | X |
| 21 | X | 0 | X | 0 | X |
| 22 | 0 | X | X | 0 | X |
| 23 | X | X | X | 0 | X |
| 24 | 0 | 0 | 0 | X | X |
| 25 | X | 0 | 0 | X | X |
| 26 | 0 | X | 0 | X | X |
| 27 | X | X | 0 | X | X |
| 28 | 0 | 0 | X | X | X |
| 29 | X | 0 | X | X | X |
| 30 | 0 | X | X | X | X |

The binary codes in the shift register circuits are now shifted in synchronism with the movement of the coded bag on the sorting belt.

DISCHARGE OF THE MAILBAGS

It can be seen by reference to FIG. 1 that two destinations are opposite each other so that there are two destinations for each discharge station along the sorting belt. Thus, there are 15 core shift register circuits corresponding to the 15 discharge stations and 30 destinations.

Assume that the decimal number 19 is being shifted in the magnetic core shift register circuits in the binary code so that the corresponding mailbag will be discharged to destination diverter 19. Referring to FIG. 13, for a decimal number 19 in binary code, the cores in the 16, 2 and 1 rows will be set to one; and the magnetic cores in the 8 and 4 rows will be set to zero. When the binary code has been shifted in the shift register circuits to discharge station 10, core 601 will be set to "one," causing a signal to be produced on output terminal 603; core 605 will be set to "one," causing a signal to be produced on output terminal 607; core 609 will be set to "zero," causing a zero signal to be produced on output terminal 611; core 613 will be set to zero, causing a zero signal to be produced on output terminal 615 and magnetic core 617 will be set to "one," causing a signal to be produced on output terminal 619. For the purpose of this description, only the destination decoders for destination diverters 19 and 20 are shown in FIG. 19 and will be described herein. The destination diverter decoding circuits for the other destinations operate in a similar manner with the outputs from the magnetic core shift register circuits decoded to activate the diverter solenoids in a similar manner described hereinafter for destination diverters 19 and 20.

Referring now to FIG. 19, it has been stated that the binary coded 19 has been applied from the shift register 10 so that a signal is applied from output terminal 603 in FIG. 13 to input terminal 621 in FIG. 19, an output signal is applied from output terminal 607 in FIG. 13 to input terminal 623 in FIG. 19; a zero signal is applied from output terminal 611 in FIG. 13 to input terminal 625 in FIG. 19, a zero signal is applied from output terminal 615 in FIG. 13 to input terminal 627 in FIG. 19; and a signal is applied from output terminal 619 in FIG. 13 to input terminal 629 in FIG. 19.

Referring now to FIG. 19, the zero signal received on the binary 8 input terminal 627 is passed by OR circuit 630, inverted by inverter 631 to a signal, inverted by inverter 633 to a zero signal, and applied as a zero signal to terminal R of AND/NOT circuit 635 and terminal F of AND/NOT circuit 637. The signal applied to the binary 16 input terminal 629 is inverted by inverter 639 to a zero signal, passed by OR circuit 630, inverted by inverter 631 to a signal, inverted by inverter 633 to a zero signal, and applied as a zero signal to terminal R of AND/NOT circuit 635 and terminal F of AND/NOT circuit 637. The zero signal received on the binary 4 input terminal 625 is inverted to a signal by inverter 639 and applied to terminal H of AND/NOT circuit 637 so that AND/NOT circuit 637 cannot produce a signal from its output terminal, is inverted by inverter 641 to a zero signal and applied to terminal T of AND/NOT circuit 635. The input signal received on the binary 2 input terminal 623 is inverted by inverter 643 to a zero signal and applied as a zero signal to terminal U of AND/NOT circuit 635. The binary 2 input signal received on input terminal 623 and inverted to a zero signal by inverter 643 is also inverted by inverter 645 and applied as a zero signal to terminal J of AND/NOT circuit 637. The input signal received on the binary 1 input terminal 621 is inverted by inverter 647 to a zero signal, inverted by inverter 649 to a signal and applied as a signal to terminal K of AND/NOT circuit 637. The binary 1 input received on input terminal 621 and inverted to a zero signal by inverter 647 is also applied as a zero signal to terminal V of AND/NOT circuit 635. Thus, all terminals of AND/NOT circuit 635 have a zero signal applied thereto so that AND/NOT circuit 635 produces an output signal which is inverted to a zero signal by inverting OR 651 and applied as a zero signal to terminal X of AND/NOT circuit 653. Assume that terminal Y of AND/NOT circuit 653 has a zero signal applied thereto from input terminal 655 from output terminal 657 in FIG. 20 showing the advance circuits so that a signal is produced at this time by AND/NOT circuit 653, which is applied again to inverting OR 651 to seal in the zero signal, applied to terminal X of AND/NOT circuit 653 to seal in the signal produced by AND/NOT circuit 653. The signal produced by AND/NOT circuit 653, after amplification, energizes the diverter destination 19 relay 659 to close the contacts 661, energizing the diverter destination 19 solenoid 663, causing the diverter at destination 19 to divert the bag corresponding to the decoded binary code 19 from the sorting belt.

In this manner, the decoded code causes the corresponding bag to be diverted from the sorting belt. Normally a signal is received on input terminal 665 which, passed by OR circuit 630, is inverted to a zero signal by inverter 631 and inverted again to a signal by inverter 633 and applied to a terminal of the AND/NOT circuits, causing the AND/NOT circuits to not produce a signal. However, at read time when the signals from the shift registers are to be read, a zero signal is applied to input terminal 665 from terminal 487 in FIG. 20 of the advance circuits which is inverted to a signal by inverter 631, inverted back to a zero signal by inverter 633 and applied as a zero signal to the AND/NOT circuits 635 and 637, allowing the discharge stations decoding circuits to decode the code from the shift register circuits.

ADVANCE CIRCUITS

Referring now to FIG. 20 and the timing diagram shown in FIG. 22, the generation of the timing signals controlling the coding station circuits, the shift register circuits, and the discharge stations will be described. Static limit switch 667 produces a zero signal every one and a half seconds. This corresponds to a movement of five feet of the sorting belt. A rotating member is geared to the sorting belt and activates the static line switch every five feet. The zero signal produced by static limit switch 667 is inverted by inverter 669 to a signal, inverted again by inverting OR circuit 671 to a zero signal and applied to AND/NOT circuit 673. AND/NOT circuit 673, with a zero signal applied to terminal N produces a signal, which is applied to terminal K of inverting OR circuit 671 and inverted to a zero signal and applied to terminal N of AND/NOT circuit 673 to seal in AND/NOT circuit 673. The signal produced by AND/NOT circuit 673 causes the static limit switch timing unit, one shot pulse generator 675, to produce a negative signal on output terminal E which causes inverter 677 to produce a zero signal.

The settings of all of the one shot pulse generators in the timing units are shown in Table 6. The length of the signal or pulse produced is equal to the settings shown:

TABLE 6

| | One Shot | Setting |
|---|---|---|
| SLX Static Limit | 675 | 0.75 Second. |
| 1 GHS Bottom Hopper | 705 | 0.15 Second. |
| 2 GHS Bottom Hopper | 707 | 0.6 Second. |
| 3 GHS Bottom Hopper | 709 | 1.05 Seconds. |
| 4 GHS Bottom Hopper | 711 | 250 Microseconds. |
| AP Shift Register Advance | 713 | 80 Microseconds. |
| RS Reset | 715 | 0.75 Second. |
| 1 GLA Bottom Hopper Gating Pulse | 717 | 50 Microseconds. |
| 2 GLA Bottom Hopper Gating Pulse | 719 | 50 Microseconds. |
| 3 GLA Bottom Hopper Gating Pulse | 721 | 50 Microseconds. |
| 4 GLA Bottom Hopper Gating Pulse | 723 | 50 Microseconds. |
| RP Read Pulse | 735 | 25 Microseconds. |

The static limit switch timing unit, one shot pulse generator 675, produces a negative signal for a period of 0.75 second as shown on the timing diagram in Table 6 as waveform SLX. Thus, during the period of 1.5 seconds between receiving input signals from the static limit switch 667, one shot pulse generator 675 produces a negative signal for 0.75 second. The negative signal produced by one shot pulse generator 675 is inverted by inverter 677 and applied as a zero signal to a first counter bit 679. As the counter bits change state on the positive going side of an input signal, counter bit 679 at this time is set to one so that the second counter bit 681 remains set to zero, as shown in step 1 of the Table 7.

TABLE 7

| Time | Pulses from one shot 675 | Setting of Counter Bits | |
|---|---|---|---|
| | | Counter bit 679 | Counter bit 681 |
| "0" time | 1 | 1 | 2 |
| "1.5" time | 2 | 0 | 1 |
| "3.0" time | 3 | 1 | 1 |
| "4.5" time | 4 | 0 | 0 |

With counter bit 679 set to one and the second counter bit 681 set to zero, the one output terminal E of counter bit 679 applies a signal to AND/NOT circuit 683 and the zero output terminal W of the second counter bit 681 applies a signal to AND/NOT circuit 683 so that AND/NOT circuit 683 does not produce an output signal. The zero signal from AND/NOT 683 is inverted by inverter 684 to a signal so that output terminal 685 applies a signal to input terminal of the open bottom hopper depositor 4 as shown in waveform 8CX in the timing diagram shown in FIG. 22. The zero output terminal L of the first counter bit 679 applies a zero signal to terminal J of AND/NOT circuit 687 and the one output terminal P of the second counter bit 681 applies a zero signal to the F terminal of AND/NOT circuit 687 so that AND/NOT circuit 687 produces a signal which is inverted by inverter 689 so that output terminal 414 at "0" time produces a zero signal as is shown in the timing diagram in FIG. 22 as waveform 7CX. Also at "0" time AND/NOT circuit 691 receives a signal on terminal Y from the one terminal of counter bit 679 so it produces a zero signal which is passed by OR circuit 693 and inverted by inverter 695 to a signal which is produced by output terminal 697 at "0" time as is shown in curve 6CX in the timing diagram shown in FIG. 22. AND/NOT circuit 699 at "0" time also receives a signal from terminal W of the second counter bit 681 to cause the same signal to be produced on output terminal 697. As counter bit 681 is reset to zero, a signal from the zero output terminal is applied from output terminal 701 at "0" time as shown by output waveform 2CTRO in the timing diagram on FIG. 22.

The signal produced by the one shot pulse generator 675, after inversion to a zero signal by inverter 677, is inverted again to a signal by inverter 703 and applied to one shot pulse generators 705, 707, 709, 711, 713 and 715. The time setting for the signals from these one shot pulse generators is shown in Table 6. Positive pulses produced by one shot pulse generators 705, 707, 709 and 711 are applied to one shot pulse generators 717, 719, 721 and 723. As the terminals to which the positive pulses are applied of one shot pulse generators 717, 719, 721 and 723 produced pulses on the negative going side of the input pulse, negative signals are produced by one shot pulse generators 717, 719, 721 and 723 after the delay caused by the setting of the one shot pulse generators 705, 707, 709 and 711. Thus, an output pulse is produced on output terminal 417 0.15 second after a signal is produced by the static limit switch 677 as shown in waveform 1GLA in the timing diagram shown in FIG. 22. A pulse is produced on output terminal 725 0.6 second after a signal is produced from the static limit switch 677 as shown on waveform 2GLA of the timing diagram in FIG. 22. A signal is produced from output terminal 727 1.05 seconds after the signal is produced by the static limit switch 667 as shown in the timing diagram in FIG. 22. A pulse is produced on output terminal 729 250 microseconds after a signal is produced from the static limit switch 667 as shown on the waveform 4GLA in the timing diagram shown in FIG. 22. One shot pulse generator 713 produces a signal which is inverted to a zero signal by inverter 731 and inverted back to a signal by inverter 733 to produce a signal on output terminal 459 shown as waveform APX2 in the timing diagram in FIG. 22. One shot pulse generator 713 also produces a positive pulse which causes one shot pulse generator 735 to produce a signal which is inverted to a zero signal by inverting amplifier 737 to produce a waveform shown as waveform RPO on the timing diagram in FIG. 22. One shot pulse generator 715 produces a signal 0.75 second which is amplified by inverting amplifier 739 and produced on output terminal 657 as a waveform RSO shown in the timing diagram in FIG. 22. After inversion by inverting amplifier 739 to a zero signal, it is inverted back to a signal by inverter 744, and inverted back to a zero signal by inverting amplifier 741 to produce a waveform shown as waveform CPR in the timing diagram shown in FIG. 22.

Thus, the production of the timing signals produced by the advance circuits shown in FIG. 22 has been described.

TIMING OF DEPOSIT OF BAGS BY THE FOUR DEPOSITORS

The four depositor stations are spaced six feet, six inches apart at the centers while the bags are to be deposited on the sorting conveyor five feet apart at the centers as the diverters are stationed five feet apart. Thus, the bottom hoppers of the depositors must be timed to open to deposit a bag on the sorting conveyor every five feet. As there are four depositors, each depositor will deposit a bag every twenty feet. The sorting conveyor is moving at a rate of 200 feet per minute or twenty feet every six seconds. Reference should now be made to the timing chart in FIG. 22 to show the necessary timing of the signals to cause the bottom hopper of each depositor station to open. The generation of the signals produced by the advance circuits shown in the timing diagram in FIG. 22 was described with relation to FIG. 20. Waveform 7CX from terminal 414 is applied to the first, second and third bottom hopper depositors and waveform 8CX from terminal 685 is applied to the fourth bottom hopper depositor. Waveform 1GLA from terminal 417 is applied to the bottom hopper of depositor 1, waveform 2GLA from terminal 725 is applied to the bottom hopper of depositor 2, waveform 3GLA from terminal 727 is applied to the bottom hopper of depositor 3, and waveform 4GLA from terminal 729 is applied to the bottom hopper of depositor 4. Referring to FIG. 12 and FIG. 22, signals from the advance circuits cause the bottom hopper of the first depositor to open in the following manner. The bottom hopper is opened when a zero signal is received on input terminal 743 from waveform 7CX and a signal is received on input terminal 745 from waveform 1GLA, inverted by inverter 419, applies a zero signal to terminal K causing AND/NOT circuit 411 to produce a signal, causing one shot pulse generator 421 to produce a signal energizing coil 423 of the bottom hopper of depositor 1, causing the bottom hopper to open. In a similar manner, the waveform 7CX and the waveform 2GLA are applied to the bottom hopper of depositor 2, waveform 7CX and waveform 3GLA are applied to the bottom hopper of depositor 3 and waveform 8CX and 4GLA are applied to the bottom hopper of depositor 4.

FIG. 21 shows diagrammatically depositor 1; depositor 2, separated from depositor 1 by a distance of six feet, six inches center to center; depositor 3, separated from depositor 3 by a distance of six feet, six inches center to center. The sorting conveyor is moving underneath the depositors in the direction shown by the arrow from left to right. If the distance between the depositors was five feet, center to center, every six seconds all depositors could open so that a bag would be deposited every five feet, center to center. However, as the depositors are six feet, six inches apart, center to center, a timing relationship must be provided to translate the six feet, six inches between the depositors to the five foot distance between each bag on the sorting conveyor.

This is accomplished in the following manner: Referring first to FIG. 21 showing the diagrammatic depositors, depositor 1 must first drop its bag onto the sorting conveyor, as shown in the first row. After the sorting conveyor has moved one foot, six inches, depositor 2 drops the bag it contains onto the sorting conveyor so that the sorting conveyor contains the bag dropped by the first depositor and the bag dropped by the second depositor, five feet apart. After the sorting conveyor has moved another one foot, six inches, the third depositor will drop its bag onto the sorting conveyor so that the sorting conveyor contains the bag dropped by the first depositor, the bag dropped by the second depositor, and the bag dropped by the third depositor, each five feet apart. After the sorting conveyor has moved another foot, six inches, the fourth depositor drops its bag onto the sorting conveyor so that sorting conveyor now has on it the bag dropped by the first depositor, the bag dropped by the second depositor, the bag dropped by the third depositor, and the bag dropped by the fourth depositor. The conveyor belt has moved a distance of four feet, six inches; and the four bags are separated from each other by a distance of five feet.

As the belt is moving at a rate of 200 feet per minute, the sorting conveyor belt moves one foot, six inches every 0.45 second. Thus, after depositor 1 deposits a bag onto the sorting conveyor belt, depositor 2 must deposit its bag onto the sorting conveyor belt 0.45 second after depositor 1 has deposited its bag, depositor 3 must deposit its bag onto the conveyor belt 0.45 second after depositor 2 has deposited its bag and depositor 4 must deposit its bag 0.45 second after depositor 3 has deposited its bag onto the sorting conveyor belt.

Referring now to the timing diagram shown in FIG. 22, waveform 7CX produces no signal from 0 time until 1.5 seconds and at 0.15 second a pulse is produced on waveform 1GLA causing the first depositor to deposit a bag onto the conveyor belt as shown in FIG. 21. 0.45 second later at 0.6 time a pulse is produced by waveform 2GLA causing the second depositor to deposit a bag onto the conveyor belt. Thus, a bag has been deposited from depositor 1 and 0.45 second or one foot, six inches later, a bag has been deposited onto the conveyor belt from depositor 2. 0.45 second later or at 1.05 time on the timing diagram, a pulse is produced by a waveform 3GLA causing a third depositor to deposit a bag onto the conveyor belt. Thus, as illustrated in FIG. 21, a bag has been deposited from depositor 1 onto the conveyor belt. 0.45 second or one foot, six inches later, a bag has been deposited from depositor 2 onto the conveyor belt, so that bags 1 and 2 are separated by five feet at the centers. 0.45 second after bag 2 has been deposited from depositor 2, a bag has been deposited by depositor 3 onto the conveyor belt so that bag 3 is separated from bag 2 by five feet and bag 2 from bag 1 by five feet. Referring to the timing diagram in FIG. 22 again, at 1.5 time a zero signal is produced by waveform 8CX and a pulse is produced by waveform 4GLA. At zero time a pulse was produced by waveform 4GLA; however, a signal was produced by waveform 8CX of that time so that the fourth depositor station was inhibited from depositing a bag at that time. Thus, at 1.5 time, which is 0.45 second, or one foot, six inches, after the third depositor deposited a bag onto the conveyor belt, the fourth depositor is actuated to deposit a bag onto the conveyor belt. Thus, at 1.5 time all four bags have been deposited onto the belt, each bag deposited 0.45 second, or one foot, six inches after the preceding bag had been deposited so that all bags are separated by five feet at the centers and they may be diverted by the diverters which are set at five feet apart.

TRANSFER OF BAG FROM TOP TO BOTTOM HOPPER AND DESTINATION CODE TO SHIFT REGISTERS

Referring to FIG. 4, it can be seen that the bag on the top hopper should not be transferred to the bottom hopper until the bag on the bottom hopper has been deposited onto the sorting belt. Referring to the control circuit for transferring the bag from the top hopper in FIG. 12, it can be seen that AND/NOT circuit 395 cannot be energized when the code has been read into the coding station (as indicated by the opening of the contacts 329 showing that the "tens" position has been read in and by the opening of the contacts 387 showing that the "units" position has been read in) until a zero signal is received on the 2CTRO input terminal 410. Input terminal 410 receives the 2CTRO waveform in the timing diagram in FIG. 22 from output terminal 701 in FIG. 20. It can be seen that the 2CTRO waveform produces a signal from 0 to 1.5 time, produces a zero signal from 1.5 to 4.5 time and again produces a signal from 4.5 to 6 time. The 2CTRO waveform is applied to the first and second open top hopper depositors so that it can be seen that the top hopper may not be opened until after 1.5 time, by which time the bottom hoppers of the first and second depositors will have been opened and the bag in the bottom hopper will have been deposited onto the conveyor belt. In a similar manner, waveform 6CX from output terminal 697 in FIG. 20 is applied to the open top hopper depositors of the third and fourth depositors which are similar in operation to the top hopper of depositor shown in FIG. 12. It can be seen that a signal is produced by the 6CX waveform from output terminal 697 in FIG. 20 from 0 to 3 time and a zero signal is produced from 3 to 6 time. Thus, the top hoppers cannot be opened in the third and fourth depositors until 3 time by which time the bag in the bottom hoppers of the third and fourth depositors will have been deposited onto the sorting belt.

When a 2CTRO zero signal is applied to terminal 410 in FIG. 12, relay coil 379 is energized closing contacts 403 in FIG. 10. A signal is therefore applied to inverting OR 405 causing a zero signal to be applied to terminal H of AND/NOT's 355, 357, 359 and 358 in FIG. 10 and zero signal is applied to terminal H of AND/NOT's 307 and 306 in FIG. 9. The numbers read into the coding stations at this time energize the relay coils to read the coded numbers into the contacts in FIG. 11.

SHIFT OF DESTINATION CODE IN SYNCHRONISM WITH CORRESPONDING MAILBAG

The binary decimal code for each depositor coding station is read into the proper column of the magnetic core shift register by the energization of the bottom hopper relay coil closing a corresponding contact causing the code to be read into the magnetic core shift register. For example, in FIG. 12 when coil 423 of the first depositor station is energized at 0.15 time depositing a bag from the first depositor onto the conveyor belt, contacts 431 in FIG. 11 are closed so that the binary decimal code representing the bag deposited by the first depositor is read into the first column of the magnetic core shift register. In a similar manner, the binary code representing the bag deposited by the second depositor is read into the second column of the magnetic core shift register at 0.6 time as the bottom hopper of the second depositor is opened, depositing a bag from the second depositor. In a similar manner, at 1.05 time the bottom hopper of the third depositor opens, depositing a bag onto the conveyor belt and the code representing that bag deposited by the third hopper is read into the third column of the magnetic code shift register. Thus, a bag has been deposited by the first hopper onto the conveyor belt and the binary code representing that bag has been read into the first column of magnetic core shift register; the second depositor has deposited a bag onto the conveyor belt and a code identifying that bag has been read into the second column of the magnetic core shift register; and the third depositor has deposited a bag onto the conveyor belt and the code representing that bag has been read into the third column of the magnetic core shift register.

By 1.5 time the first, second and third depositors have deposited bags onto the conveyor belt and the first, second and third identity codes rest in the first, second and third columns, respectively, of the magnetic core shift register. The identifying code for the fourth depositor is applied directly to the binary decimal to decimal converter in FIG. 15. At 1.5 time a pulse is produced by waveform 4GLA from output terminal 729 in FIG. 20, closing contacts 749 in FIG. 11 causing the code from the fourth depositor station to be coded and the resulting signals are applied to the inverters 751, 753, 755, 757, 759 and 761 in FIG. 15. The signals are inverted to a zero signal so that a zero signal is applied to the appropriate terminals of AND/NOT circuits 473, 475, 477, 479 and 483. Also at 1.5 time a positive pulse from waveform RPO produced by output terminal 487 in FIG. 20 is applied as a zero signal to terminal 485 in FIG. 15. At this time zero signals are applied to input terminals 461, 463, 465, 467, 469 and 471 which are inverted to signals so that inverting OR's 464, 466, 468, 470, 472 and 474 apply a signal pulse to inverters 751, 753, 755, 757, 759 and 761 and a zero signal is applied to the AND/NOT circuits. Normally waveform RPO from the timing diagram is a negative signal from terminal 487 in FIG. 20 applied to terminal 487 in FIG. 15 so that inverting OR's 464, 466 468, 470, 472 and 474 are blocked to inputs from the shift registers in a manner to be explained. Waveform CPR in the timing diagram produces a zero signal from output terminal 517 in FIG. 20 from 1.5 time to 2.25 time, so that a zero signal is applied from input terminal 515 in FIG. 15 to AND/NOT circuits 473, 475, 477, 479, 481 and 483. Thereafter, the input code from the fourth depositor is decoded in the manner described heretofore in the description of the binary decimal to decimal conversion, energizing selected coils and closing selected contacts in FIG. 16 to convert the binary decimal code to a decimal code, is passed through the sorting code selector shown in FIG. 17, is decoded to a binary code as described before with relation to FIG. 18 and applied to the fifth column of magnetic core shift registers in FIG. 13 to insert the code in the fifth column of magnetic core shift registers. Also, at 1.5 time, a negative pulse is produced by waveform APX2 from output terminal 459 in FIG. 20 and applied to the core drivers in FIG. 14 to produce a core driving pulse to shift all of the contents of the shift register circuits one column to the right so that the contents of the first column are shifted to the second column, the contents of the second column are shifted to the third column, the contents of the third column are shifted to the fourth column, the contents of the fifth column are shifted to the sixth column, and so on. The contents of the fifth column are shifted to the sixth column before the input code from the fourth depositor is inserted into the fifth column after coding and decoding in the manner described. At 3 time another negative pulse is produced by waveform APX2 from output terminal 459 in FIG. 20 to cause the contents of all of the shift registers to be again shifted one column to the right so that the code from the fourth depositor is shifted from the fifth to the sixth column, the code from the third depositor is shifted from the fourth column through the decoding and coding as described hereinbefore to the fifth column, the code from the second depositor is shifted from the third column to the fourth column and the code from the first depositor is shifted from the second column to the third column. This shifting continues until the first four columns of the shift register have been cleared so that the code from the fourth depositor now rests in the eighth column, the code from the third depositor now rests in the seventh column, the code from the second depositor now rests in the sixth column, and the code from the first depositor now rests in the fifth column. Each code has passed through the coder and decoding, as described hereinbefore. A six-second cycle has passed and now four new bags may be deposited from the depositors and the corresponding four new identity codes read into the shift register circuits.

Thus has been described the reading in of the identity codes into the shift registers and the subsequent shifting of the identity codes in synchronism with the movement of the bags on the sorting belt. An advance pulse occurs every 1.5 seconds, advancing the identity code one core shift register while the bag is moving a corresponding five feet on the sorting belt.

DISCHARGE STATIONS AND ACTIVATION OF DIVERTERS

It can be seen that the shift of identity codes from shift register to shift register columns occurs upon the occurrence of the shift register shift pulse every 1.5 seconds. When the shift register shift pulse occurs, the corresponding bag is five feet, center to center, from the next discharge station and the identity code arrives at the subsequent column of the shift register five feet ahead of the actual arrival of the bag. This is to provide time for the coding and activation of the diverter. For example, referring to FIG. 13 and FIG. 1, when a code is shifted into the fifth column of the shift register circuits corresponding to the destination diverters 29 and 30, the corresponding mailbag is five feet, center to center, from the destination diverters 29 and 30. Thus, destination diverters 29 and 30 have 1.5 seconds to decode the code to determine if the mailbag is to be diverted at destination diverter 29 or 30 and to actuate a diverter to actually divert the mailbag. The diverter must also have 1.05 seconds to close if opened to divert a previous mailbag. Thus, referring to FIG. 13, assume that an identity code has been shifted into the eleventh column of the shift register circuits (corresponding to destination diverters 19 and 20) with an identity code indicating that the mailbag is to be diverted at discharge station 19. Therefore, the discharge station has 1.5 seconds in which to retract the diverter and decode the identity code of 19 and actuate the diverter again. The actual decoding is accomplished as described hereinbefore in the description of the discharge stations. Waveform RPO shown in the timing diagram produces a zero signal pulse from output terminal 487 in FIG. 20 and delivers that zero signal pulse to input terminal 665 in FIG. 19 every 1.5 seconds as shown so that a zero signal may be applied to AND/NOT circuits 635 and 637. Normally a signal is applied on input terminal 665, as shown by waveform RPO in FIG. 22, inverted by inverter 631 to a zero signal and inverted again by inverter 633 to a signal to prevent read-out and decoding of the code by AND/NOT circuits 635 and 637 except at the beginning of each read-out cycle. Waveform RSO, at read-out time, applies a zero signal from output terminal 657 in FIG. 20 through input terminal 655 in FIG. 19 to the input terminals of the AND/NOT circuits to allow read-out and decoding to be accomplished. Waveform RSO at .75 second applies a signal to reset the discharge station. Thus, if the proper code is received by discharge station every 1.5 seconds, which is five feet before the bag reaches the diverter, a decoding is accomplished and the diverter is actuated to divert the proper mailbag.

Thus, the timing relationship for the discharge stations has been described.

PRESORT HANDLING SYSTEM

Referring back to FIG. 1 normal flow of mailbags to the surge storage of presentation system is as follows: from the post office over conveyors A, A1, B1 and B2 to the presort slide 30; from the presort slide 30 over conveyors P1, P2 and P2A to conveyor P3 for presentation to the coding stations.

The presentation system also includes conveyors P4 and J2. Mailbags which are not removed from conveyor P3 flow over conveyors P4 and J2 back to the presort slide 30 and to conveyor P1 for presentation again.

PRESORT METERING SLIDE CONTROL

Automatic control of the conveyors feeding the presort slide is accomplished by photoelectric equipment. Photoelectric relays supply the signals for the high and low limits. Other limit switches may be used.

Three photoelectric cells T1–H, T2–H and T3–H detect the high limits of the presort slide and photoelectric cells T1–L, T2–L and T3–L detect the low levels of presort slide.

Briefly, the photoelectric relay contacts such as photoelectric relay contacts 801 in FIG. 23 are normally open when the photoelectric relay beam is broken for more than ½ second, deenerergizing the relay. If the beam of the photoelectric relay makes, the contacts immediately close. Photoelectric relay contacts such as photoelectric relay contacts 803 in FIG. 23 normally open immediately after the beam is broken and close after the beam makes for ½ second.

To start with no mailbags on the presort slide 30 in FIG. 2, the beam of photoelectric cell T3–LO is made so that contacts 803 in FIG. 23 of the T3–LO photoelectric relay are closed to energize coil 805 allowing conveyor J to run. Coil 805, when energized, closes contacts in the motor control circuit of conveyor J energizing the J conveyor motor in a manner which is well known. When coil 805 is energized, the contacts 807 are closed. As the beam of the T3–H photoelectric relay remains made, the T3–HI contacts 801 are closed so that a circuit is completed to the coil through either the T3–HI contacts 801 or the T3–LO contacts 803. As the mailbags on the presort slide increase, the beam of the T3–LO photoelectric relay is broken and the T3–LO contacts 803 open. However, coil 805 remains energized through closed contacts 801 and 807 to keep conveyor J running as the mailbags have not reached the high level on the presort slide. As the mailbags begin to pile up on the presort slide, eventually the mailbags may reach the high level of the presort slide if the flow of mailbags is too great and will break the beam of the T3–HI photoelectric relay for more than ½ second, causing the T3–HI contacts 801 to open and break the circuit to coil 805, causing conveyor J to stop running. As mailbags are removed from the presort slide, eventually the mailbags will pass by the low level photoelectric relay T3–LO allowing the beam of the T3–LO relay to be made, causing the T3–LO relay contacts 803 in FIG. 23 to be closed again, energizing the coil 805 of the J conveyor relay and allowing the J conveyor to run so that mailbags are again delivered from the J conveyor to the J2 conveyor to the presort slide. Before the bags reach the low level on the presort slide, it can be seen that the beam of the T3–HI photoelectric relay will make; and contacts 801 will close, however, contacts 807 remain open so that the coil 805 of the conveyor J cannot be energized. Conveyor J2 is not shut down because the overflow on the presentation conveyor P3 must be kept moving.

In a similar manner, the T2–LO photoelectric relay and the T2–HI photoelectric relay control the feeding of the mailbags to the presort slide from conveyor B2; and the T1–LO photoelectric relay and the T1–HI photoelectric relay control the feeding of the mailbags to the presort slide from conveyor E.

STORAGE OF MAILBAGS AFTER OVERFLOW

When conveyor B2 is shut down, conveyor B1 is also shut down. After conveyor B1 has been shut down, it is now under the control of photoelectric relays B1-FULL and B1-INCH. Referring now to FIG. 24, when conveyor B2 is running, contacts 809 are closed by the energization of a coil in the conveyor B2 motor control (not illustrated) so that a signal is passed by OR circuit 811 to energize coil 813 of the B1 conveyor, closing contacts in the conveyor B1 motor control, causing conveyor B1 to run. When the T2-HI photoelectric relay detects a high level on the presort slide at the position at which conveyor B2 is feeding bags to the presort slide 30 in FIG. 2, conveyor B2 is shut down in the manner hereinbefore described. When conveyor B2 is shut down, contacts 809 open so that zero signal is passed by OR circuit 811 and coil 813 of the B1-RUN relay is de-energized, shutting down conveyor B1.

The B1-INCH photoelectric relay is located at the start of conveyor B1 (as shown in FIG. 1) where the mailbags are deposited from the chute from A1 shuttle 53. At this time, the beam of photoelectric relay B1-INCH is made so that the B1-INCH contacts 815 in FIG. 24 are closed. The B1-FULL photoelectric relay is located near the end of conveyor B1 (illustrated in FIG. 1) just before the bags are transferred from conveyor B1 to conveyor B2. At this time, as the conveyor is standing still, B1-FULL photoelectric relay has its beam made so contacts B1-FULL 817 in FIG. 24 are closed. With B1-INCH contacts 815 closed, coil 819 is energized to close contacts 821. Also, with the B1-INCH contacts 815 closed, a signal is applied to the input terminal K of AND/NOT circuit 823 so that a zero signal is produced by the AND/NOT circuit 823 and coil 813 of the B1-RUN conveyor relay remains de-energized and the conveyor B1 remains shut down. With the beam of photoelectric relay B1-FULL made, the B1-FULL contacts 817 are closed so that a circuit is completed through closed contacts 821, applying a signal to inverter 825 which is inverted and applied as a zero signal to AND/NOT circuit 823. However, as terminal K of AND/NOT circuit 823 has a signal applied to it at this time, AND/NOT circuit 823 produces a zero signal. Output terminal 827 also applies a signal to input terminal 829 in FIG. 25 for a purpose which will be explained.

Mailbags continue to be transferred from the A1 shuttle 53 (illustrated in FIG. 1) to conveyor B1, even though the conveyor B1 is shut down. As mailbags pile up on conveyor B1, they break the beam of the B1-INCH photoelectric relay, for a period of ½ second, de-energizing the B1-INCH photoelectric relay, causing B1-INCH contacts 815 to open. With the B1-INCH contacts 815 open, a zero signal is applied to terminal K of the AND/NOT circuit 823.

Relay 819 will remain energized for a minimum of two seconds. Thus, contacts 821 remain closed so that as long as the B1-FULL beam is not broken, the B1-FULL contacts 817 remain closed and a signal is produced and inverted by inverter 825 to be applied as a zero signal to terminal H of AND/NOT circuit 823. AND/NOT circuit 823 therefore produces a signal to energize the B1-RUN relay 813 through OR circuit 811, causing the B1 conveyor to run and remove the mailbags from the start of conveyor B1 so that the beam of the B1-INCH photoelectric relay can be made. When the bags have been moved on the conveyor and the beam of the B1-INCH photoelectric relay makes, the B1-INCH contacts 815 are closed, applying a signal to terminal K of AND/NOT circuit 823, causing a zero signal to be produced so that coil 813 of the Run relay of conveyor B1 is de-energized and conveyor B1 is again shut down. Should a jam occur and the beam of the B1-INCH photoelectric relay fail to make, the coil 819 automatically drops out after two seconds, opening contacts 821 and causing the resulting zero signal to be inverted by inverter 825 and applied as a signal to AND/NOT circuit 823, causing the resulting zero signal to de-energize coil 813, shutting down conveyor B1. The drop-out time of the relay 819 should be a minimum of two seconds to allow at least a two second running time of the B1 conveyor to allow the bags to clear the front of conveyor B1 and allow the B1-INCH relay beam to make.

Mailbags are continually fed to conveyor B1 and the beam of the B1-INCH relay may be broken again for ½ second opening the B1-INCH relay contact 815, causing a zero signal to again be applied to input terminal K of AND/NOT circuit 823, thus, causing AND/NOT circuit 823 to produce a signal, energizing coil 813 of the RUN relay of conveyor B1, causing the conveyor to again run until the beam of the B1-INCH photoelectric relay has again been energized or the coil of relay 819 drops out after two seconds. This inching forward of the B1 relay continues in the manner described, filling the B1 conveyor with mailbags until the mailbags reach the end of the conveyor where the beam of the B1-FULL photoelectric relay is broken for ½ second, opening the B1-FULL contacts 817 so that a resulting zero signal is inverted by inverter 825 to a signal, causing AND/NOT circuit 823 to produce a zero signal, de-energizing coil 813, shutting down conveyor B1.

Thus, after the initial shutting down of the B1 conveyor after the sensing of a high level of mailbags by the high level photoelectric relay T2-HI, the conveyor B2 has been filled with bags. When the B2-FULL contacts 817 are broken, de-energizing the coil 813, a zero signal is also produced on output terminal 827 and applied to input terminal 829 in FIG. 25 for a purpose which will be explained with relation to FIG. 25.

RUNNING OF CONVEYORS B1, A1 AND A DURING THE RUNNING OF CONVEYOR B2

During normal operation with conveyor B2 running and delivering mailbags to the presort slide, conveyors B1, A1 and A should remain running so that mailbags are delivered to conveyor B2.

The A1 shuttle delivers mailbags to conveyors B1 and C1 through C4. With conveyor B2 running, the A1 shuttle should remain in front of conveyor B1.

While conveyor B2 is running, contacts 809 in FIG. 24 are closed so that a signal is delivered to coil 813 through OR circuit 811 to keep the conveyor B1 running and also the signal is inverted by inverter 873 to a zero signal and is inverted again to a signal by inverter 875 so that a signal is produced on output terminal 877 indicating that conveyor B2 is running. The B2 running output signal, when conveyor B2 is running, is applied to input terminal 879 in FIG. 25.

The conveyor B2 running signal received on input terminal 879 in FIG. 25 is passed by OR circuit 881 to energize coil 893 of the RUN conveyor A relay to keep conveyor A running. The B2 running signal received on input terminal 879 is also applied to terminal K of inverting OR circuit 863 so that a zero signal is applied to the coil 865 of the A1 shuttle forward relay while conveyor B2 is running. The B2 running signal is also applied to terminal P of AND/NOT circuit 887 to insure that a zero signal is applied to terminal N of OR circuit 889. The conveyor B2 running signal from input terminal 879 is also inverted by inverter 891 and applied as a zero signal to input terminal N of AND/NOT circuit 893.

Normally all of the limit switch interlocks are closed. When the A1 shuttle rests in front of one of the conveyors, that limit switch opens. Thus, with the A1 shuttle in front of conveyor B1, limit switch LS-B1 895 in FIG. 26 is opened, de-energizing coil 897 of relay LSX-B1, closing contacts LSX-B1 899 in FIG. 25. Thus, a signal is applied to terminal M of AND/NOT circuit 893 and terminal R of AND/NOT circuit 887 so that AND/NOT circuit 893 applies zero signal to terminal X of AND/NOT circuit 855. The zero signal passed by OR circuit 889 is inverted to a signal by inverter 901, causing inverting OR circuit 859 to produce a zero signal so that shuttle A1 reverse coil 861 remains de-energized with the A1 shuttle remaining in front of conveyor B1. The B2 RUN signal received on input terminal 879 in FIG. 25 is passed by OR circuit 885 to terminal F of AND/NOT circuit 831 to provide a zero signal from AND/NOT circuit 831 to terminal Y of AND/NOT circuit 855 while the B2 conveyor is running.

With zero signals applied to both terminals X and Y of AND/NOT 855, a signal is produced to energize coil 857 of the conveyor A1 RUN relay so that conveyor A1 remains running while conveyor B2 is running.

As the shuttle A1 is not in front of conveyor C4 at this time, limit switch LS–C4 903 in FIG. 26 remains closed, energizing the coil 905 of relay LSX–C4 opening the LSX–C4 contacts 907 in FIG. 25, so that zero signal is applied to terminal V of OR circuit 903 until the shuttle reaches conveyor C4.

SHUTTLE CONTROL

With conveyor B2 not running, but conveyor B1 still storing, conveyor A must run and conveyor A RUN coil 893 must be energized; and conveyor A1 must run and conveyor A1 coil 857 must be energized. However, until conveyor B1 becomes full, A1 shuttle reverse coil 861 and A1 shuttle forward coil 865 must be kept de-energized. As soon as conveyor B2 ceases to run, a zero signal is applied to input terminal 879 in the manner described. The zero signal on conveyor 879 indicating that conveyor B2 is not running, is inverted by inverting circuit 891 to a signal and applied as a signal to terminal N of AND/NOT circuit 893. As AND/NOT circuit 893 still receives a signal on terminal M, this does not change the situation. A zero signal is applied to terminal T of AND/NOT circuit 887, but as a signal, is still applied to terminal R of AND/NOT circuit 887; nothing is changed. The B2 no-run is applied to terminal X of OR circuit 885 as a zero signal; however, as conveyor B1 is not full, a signal is still applied to terminal Y of OR 885, so that a signal is still applied to terminal F of AND/NOT circuit 831 so that the situation is not changed. Thus, AND/NOT circuit 855 still receives a zero signal at both inputs and still applies a signal to energize the A1 RUN relay 857, keeping the conveyor A1 running. As the outputs from the inverter 901 and AND/NOT circuit 855 to inverting OR circuit 859 do not change, the shuttle A1 reverse relay 861 does not become energized yet. Now looking at the shuttle A1 forward relay 805, the B2 run signal has been removed from terminal K of inverting OR circuit 863 and B2 conveyor no-run zero signal is now applied to terminal K. As to terminal J of inverting OR circuit 863, this is derived from AND/NOT circuit 909. The inputs to AND/NOT circuit 909 become all zero signals only when all of the C1, C2, C3 and C4 conveyors become full. Therefore, signals are still applied to the AND/NOT circuit 909, causing a zero signal to be applied to terminal J of inverting OR circuit 863 at this time. Input terminal 911 receives a zero signal until conveyor C4 becomes full; and as conveyor C4 is not full at this time, a zero signal is applied on input terminal 911 to terminal M of inverting OR circuit 863. However, AND/NOT circuit 855 still receives a zero signal on each input and produces a signal, which not only keeps the A1 RUN relay 857 energized to keep the A1 conveyor running, but also applies a signal to terminal F of inverting OR circuit 863 so that inverting OR circuit at this time produces zero signal and does not energize the shuttle A1 forward relay 865 when conveyor B2 first stops running. The zero signal from inverting OR circuit 863 is applied to the input terminal J of inverting OR circuit 913 and to inverter 915. Terminal F of inverting OR circuit 913 at this time receives a zero signal from AND/NOT circuit 909 for the same reasons stated before, that the conveyors C1–C4 are not full at this time. Terminal H of inverting OR circuit 913 at this time receives a zero signal for the reasons stated above, that conveyor C4 is not full so a zero signal is received on input terminal 911 at this time. Thus, at this time with conveyor B2 not running but conveyor B1 not yet filled, inverting OR circuit 913 produces a signal which is passed by OR circuit 881 to energize the RUN conveyor A relay 893 to keep conveyor A running until conveyor B1 has been filled up in the manner described. The zero signal applied to inverter 915 is used in a manner to be described.

Thus, it has been described how after conveyor B2 stops running, that the A1 shuttle reverse relay 861 stays de-energized, the A1 RUN relay 857 stays energized, the shuttle A1 forward relay 865 stays de-energized, and the conveyor A RUN relay 893 stays energized.

TRANSFER OF SHUTTLE A1 FROM CONVEYOR B1 TO CONVEYOR C1

When conveyor B1 becomes full as hereinbefore described, a zero signal is received on input terminal 829 indicating that the B1 conveyor is full. OR circuit 885 already has a zero signal applied to terminal X from the B2 no-run zero signal received on input terminal 879 so a zero signal is applied to terminal F of AND/NOT circuit 831 from OR circuit 885. AND/NOT circuit 835 applies a zero signal to terminal H of AND/NOT circuit 831 at this time as AND/NOT circuit 835 receives a signal on terminal N due to the fact that limit switch LS–C1, 917 is closed as the shuttle A1 is not resting at conveyor C1. Terminal J of AND/NOT circuit 831 receives a zero signal at this time from AND/NOT circuit 839 as terminal K of AND/NOT circuit 839 receives a signal from the limit switch LS–C2 919, being closed at this time as shuttle A1 does not rest at the conveyor C2. OR circuit 908 applies a zero signal to input terminal K of AND/NOT circuit 831 at this time as terminal V receives a zero signal as contacts LSX–C4 907 are open due to the fact that limit switch LS–C4 903 in FIG. 26 is closed, energizing coil LSX–C4 905 in FIG. 26 as the shuttle A1 does not rest at conveyor C4 at this time. Referring back to FIG. 25, terminal R of OR circuit 908 receives a zero signal from AND/NOT circuit 843 at this time, due to the fact that terminal U of AND/NOT circuit 843 receives a signal as limit switch LS–C3 921 is closed due to the fact that shuttle A1 does not rest at conveyor C3. Therefore, at this time, the AND/NOT circuit 831 applies a signal to terminal Y of AND/NOT circuit 855, causing AND/NOT circuit 855 to produce a zero signal at this time. The zero signal produced by AND/NOT circuit 855 de-energizes the A1 RUN relay 857, causing the A1 conveyor to be shut down at this time. A zero signal is applied to terminal Y of inverting OR circuit 859, but inverting OR circuit 859 produces a zero signal at this time as a signal is still applied to terminal X of inverting OR circuit 859 from inverter 901 so that the shuttle A1 reverse relay 861 is not energized.

The zero signal from AND/NOT circuit 855 is also applied to terminal F of inverting OR circuit 863. All of the other input terminals H, J and K also have zero signals applied thereto as described when B2 conveyor ceases to run so that inverting OR circuit 863 produces a signal at this time to energize shuttle A1 forward relay 865, causing contacts 925 A1 forward in FIG. 26 to be closed, and to cause the shuttle A1 to be moved in a manner to be described hereinafterwards. Back to FIG. 25, the signal from inverting OR circuit 863 is also applied to terminal J of inverting OR circuit 913. Terminals F and H at this time have zero signal applied thereto but the signal applied to terminal J of inverting OR circuit 913 causes a zero signal to be produced by inverting OR circuit 913 at this time so that a zero signal is present to de-energize the RUN conveyor A relay 893, causing the conveyor A to be shut down at this time. The signal from inverting OR circuit 863 is also inverted to a zero signal by inverter 915; and after a delay of five seconds by time delay 923, an inversion thereof will be applied to energize the RUN conveyor A relay 893, causing the conveyor A to begin running again after a time delay of five seconds. This time delay of five sconds is sufficient to cause the shuttle to move from conveyor B1 to C1 in a manner hereinafterwards described.

SHUTTLE MOVEMENT

The moving of the A1 shuttle from conveyor B1 to conveyor C1 will be described now.

The coil of the shuttle A1 forward relay 865, when energized, causes contacts 925 of the shuttle A1 forward relay in FIG. 26 to be closed so that coil 927 of the forward relay is energized through contacts 929 of the LSX–C4 relay, which is closed at this time as LSX–C4 relay 905 is energized due to closed limit switch LS–C4 903. Limit switch LS–C4 903 is closed at this time as the A1 shuttle does not rest in front of conveyor C4. The energized coil 927 of the A1 shuttle forward relay causes contacts 931 in the motor control center to be closed to cause the motor 933 to be energized and to move the shuttle in a forward direction from conveyor B1 to conveyor C1. As soon as the shuttle A1 reaches conveyor C1 limit switch LS–C1 917 in FIG. 25 opens, causing zero signal to be applied to terminal N of AND/NOT circuit 835. Terminal M of AND/NOT circuit 835 receives a zero signal from input terminal 833 at this time as conveyor C1 is not full so that AND/NOT circuit 835 applies a signal to terminal H of AND/NOT circuit 831, causing AND/NOT circuit 831 to apply a zero signal to terminal Y of AND/NOT circuit 855 at this time. AND/NOT circuit 855 still has a zero signal applied to terminal X from OR circuit 889; so that AND/NOT circuit 855 produces a signal at this time to energize A1 RUN relay coil 857, causing A1 conveyor to begin to run again. The signal produced by AND/NOT circuit 855 is also applied to terminal F of inverting OR circuit 863, causing inverting OR circuit 863 to cease producing a signal so that the shuttle A1 forward coil 865 is de-energized, opening contacts 925 in FIG. 26, de-energizing coil 927 of the forward relay, opening contacts 931 to the motor 933 so that the A1 shuttle is stopped at the C1 conveyor. The zero signal produced by inverting OR circuit 863 is applied to inverting OR circuit 913, causing inverting OR circuit 913, which has a zero signal applied to its other inputs, to produce a signal which is passed by OR circuit 881 to energize the coil 893 of the RUN A conveyor, causing A to begin operation again. Thus, the A1 shuttle has been moved from the B1 conveyor, which has been filled, to the C1 conveyor, and the A1 conveyor and the A conveyor have been started again to move mailbags to the C1 conveyor.

C1 conveyor is then filled up in the same manner as conveyor B1 under the control of its photoelectric relays C1–INCH and C1–FULL. The storage of mailbags on conveyor C1 is shown in more detail in FIG. 27. The control circuitry responsive to the photoelectric relays C1–FULL and C1–INCH for the C1 relay operate in a similar manner to the control circuitry shown in FIG. 24 for the photoelectric relays B1–INCH and B1–FULL for the B1 conveyor (shown in more detail in FIG. 21). When conveyor C1 is full, as detected by the C1–FULL photoelectric relay, the full status is indicated by a signal received on input terminal 833 in FIG. 25, causing AND/NOT circuit 835 to apply a zero signal to terminal H of AND/NOT circuit 831 so that AND/NOT circuit 831 applies a signal to AND/NOT 855. The other terminals of AND/NOT circuit 831 at this time have zero signals applied thereto. AND/NOT circuit 855, with a signal applied to terminal Y, produces a zero signal de-energizing the shuttle A1 RUN relay 857 to shut down conveyor A1, shutting down conveyor A by de-energizing coil 893 of RUN relay A in a manner described hereinbefore and energizing the shuttle A1 forward relay coil 865 in a similar manner to that hereinbefore described, causing the shuttle A1 to transfer from conveyor C1 to conveyor C2, in a similar manner to that hereinbefore described. With conveyor C1 full, a zero signal is applied to terminal 935, applying a zero signal to terminal R of AND/NOT circuit 909. AND/NOT circuit 909 does not produce a signal until all conveyors are full. In this manner, conveyor B1 to C4 may be filled up until the photoelectric relay C4–FULL of conveyor C4 detects that conveyor C4 is full. When conveyor C4 is full, zero signals have been applied to terminal 937, indicating that conveyor C2 is full; to terminal 939, indicating that conveyor C3 is full; and to terminal 941, indicating that conveyor C4 is full AND/NOT circuit 909 then delivers a signal to inverting OR circuit 913, causing a zero signal to be produced by AND/NOT circuit 913 so that a zero signal is passed by OR circuit 881; and coil 893 of the RUN conveyor A relay is de-energized, shutting down conveyor A. A signal is also applied to inverting OR circuit 863 so that inverting OR circuit 863 produces a zero signal and coil 865 of shuttle A1 forward relay cannot be energized. Also, when conveyor C4 is full, a signal is received on terminal 911, which is applied to inverting OR circuit 863 and inverting OR circuit 913, causing, respectively, the coil 865 of shuttle A1 forward to be de-energized and de-energizing coil 893 of conveyor A RUN relay so that conveyor A cannot be energized.

With the A1 shuttle at conveyor C4, limit switch 903 in FIG. 26 is opened, de-energizing relay LSX–C4 905, opening LSX–C4 contacts 929 in FIG. 26 and closing LSX–C4 contacts 907 in FIG. 25. With LSX–C4 contacts 907 in FIG. 25 closed, a signal is applied to OR circuit 908 so that a signal is applied to terminal K of AND/NOT circuit 831 and AND/NOT circuit 831 produces a zero signal, allowing AND/NOT circuit 855 to produce a signal during the time that the A1 shuttle is at the C4 position, allowing conveyor A1 and conveyor A to run. When C4 is full, a zero signal is received on input terminal 943 so that a zero signal is applied to terminal V of AND/NOT circuit 887. A zero signal is applied to terminal R of AND/NOT circuit 887 at this time as limit switch LS–B1 895 in FIG. 26 has been closed since the shuttle A1 has left the B1 conveyor energizing relay LSX–B1 897 in FIG. 26, opening contacts 899 in FIG. 25. Conveyor B2 is not running, so a zero signal is applied to terminal T of AND/NOT circuit 887. AND/NOT circuit 887, therefore, produces a signal which is passed by OR circuit 889, applying a signal to terminal X of AND/NOT circuit 855, so that a zero signal is produced by AND/NOT circuit 855 at this time, shutting down conveyor A1 by de-energizing coil 857 in the manner hereinbefore described. The signal passed by OR circuit 889 is inverted to a zero signal by inverter 901, applying a zero signal to terminal X of inverting OR circuit 859. A zero signal is also applied to terminal Y of inverting OR circuit 859 at this time as a zero signal is produced by AND/NOT circuit 855, so inverting OR circuit 859 produces a signal at this time to energize coil 861 of the shuttle A1 reverse relay. Coil 861 of the shuttle A1 reverse relay, when energized, closes contacts 945 in FIG. 26, energizing coil 947 of the reverse relay through closed contacts 949 of the LCX–B1 relay 897. Relay 947, when energized, closes the reverse contacts 951, energizing the motor 933 to reverse the A1 shuttle, moving the shuttle from conveyor C4 back to conveyor B1. When the shuttle A1 reaches the conveyor B1, limit switch LSX–B1 895 opens, de-energizing LSX–B1 897, opening the LS–B1 contacts 949, de-energizing the coil 947 of the reverse relay, de-energizing the motor 933. The A1 shuttle reverse relay 861 in FIG. 25 is also de-energized.

Thus, it has been described how the conveyors B1 and C1–C4 have been filled up with the shuttle A1 moved from conveyor to conveyor as the previous conveyor is filled up. After all conveyors are filled up, the A1 shuttle returns to conveyor B1.

If a low level is detected on the presort slide below the conveyor B2 and conveyor B2 starts again as hereinbefore described, a signal will be applied to terminal 879 in FIG. 26, indicating that conveyor B2 is running, which is passed by OR circuit 881 to energize coil 893 of the conveyor A RUN relay, keeping conveyor A running, applied to inverting OR circuit 863 so that a zero signal is applied to the shuttle A1 forward relay 865. A signal is passed by OR circuit 885 and applied to terminal F of AND/NOT circuit 831 so that AND/NOT circuit 831 applies a zero signal to terminal Y of AND/NOT circuit 855. The B2 running signal is also applied to terminal T of AND/NOT circuit 887 so that AND/NOT circuit 887 produces a zero signal. The B2 running signal, after inversion by inverter 891, is applied to terminal N of AND/NOT circuit 893. Terminal M of AND/NOT circuit 893 also has a zero signal applied thereto at this time. Limit switch LS-B1 895 in FIG. 20 is closed during the time that the shuttle A1 is not before conveyor B1 so that the coil 897 of LSX-B1 relay is energized, opening contacts LSX-B1 899, thus, applying a zero signal to terminal M of AND/NOT circuit 893. Therefore, AND/NOT circuit 893 produces a signal which is passed by OR circuit 889 and applied as a signal to terminal X of AND/NOT circuit 855 so that AND/NOT circuit 855 produces a zero signal and coil 857 of the RUN relay of conveyor A1 is de-energized. The signal passed by OR circuit 889 is inverted by inverter 901 and applied as a zero signal to terminal X of inverting OR circuit 859. Terminal Y of inverting OR circuit 859 also receives a zero signal at this time as AND/NOT circuit 855 is producing a zero signal so that inverting OR circuit 859 produces a signal to energize coil 861 of the shuttle A1 reverse relay, causing the shuttle to be returned to the B1 conveyor in a manner hereinbefore described. Contacts 899 are then closed, the A1 shuttle de-energized and the A1 conveyor 857 is energized, starting up conveyor A1.

Thus, if B2 conveyor begins to run while the storage conveyors are being filled, the A1 shuttle automatically returns to the B1 conveyor.

DISCHARGE OF STORAGE CONVEYORS

When conveyors D and E are running, conveyors C1-C4 are emptied over conveyors D and E to the presort slide. If for any reason the B2 conveyor slide is jammed, bags may be fed to the presort slide over the conveyor belt C1-C4.

Contacts 953 in FIG. 27, normally closed, are opened when conveyor E is running; and contacts 955, normally closed, are opened when conveyor D is running so that when conveyors D and E are running, a zero signal is applied to terminal R of inverting OR circuit 957. If any of the conveyors C1-C4 are full, a signal is applied to one of the terminals of AND/NOT circuit 959. If conveyor C4 is full, a signal is applied on input terminal 961; if conveyor C3 is full, a signal is applied on input terminal 963. If conveyor C2 is full, an input signal is applied on input terminal 965; and if conveyor C1 is full, an input signal is applied on input terminal 967. Thus, if any of the conveyors are full, a signal is applied to one of the terminals of AND/NOT circuit 959, causing AND/NOT circuit 959 to apply a zero signal to the terminal X of AND/NOT circuit 969.

Reviewing the prior described operation briefly, as coil 861 in FIG. 25 of the shuttle A1 reverse relay is energized, reversing the A1 shuttle to the conveyor B1 from conveyor C4, which can only happen after all conveyors have been filled or B2 begins running again, contacts 867 in FIG. 28 are closed, energizing coil 869 of the advance relay through normally closed contacts 971 so that contacts 973 and 975 are closed, sealing in coil 869 through its own contacts 973. Contacts 971 are opened when coil 999 in FIG. 27 of the conveyor C1 RUN relay is energized so that conveyor C1 runs. As conveyor C1 is not running, contacts 971 in FIG. 28 remain closed. If conveyor D is operating, contacts 977 in FIG. 28 are closed; and if conveyor E is operating, contacts 979 are closed. As soon as the shuttle A1 has been returned to conveyor B1 so that coil 861 of the A1 shuttle reverse relay in FIG. 25 is de-energized, the shuttle A1 reverse contacts 981 in FIG. 28, which are normally closed, become closed again to energize advance coil 983 through now closed contacts 975, 977, and 979. Coil 869 remains energized through contacts 973, even as contacts 867 open. Advance coil 983, after energization, remains energized for a period of 1.2 minutes. When the shuttle was moved forward during the storage of mailbags on the storage belts, and the shuttle A1 forward relay had its coil 865 in FIG. 25 energized, contacts 985 of the shuttle A1 forward relay in FIG. 28 were closed, energizing coil 987 of motor 988, closing contacts 989 and 991 so that contacts 993 are closed, sealing in coil 983. Coil 983 in FIG. 28, when energized, closes contacts 989 in FIG. 27, causing a signal to be applied to terminal M of inverting OR circuit 991. Inverting OR circuit 991 thereupon produces and applies a zero signal to terminal Y of AND/NOT circuit 969, causing AND/NOT circuit 969 to produce a signal which is applied to terminal N of inverting OR circuit 991 which is inverted to a zero signal and applied as a zero signal to terminal Y of AND/NOT circuit 969, sealing in the zero signal produced by inverting OR circuit 991 so that a zero signal is applied to terminal V of inverting OR circuit 957. Thus, both terminal R and terminal V of inverting OR circuit 957 have a zero signal applied thereto, causing a signal to be produced which is inverted to a zero signal by inverter 973 and applied to terminal H of AND/NOT circuit 995.

For the immediate purpose of this description, the following will apply to the discharge of conveyor C1 to conveyor D. The discharge of the mailbags on conveyors C2-C4 are accomplished in a similar manner.

As conveyor C1 was full, the beam of the C1-FULL photoelectric relay has been broken so that the CI-FULL contacts 997 are open, applying a zero signal to terminal F of AND/NOT circuit 995. AND/NOT circuit 995 thereupon produces a signal to energize the coil 999 of the C1-RUN relay, causing the C1 conveyor to run, delivering the bags thereupon to conveyor D. This continues so long as the beam of the C1-FULL photoelectric relay is broken, for no more than ½ second to permit a gap between bags. As soon as the beam of the photoelectric relay is made with no bags on the conveyor, the C1-FULL contacts 997 are closed, applying a signal to terminal F of AND/NOT circuit 995 so that zero signal is produced by AND/NOT circuit 995 and coil 999 of the RUN conveyor C1 relay is de-energized, shutting down conveyor C1. If the beam of the C1-FULL photoelectric relay is made again, indicating further bags on the conveyor, the conveyor C1 will continue running in the manner described hereinbefore. The zero signal produced by inverter 973 is applied to AND/NOT circuits controlling the energization of the RUN relays for conveyor C2-C4 in a similar manner.

Thus, it has been described how, after conveyors B1 and C1-C4 have been filled, that if conveyors D and E are running and directing bags onto the presort slide, conveyor C1-C4 will run in sequence. If conveyors E and D are shut down, for instance, by the detection of a high level on the presort metering slide T1-HI by photoelectric relay, conveyors E and D will be shut down in a similar manner to that described with respect to conveyor J or B2; and contacts 953 and 955 in FIG. 27 will be closed, applying a signal to inverting OR circuit 957 which will be inverted to a zero signal and inverted again to a signal by inverter 973 so that a signal will be applied to terminal H of AND/NOT circuit 995, causing a zero signal to be produced by AND/NOT circuit 995 so that the coil 999 of the RUN conveyor C1 relay will be de-energized, shutting down conveyor C1.

C1 CONVEYOR STORAGE

The operation of the C2–C4 conveyors is identical to that of the C1 conveyor so only the operation of the C1 conveyor will be described in detail.

The storage of mailbags on the C1 conveyor is similar to the storage of mailbags on conveyor B1 hereinbefore described.

When the A1 shuttle rests in front of the C1 conveyor, mailbags are delivered to the front of conveyor C1. As soon as a sufficient number of mailbags pile up, the beam of the C1-INCH photoelectric relay is broken for ½ second, so that the C1-INCH contacts 1001 in FIG. 27 open and the C1-INCH contacts 1003 close. The C1-INCH contacts 1001, when closed, had energized coil 1005 to close contacts 1007. When contacts 1001 open, coil 1005 stays energized for a minimum of 2 seconds before it drops out. As mailbags have not yet reached the end of the conveyor C1, the beam of C1-FULL photoelectric relay is made so that the C1-FULL contacts 997 are closed, producing a signal which is inverted by inverter 1009 and applied as a zero signal to terminal V of AND/NOT 1011 and applied as a signal to terminal F of AND/NOT circuit 995, so that AND/NOT 995 cannot produce a signal. C1-INCH contacts 1003, when closed, causes a signal to be applied to terminal M of inverting OR 1013 so that inverting OR 1013 applies a zero signal to terminal T of AND/NOT 1011. AND/NOT 1011, with a zero signal applied to both terminals, products a signal to energize coil 999 of the conveyor C1 RUN relays, causing conveyor C1 to run.

When the conveyor C1 has run for a sufficient period of time to remove the mailbags from the front of the conveyor C1, the beam of the C1-INCH photoelectric relay makes again, causing C1-INCH contacts 1001 to close and opening C1-INCH contacts 1003. C1-INCH contacts 1003, when open, causes a zero signal to be applied to inverting OR 1013, so that a signal is applied to terminal T of AND/NOT 1011 and AND/NOT 1011 produces a zero signal so that coil 999 is de-energized, shutting down conveyor C1. If the C1-INCH beam does not make within two seconds, coil 1005 drops out to open contacts 1007, causing a signal to be applied to terminal U or AND/NOT 1011, de-energizing coil 999, shutting down conveyor C1.

When conveyor C1 becomes full, the beam of the C1-FULL photoelectric relay is broken, opening contacts 997 so that a signal is applied to terminal U of AND/NOT 1011, de-energizing coil 999 to shut down conveyor C1.

This concludes the description of the mailbag handling system.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. An article handling system comprising:
   (a) a slide for receiving articles for distribution,
   (b) first means for sensing the level of articles on said slide,
   (c) means for distributing said articles according to preselected designations,
   (c1) means for transferring articles to said distribution means from said slide,
   (d) a storage conveyor,
   (e) means under the control of said first sensing means for diverting articles to said storage conveyor when the level of articles on said slide exceeds a predetermined level,
   (f) second sensing means for sensing when articles are diverted to the input end of said storage conveyor for regulating the storage of articles thereon,
   (g) and means under the control of said first sensing means for delivering articles to said slide from said storage conveyor when the level of articles on said slide falls below a predetermined level.

2. An article handling system comprising:
   (a) a slide for receiving articles for distribution,
   (b) first means for sensing the level of articles on said slide,
   (c) means for distributing said articles according to preselected designations,
   (c1) means for transferring articles to said distribution means from said slide,
   (d) a plurality of storage conveyors,
   (e) means responsive to said first sensing means for diverting said articles temporarily to one of said storage conveyors when the level of articles on said slide exceeds a predetermined level,
   (f) second means for sensing when articles are diverted to the input end of each of said storage conveyors for regulating the storage of articles thereon,
   (g) third sensing means for sensing when each of said storage conveyors is full of articles for diverting said articles to another storage conveyor,
   (h) and means responsive to said first sensing means for delivering articles to said slide from said storage conveyor when the level of articles on said slide falls below a predetermined level.

3. An article handling system comprising:
   (a) a slide for receiving articles for distribution,
   (b) first means for sensing when the level of articles on said slide is at a high level,
   (b1) second means for sensing when the articles on said slide are at a low level,
   (c) means for assigning designation information to each article,
   (c1) means for transferring articles to said designation assigning means from said slide,
   (d) a plurality of distribution positions,
   (e) a distribution path adjacent to said distribution positions,
   (f) means for moving said articles along said distribution path,
   (g) means for shifting the designation information assigned to each article in synchronism with the movement of each article along said distribution path,
   (h) means for examining each designation information at each distribution position coincident with the movement of the corresponding article past each distribution position for controlling the discharge of the appropriate article,
   (i) storage means,
   (j) means responsive to said first sensing means for temporarily diverting said articles to said storage means when the level of articles on said slide reaches the high level,
   (k) and means responsive to said second sensing means for delivering the articles in said storage means to said slide when the level of articles on said slide falls below the low level.

4. An article handling system for distributing articles to different locations along a distribution path according to an information code assigned to each article:
   (a) a slide for receiving articles for distribution,
   (b) means for sensing when the articles on said slide are at a low level and at a high level, (c) a plurality of depositors for depositing articles onto said distribution path, (d) means for transferring articles from said slide to said depositors, (e) each of said depositors having a top hopper and a bottom hopper, (f) each of said depositors having means for entering an information code corresponding to the article on said receiving means, (g) means responsive to the entering of an information code for transferring the articles on said top hopper to said bottom hopper, (h) means for causing each of said bottom hoppers to deposit the article thereon to said sorting path at predetermined times, (i) a plurality of distribution positions along said distribution path, (j) means for moving said articles along said distribution path, (k) means for shifting the information code assigned to each article in synchronism with the movement of each article along said distribution path, (l) means for examining each information code at each distribution position coincident with the movement of the corresponding article past each distribution position for controlling the discharge of the appropriate article, (m) a plurality of storage conveyors, (n) means under the control of said sensing means for diverting said articles to one of said storage conveyors when the level of articles on said slide is at a high level, (o) and means under the control of said sensing means for delivering articles from said storage conveyors to said slide when the level of articles on said slide is at a low level.

References Cited by the Examiner

UNITED STATES PATENTS

| | | | |
|---|---|---|---|
| 2,158,069 | 5/93 | Grover | 198—37 |
| 2,470,922 | 5/49 | Dunn. | |
| 2,988,195 | 6/61 | McHugh | 214—11 |
| 2,990,965 | 7/61 | Smoll. | |
| 3,000,519 | 9/61 | Purnell | 214—11 |
| 3,040,870 | 6/62 | Carter. | |
| 3,044,638 | 7/62 | Bruce | 214—11 |
| 3,057,488 | 10/62 | Atkinson | 214—17.62 |
| 3,068,451 | 12/62 | Bolander | 214—11 |
| 3,071,262 | 1/63 | Bosch | 214—11 X |
| 3,103,285 | 9/63 | Goodell. | |

FOREIGN PATENTS 632,403 11/49 Great Britain.

HUGO O. SCHULZ, *Primary Examiner.*

MORRIS TEMIN, *Examiner.*